US009881070B2

(12) United States Patent
Kumar et al.

(10) Patent No.: US 9,881,070 B2
(45) Date of Patent: Jan. 30, 2018

(54) CONTROLLING SERVICE FUNCTIONS IN RESPONSE TO SERVICE INSTIGATION AND SERVICE REACTIVATION MESSAGES

(71) Applicant: Microsoft Technology Licensing, LLC, Redmond, WA (US)

(72) Inventors: Namendra Kumar, Redmond, WA (US); Uladzimir A. Skuratovich, Redmond, WA (US); Sankaran Narayanan, Redmond, WA (US); Abhilash C. Nair, Bellevue, WA (US); Adit A. Dalvi, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 316 days.

(21) Appl. No.: 14/569,495

(22) Filed: Dec. 12, 2014

(65) Prior Publication Data

US 2016/0171065 A1 Jun. 16, 2016

(51) Int. Cl.

*G06F 17/30* (2006.01)
*G06F 9/44* (2006.01)

(Continued)

(52) U.S. Cl.

CPC ...... *G06F 17/30569* (2013.01); *G06F 9/4435* (2013.01); *G06F 9/45533* (2013.01); (Continued)

(58) Field of Classification Search

CPC ......... G06F 17/30569; G06F 17/30342; G06F 9/4435; G06F 9/45533; H04L 61/308; (Continued)

(56) References Cited

U.S. PATENT DOCUMENTS 5,890,077 A 3/1999 Hanawa et al.
6,188,905 B1 2/2001 Rudrapatna et al.

(Continued)

FOREIGN PATENT DOCUMENTS

EP 1781000 5/2007

OTHER PUBLICATIONS

"International Search Report and Written Opinion", Application No. PCT/US2015/064854, dated Mar. 9, 2016, 10 Pages.

(Continued)

*Primary Examiner* — Hares Jami

(57) ABSTRACT

A service is delivered by a computer system comprising a processor, a memory accessible to the processor and computer storage. The memory holds code which defines service object classes. The service object classes are configured to provide service functions, and the service object classes are instantiated to create service objects which implement the service functions. For each service object, an associated service object identifier is generated in the memory which distinguishes that service object from any other service object. The service objects are serialized to generate serialized data, the serialized data comprising a representation of each service object, and the representation comprising that service object's service object identifier, that service object's associated state data and the service object identifier of any other service object referenced by that service object. Following deactivation, the service objects can be recreated by following the chain of references.

20 Claims, 22 Drawing Sheets

(51) Int. Cl.
*G06F 9/455* (2006.01)
*H04L 29/12* (2006.01)
*H04L 29/06* (2006.01)

(52) U.S. Cl.
CPC ...... *G06F 17/30342* (2013.01); *H04L 61/308* (2013.01); *H04L 65/1006* (2013.01); *H04L 65/1046* (2013.01); *H04L 65/1069* (2013.01); *H04L 65/1089* (2013.01); *H04L 65/1093* (2013.01)

(58) Field of Classification Search
CPC ............. H04L 65/1006; H04L 65/1046; H04L 65/1069; H04L 65/1089; H04L 65/1093
USPC ......... 707/756; 709/203–205, 217–219, 223, 709/227, 231, 232
See application file for complete search history.

(56) References Cited

U.S. PATENT DOCUMENTS

| | | | | |
|---|---|---|---|---|
| 6,393,481 | B1 * | 5/2002 | Deo | H04M 3/42136 340/522 |
| 7,085,260 | B2 | 8/2006 | Karaul et al. | |
| 7,120,639 | B1 | 10/2006 | De Jong | |
| 7,215,957 | B2 | 5/2007 | Ekman et al. | |
| 7,216,350 | B2 * | 5/2007 | Martin | H04M 3/42 379/201.01 |
| 7,325,226 | B2 | 1/2008 | Pepin et al. | |
| 7,395,065 | B2 | 7/2008 | Dorenbosch | |
| 7,606,202 | B2 | 10/2009 | Marathe et al. | |
| 7,738,646 | B2 | 6/2010 | Sundaram et al. | |
| 7,843,901 | B2 | 11/2010 | Silber et al. | |
| 8,509,120 | B2 | 8/2013 | Sedlacek et al. | |
| 8,718,636 | B1 | 5/2014 | Pankajakshan | |
| 9,055,139 | B1 * | 6/2015 | Devireddy | H04L 65/80 |
| 9,826,000 | B2 | 11/2017 | Kumar et al. | |
| 2001/0052006 | A1 * | 12/2001 | Barker | H04L 41/0213 709/223 |
| 2002/0083166 | A1 * | 6/2002 | Dugan | H04M 15/90 709/223 |
| 2003/0191803 | A1 * | 10/2003 | Chinnici | G06F 9/547 709/203 |
| 2003/0212818 | A1 * | 11/2003 | Klein | H04L 51/12 709/238 |
| 2004/0117763 | A1 * | 6/2004 | Fjallstrom | G06F 9/4435 717/108 |
| 2011/0225231 | A1 | 9/2011 | Bansal et al. | |
| 2011/0310773 | A1 | 12/2011 | Iyengar et al. | |
| 2012/0188892 | A1 | 7/2012 | Damilie et al. | |
| 2012/0321054 | A1 | 12/2012 | Emerick | |
| 2013/0124573 | A1 | 5/2013 | Seth et al. | |
| 2014/0176663 | A1 | 6/2014 | Cutler et al. | |
| 2014/0222890 | A1 | 8/2014 | Zhu et al. | |
| 2014/0280720 | A1 | 9/2014 | Bischoff et al. | |
| 2016/0057243 | A1 * | 2/2016 | Gupta | H04L 67/2814 709/203 |
| 2016/0173537 | A1 | 6/2016 | Kumar et al. | |

OTHER PUBLICATIONS

"International Search Report and Written Opinion", Application No. PCT/US2015/065139, dated Jun. 2, 2016, 11 pages.
"Non-Final Office Action", U.S. Appl. No. 14/569,431, dated Aug. 26, 2016, 26 pages.
"Second Written Opinion Issued in PCT Application No. PCT/US2015/065139", dated Nov. 8, 2016, 4 Pages.
"Second Written Opinion Issued in PCT Application No. PCT/US2015/064854", dated Nov. 10, 2016, 6 Pages.
Fathi, et al., "Optimization of Mobile IPv6-Based Handovers to Support VoIP Services in Wireless Heterogeneous Networks", In Proceedings of IEEE Transactions on Vehicular Technology, vol. 56, No. 1, Jan. 22, 2007, 11 pages.
Gustafsson, "Available Now: Preview of Project "Orleans"—Cloud Services at Scale", Retrieved From: <http://blogs.msdn.com/b/dotnet/archive/2014/04/02/available-now-preview-of-project-orleans-cloud-services-at-scale.aspx> Jan. 7, 2015, Apr. 2, 2014, 6 pages.
Lu, et al., "A Location-Aware Fast Handover Scheme for Mobile WiMax Networks", In Proceedings of the 7th international conference on Information, communications and signal processing, Dec. 8, 2009, 5 pages.
"Final Office Action", U.S. Appl. No. 14/569,431, dated Jan. 12, 2017, 29 pages.
"International Preliminary Report on Patentability", Application No. PCT/US2015/065139, dated Feb. 17, 2017, 6 pages.
"International Preliminary Report on Patentability", Application No. PCT/US2015/064854, dated Feb. 1, 2017, 7 pages.
"Notice of Allowance", U.S. Appl. No. 14/569,431, dated Jul. 12, 2017, 8 pages.

* cited by examiner

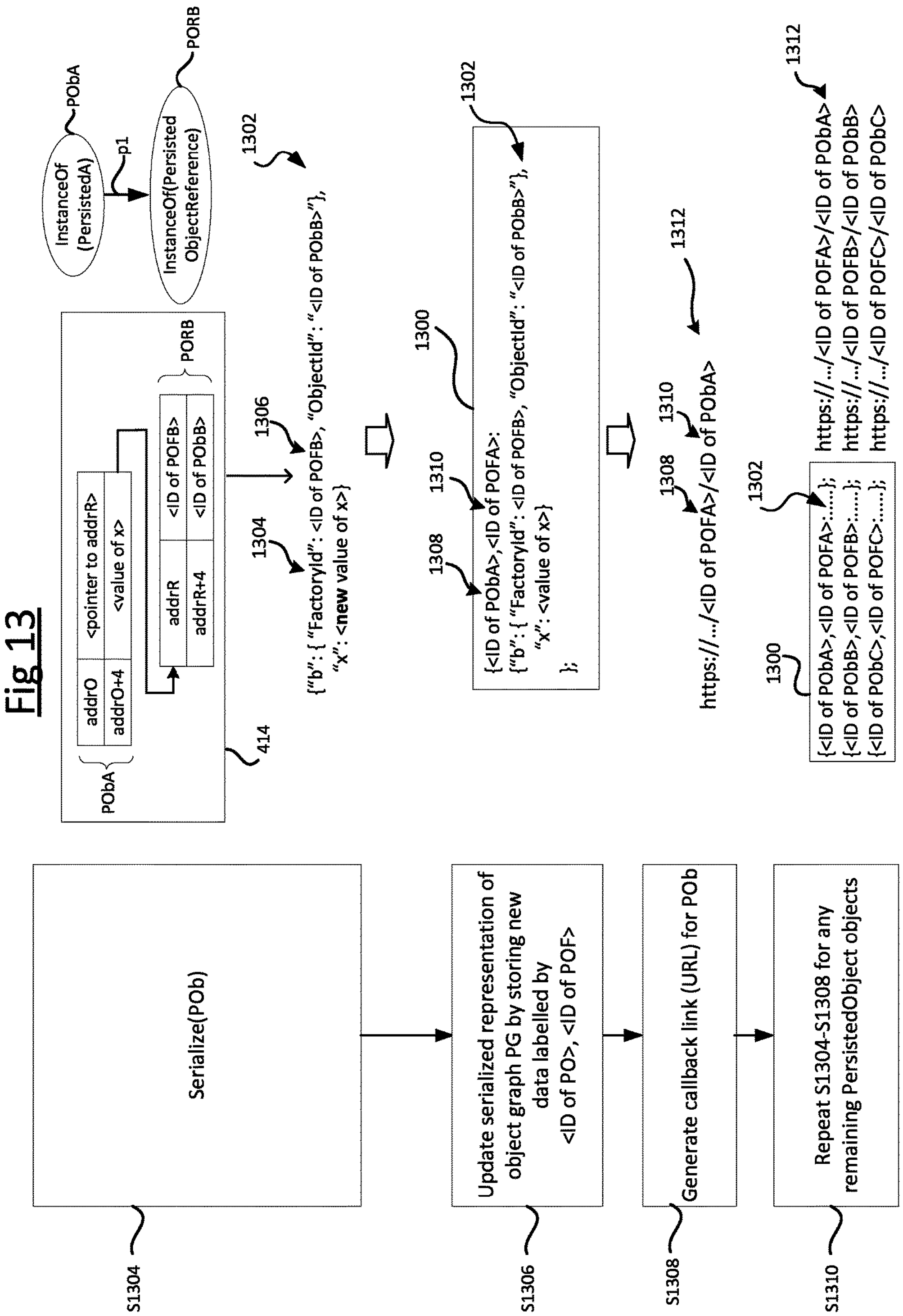
Fig 13
S1304
Serialize(POb)
S1306
Update serialized representation of object graph PG by storing new data labelled by <ID of PO>, <ID of POF>
S1308
Generate callback link (URL) for POb
S1310
Repeat S1304-S1308 for any remaining PersistedObject objects
414
PObA
addrO
addrO+4
<pointer to addrR>
<value of x>
PORB
addrR
addrR+4
<ID of POFB>
<ID of PObB>
InstanceOf(PersistedA)
PObA
p1
InstanceOf(PersistedObjectReference)
PORB
1302
1304
1306
{"b": { "FactoryId": <ID of POFB>, "ObjectId": "<ID of PObB>"},
"x": <new value of x>}
1300
1308
1310
{<ID of PObA>,<ID of POFA>:
{"b": { "FactoryId": <ID of POFB>, "ObjectId": "<ID of PObB>"},
"x": <value of x>}
};
1312
https://.../<ID of POFA>/<ID of PObA>
{<ID of PObA>,<ID of POFA>:......};
{<ID of PObB>,<ID of POFB>:......};
{<ID of PObC>,<ID of POFC>:......};
https://.../<ID of POFA>/<ID of PObA>
https://.../<ID of POFB>/<ID of PObB>
https://.../<ID of POFC>/<ID of PObC>

CONTROLLING SERVICE FUNCTIONS IN RESPONSE TO SERVICE INSTIGATION AND SERVICE REACTIVATION MESSAGES

BACKGROUND

Conventional communication systems allow a user of a client device (endpoint), such as a personal computer or mobile device, to conduct voice or video calls with one or more other endpoints over a packet-based computer network such as the Internet. Frequently, communication of call data by endpoints is effected by the endpoints adhering to an agreed communication protocol. One example of this is the Session Initiation Protocol (SIP). In broad terms, SIP dictates that calls be negotiated in accordance with an endpoint-to-endpoint request-response-based transaction paradigm in which (among other things) the call is progressed from an initial unconnected state to a state in which real-time media can flow between endpoints by SIP user agents transmitting a sequence of request messages to other user agents of other endpoints and receiving respective response messages in return, with maintenance and eventual termination of the call being similarly effected. Each user agent may maintain a state machine for the duration of the call which is used to track current call state. The state machines are suitably updated upon transmission of salient requests and receipt of salient responses.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed is a method is for delivering a service, the method implemented by a computer system comprising a processor, a memory accessible to the processor and computer storage. The memory holds code which defines service object classes. The service object classes are configured to provide service functions. The method comprises the following steps. At least one service instigation message is received. Responsive to the at least one service instigation message, the service object classes are instantiated to create service objects. The service objects implement the service functions to deliver the service. Each service object has associated state data held in the memory, and at least some of the service objects reference other service objects. For each service object, an associated service object identifier is generated in the memory which distinguishes that service object from any other service object. The service objects are serialized to generate serialized data, the serialized data comprising a representation of each service object, and the representation comprising that service object's service object identifier, that service object's associated state data and the service object identifier of any other service object referenced by that service object. The serialized data is stored in the computer storage. When the service objects have been deactivated, a service reactivation message, identifying a service object to be reactivated, is received, and a reactivation process is performed for the identified service object. The reactivation process comprises: reactivating the identified service object from its representation in the serialized data, and if the identified service object references at least one service object which is needed to implement a service function, repeating the reactivation process for the referenced at least one service object, thereby creating a replacement set of service objects to replace at least some of the deactivated service objects.

BRIEF DESCRIPTION OF FIGURES

FIG. 13 is a flow chart for a serialization process;

DETAILED DESCRIPTION OF EMBODIMENTS

Figure 1:
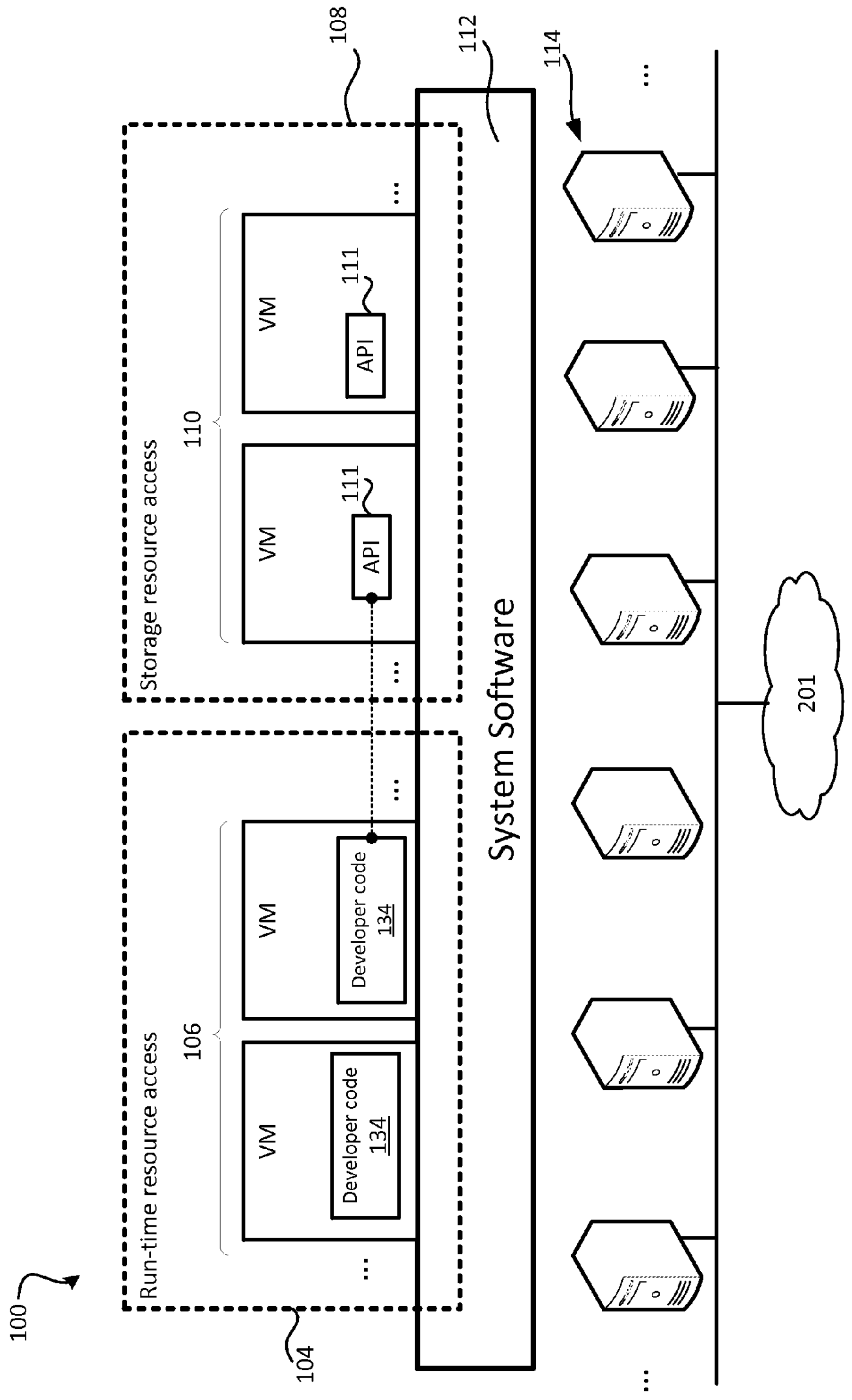
FIG. 1 is a schematic overview of a cloud platform.

When setting up a real-time media communication event such as a call (e.g. an audio call, audio-and-video (AV) call etc.) between endpoints of a network, a number of decisions have to be made taking into account multiple factors and variables including whether parties should be allowed to call one another, what audio and video codecs to use, how to route media packets from one party endpoint to another etc. The embodiments described below provide centralized (as opposed to end-point based) control of real-time media communication events from within a "distributed platform" otherwise referred to as a "cloud platform" or simply a "cloud". That is, the call is controlled by various central controllers running on the cloud.

A cloud means a computing platform, accessible via a network (e.g. the Internet), which includes a distributed computer system comprised of multiple networked computer devices and system software running thereon, the computer system providing a (potentially very large) pool of physical computing resources—such as physical processing resources and physical memory/storage resources, volatile and/or non-volatile—and the system software being configured to partition this underlying physical resource pool by implementing multiple independent virtual machines (VMs) i.e. software emulations of computer systems. Examples of cloud providers include Windows Azure™, Amazon Web Services™ etc.

This pooling of physical computer resources, and partitioning of that pool through virtualization act to decouple hardware and software considerations due to a virtualization layer (realized by the system software of the platform) providing separation of physical computer resources (e.g. available physical processor clock cycles and physical bits of memory) from 'virtual' resources—that is, resources actually be seen within each virtual computer system. Physical resources of the underlying hardware can be augmented by way of addition of new physical network computer devices, or upgrading of existing physical networked computer and the only considerations that need to be made in terms of legacy compatibility are of ensuring that the upgraded physical computer systems can still run the same generic virtual machines (i.e. without any consideration of what operating systems or application code are going to be run on those virtual machines). Similarly, a system designer can design systems (possibly extremely complex systems with many components), and develop code in relation thereto, for implementation on the cloud platform free from physical hardware considerations (such as ordering, deploying and housing physical servers etc.)—the system designer need only consider consumptions of computer resources in terms of resource limitations of virtual computer systems (not resource limitations of the underlying hardware), resource limitations of those virtual systems being well-defined and known. Thus, from the perspective of the systems designer, computer resource considerations are reduced to considerations of e.g. how many virtual computer systems of the cloud platform should be deployed; from the perspective of an operator of the platform itself (who may be different from the systems designer), computer resources are reduced to considerations of e.g. how many physical computer systems are needed to implement a required number of virtual machines having pre-defined resource allocations.

A high-level overview of an exemplary distributed platform 100 is shown in FIG. 1. The exemplary platform includes a distributed computer system 114. The computer system 114 of FIG. 1 is comprised of a very large number (e.g. tens of thousands) of networked computer devices—large enough that the physical computing resources can, in some contexts, be considered sufficiently plentiful as to be effectively unlimited. These computer devices are configured for communication with a network 201 (which is a packet-based network, e.g. the Internet) and are globally distributed (e.g. spread across multiple countries and/or continents). Typically, groups of such computer systems (e.g. thousands of servers) are housed in respective data centres (datacentre) at different geo-locations (i.e. in different regions of a country, different countries, different continents etc.)

System software 112 runs on top of the distributed computer system 114. The system software 12 is configured to implement two sets 104 (runtime set) and 108 (storage set) of independent, virtual machines 106, 110.

The runtime set 104 comprises multiple VMs 106 which provide runtime environments for execution of application code 134, the application code 134 being executed on that virtual computer system 106. The system software 112 is configured to enable a software developer, desiring to make use of the platform 100, to upload their bespoke code 134 via the network 201 to the platform 100 for execution thereon. In response, the system software 812 creates such a runtime environment and supplies the code 134 to the newly-created runtime environment for execution. Execution of this code 134 on the virtual system 106 is made possible by the system software mediating access to underlying physical processing resources and physical memory resources (primarily realized at the physical level by physical volatile memory) allocated to that environment.

The storage set 108 comprises multiple virtual machines 110 configured to provide data storage. Each has a corresponding Application Programming Interface (API) 111 which can be used to effect transfer of data to and from the physical memory resources (primarily realized at the physical level by physical non-volatile memory) allocated to that computer system 110 e.g. by code 134 making suitable function calls thereto. This transfer is, again, mediated by the system software 112.

Embodiments provide a system comprising computer storage which holds code configured to implement various types of controller. These include:

1. a call controller which handles high-level signalling functions, e.g. for establishing a communication event, e.g. call between two or more users, and for high-level management of the established communication event, e.g. in-call management, such as adding/removing participants, adding/removing media modalities etc., and terminating the established communication event;
2. one or more a media (modality) controllers, each for managing a media modality of the established communication event; the media modality controllers control the flow of actual media content, under the control of the call controller, for instance by controlling the manner in which overlay network connections (e.g. peer-to-peer and/or relayed connections) are established between participating endpoints; media modalities include audio, video, screen sharing, shared white-board etc. In some embodiments, the media modality service is only delivered for group calls (between three or more users).

An instance of a controller is implemented by application code executed on one more VMs of the cloud platform.

That is, Call Controller (CC) is a server entity responsible for call setup & management of two-party calls, and helps with multi-party call setup & management as well.

Call Agent (CA) is the term used to refer to client entities that interact with Call Controller.

Figure 2:
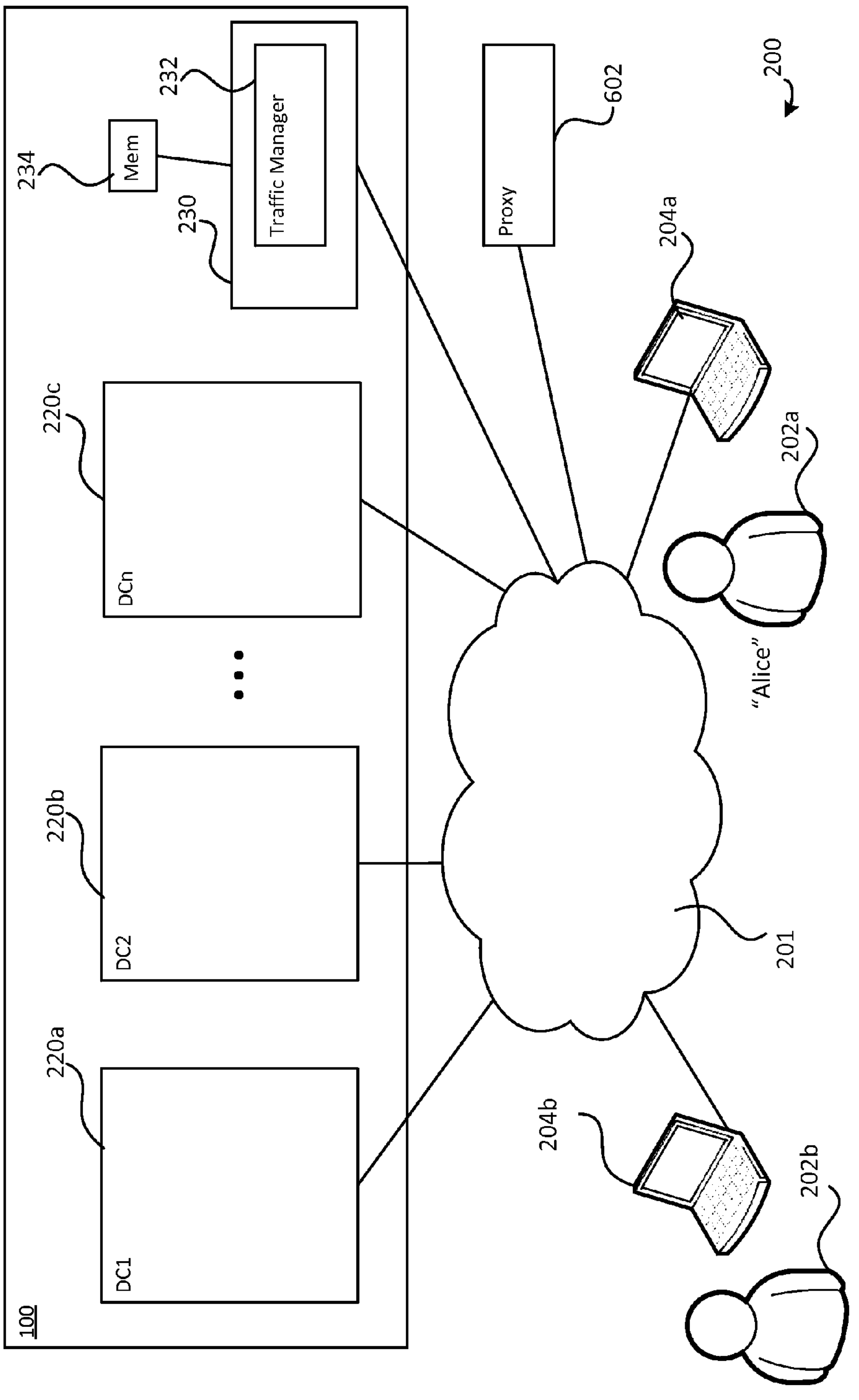
FIG. 2 is a schematic illustration of a communication system.

0. Overview:

0.1 Underlying System Components:

FIG. 2 shows a communication system 200. The communication system 200 includes the network 201. Connected to the network 200 are a user device (also referred to as a user device or client device) 204*a* associated with a first user 302*a* ("Alice") and a further user device 204*b* associated with a second user 202*b* ("Bob"). The user devices 204*a*, 204*b* are endpoints of the network 201. The user devices 204*a*, 204*b* are arranged to receive information from and output information to the relevant user. Although only two user devices are shown in FIG. 2, many more user devices may be included in communication system 200. Each user derive is a computer device which can take a number of forms e.g. that of a desktop or laptop computer, mobile phone (e.g. smartphone), tablet computing device, wearable computing device, television (e.g. smart TV), set-top box, gaming console etc.

Also connected to network 301 are a plurality of data centres (DCs) 220*a*, 220*b*, . . . , 220*c* and a traffic management system 230. The traffic management system 230 comprises one or more memory devices 234 and one or more processors configured to execute traffic management code 232 (traffic manager/traffic management logic) for managing datacentre traffic as described in more detail below. The traffic management system 230 and the datacentres 220 form part of the distributed platform 800.

A server 602 is also connected to the network 201, which is a proxy server, the function of which will be described in due course.

FIG. 4 illustrates a detailed view a user device 204 (such as user devices 204*a* and 204*b*). The user device 204 comprises a central processing unit ("CPU") 302, to which is connected: output devices such as a display 304, which may be implemented as a touch-screen, and a speaker (or "loudspeaker") 310 for outputting audio signals; input devices such as a microphone 326 for receiving audio signals, a camera 308 for receiving image data, and a keypad 306; a memory 326 for storing data; and a network interface 324 such as a modem for communication with the network 201. The user device 204 may comprise other elements than those shown in FIG. 4. The display 304, speaker 310, microphone 312, memory 326, camera 308, keypad 306 and network interface 324 are be integrated into the user device 204. Alternatively, one or more of the display 304, speaker 310, microphone 312, memory 326, camera 308, keypad 306 and network interface 324 may not be integrated into the user device and may be connected to the CPU 302 via respective interfaces. One example of such an interface is a USB interface. If the connection of the user device 204 to the network 201 via the network interface 324 is a wireless connection then the network interface 324 may include an antenna for wirelessly transmitting signals to the network 201 and wirelessly receiving signals from the network 201.

Figure 3:
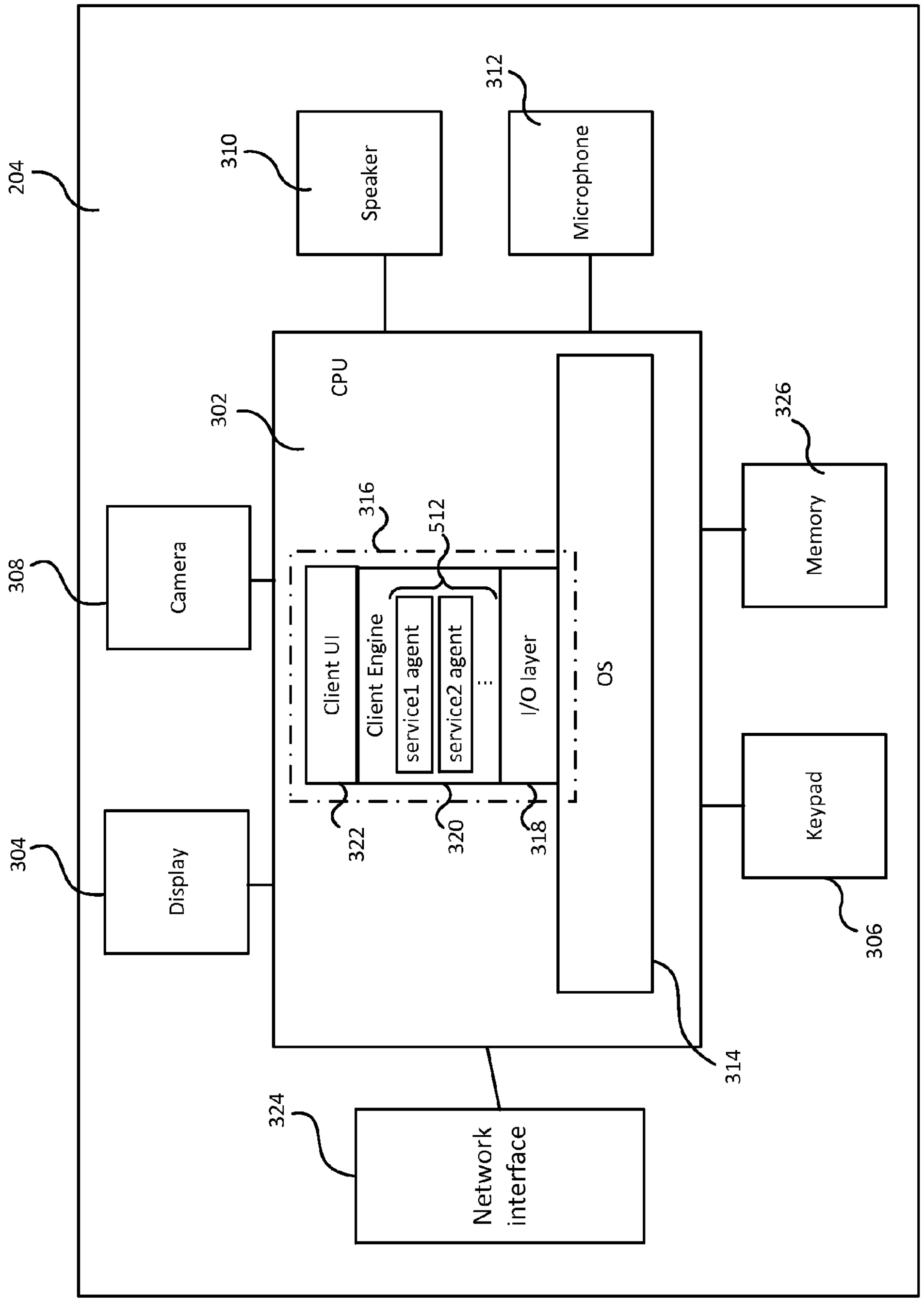
FIG. 3 is a schematic illustration of a user device.

FIG. 4 also illustrates an operating system ("OS") 314 executed on the CPU 302. Running on top of the OS 314 is a software stack of an 316 instance of a communication client application (client) of the communication system 200. The client 316 communicates with the operating system 314 and manages the connections over the communication system 200, including connections with other user devices and with datacentres 220. The client 316 has a client User Interface ("UI") which is used to present information to, and receive information from, a user of the device. The software stack shows a client protocol layer 418, a client engine layer 420 and a client user interface layer 422. Each layer is responsible for specific functions. Because each layer usually communicates with two other layers, they are regarded as being arranged in a stack as shown in FIG. 3. The operating system 314 manages hardware resources of the device 204 and handles data being transmitted to and from the network 201 via the network interface 324. The client protocol layer 318 of the client software communicates with the operating system 314 and manages the connections over the communication system 200. Processes requiring higher level processing are passed to the client engine layer 320. The client engine 320 also communicates with the client user interface layer 322. The client engine 320 is arranged to control the client user interface layer 322 to present information to the user via the user interface of the client and to receive information from the user via the user interface. In this way, the client 216 performs the processing required to allow a user (e.g. Alice, Bob) to communicate over the communication system 200.

The user interface may comprise, for example, a Graphical User Interface (GUI) which outputs information via the display 24 and/or a Natural User Interface (NUI) which enables the user to interact with a device in a "natural" manner, free from artificial constraints imposed by certain input devices such as mice, keyboards, remote controls, and the like. Examples of NUI methods include those utilizing touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems etc.

The client engine layer comprises a plurality of service agents 512. Each service agent handles a distinct aspect of a real-time media communication event (e.g. call). An agent means the endpoint/client logic implementation that defines how the endpoint interacts with a specific cloud service e.g. a call controller, for a call agent; a media modality controller, for a media modality agent etc. The agents may be embodied in a software library of the client.

Figure 4A:
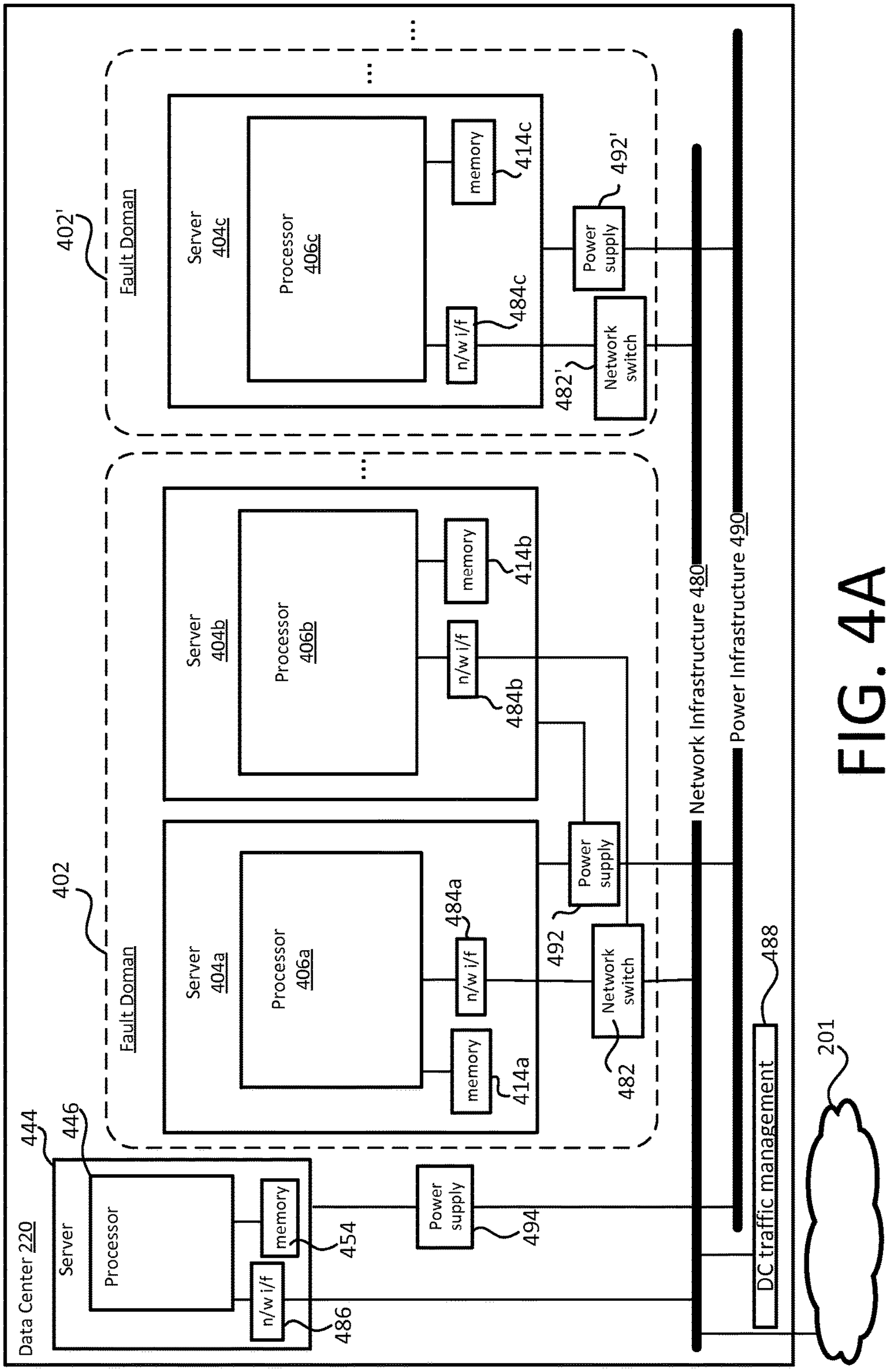
FIG. 4A is a schematic illustration of a datacentre.

FIG. 4A is a schematic illustration of a datacentre 220 (e.g. one of datacentres 220*a*, 220*b*, 220*c* . . . ). The datacentre comprises a plurality of servers 444, 404*a*, 404*b*, 404*c*; a network infrastructure 480, which is connected to the network 210, for exchanging data packets among networked devices within the datacentre 220 and with devices external to the datacentre via network 201; and a power infrastructure 490 for providing electrical power to devices of the datacentre. Servers 404*a*, 404*b* and server 402*c* are supplied with electrical power by a power supply 492 and a power supply 492 respectively, themselves supplied with electrical power from power infrastructure 490. The datacentre also comprises a data centre traffic management system 488 connected to network infrastructure 480 for receiving inbound traffic from network 201 directed to data centre 220 and distributing that traffic across servers 404*a*, 404*b*, 404*c*, and for distributing internal traffic from one server of the datacentre 220 (e.g. 404*a*) across other servers of the datacentre 220 (e.g. 404*b*, 404*c*). The DC traffic management system may comprise components such as hardware load balancers, software executed on a suitable computer system, or a combination thereof.

Each of servers 404*a*, 404*b*, 404*c* comprises a respective processor 406*a*, 406*b*, 406*c*, to a respective network interface 484*a*, 484*b*, 484*c* for exchanging data with other networked devices. Each processor has direct access to a respective memory 414*a*, 414*b*, 414*c*; to provide the processor access to data held in computer storage The network interfaces 484*a* and 484*b* are connected to a network switch 482 which enables servers 404*a* and 404*b* to transmit and receive data to/from one another and with any other servers (not shown) connected to that switch 482 via that switch 482 directly. Network interface 484*c* is connected to a network switch 482' which enables server 404*c* to transmit and receive data to/from any other servers (not shown) connected to that switch 482' via that switch 482' directly. Switch 482 is connected to the network infrastructure 480 which also enables servers 404*a*, 404*b* and any other servers (not shown) connected to switch 482 to transmit and receive data to/from other devices connected to the network infrastructure (e.g. devices so connected via other switches such as switch 582') and with further devices connected to network 201. Switch 482' is similarly connected to provide equivalent functionality.

Server 444 is a control server for the datacentre 220: it is responsible for control and monitoring of other servers in the datacentre. Control server 444 is supplied with electrical power from a power supply 495, itself supplied with electrical power from power infrastructure 490. Control server 444 comprises a processor 446 which is connected to a memory 454 and a network interface 486 for exchanging data with other networked devices. Network interface 486 is connected to the network infrastructure 480 which enables control server 444 to exchange data with other devices connected to the network infrastructure including servers 404*a*, 404*b*, 404*c* and with further devices (e.g. 204*a*, 204*b* in FIG. 3) connected to network 201.

The servers 404*a*, 404*b*, 404*c* are grouped into respective fault domains 402, 402', a fault domain being a group of servers that share a common point of failure (that is, servers which are dependent on the same physical electronic component for operation, failure of which thus inhibits operation of all those servers). For instance, servers 404*a* and 404*b* are connected to the network infrastructure 580 via network switch 482 which is common to both servers 408*a*, 408*b*; failure of this switch 482 causes failure of each of servers 404*a*, 404*b*, and any other servers connected to that switch in that all such servers become disconnected from the network infrastructure 480 and thus from network 201 in that event. Network switch 482 is therefore said to define a fault domain being a group of all servers connected to that switch 482. Similarly, servers 404*a* and 404*b* are both supplied with electrical power from power supply 492 itself supplied by the power infrastructure 409; failure of this power supply 492 causes failure of each of servers 404*a*, 404*b*, and any other servers supplied by that power supply 492. Power supply 492 thus defines a fault domain which is the group of all servers supplied by that power supply 492. In FIG. 4A, each server shown connected to switch 482 is also shown being supplied with electrical power by supply 492 thus switch 482 and supply 492 of FIG. 5A define a common failure domain 402; in general, servers supplied by the same power supply may be connected to different network switches and vice versa. Similarly, FIG. 4A shows a second fault domain 402' characterized by both network switch 482; and power supply 492'. Server 404*c* of fault domain 402' is shown connected to switch 482' and power supply 492'. Datacentre 220 comprises additional servers (possibly thousands) both in fault domains 202, 202' and in other fault domains characterized by additional network switches, power supplies and other physical components (not shown).

Figure 4B:
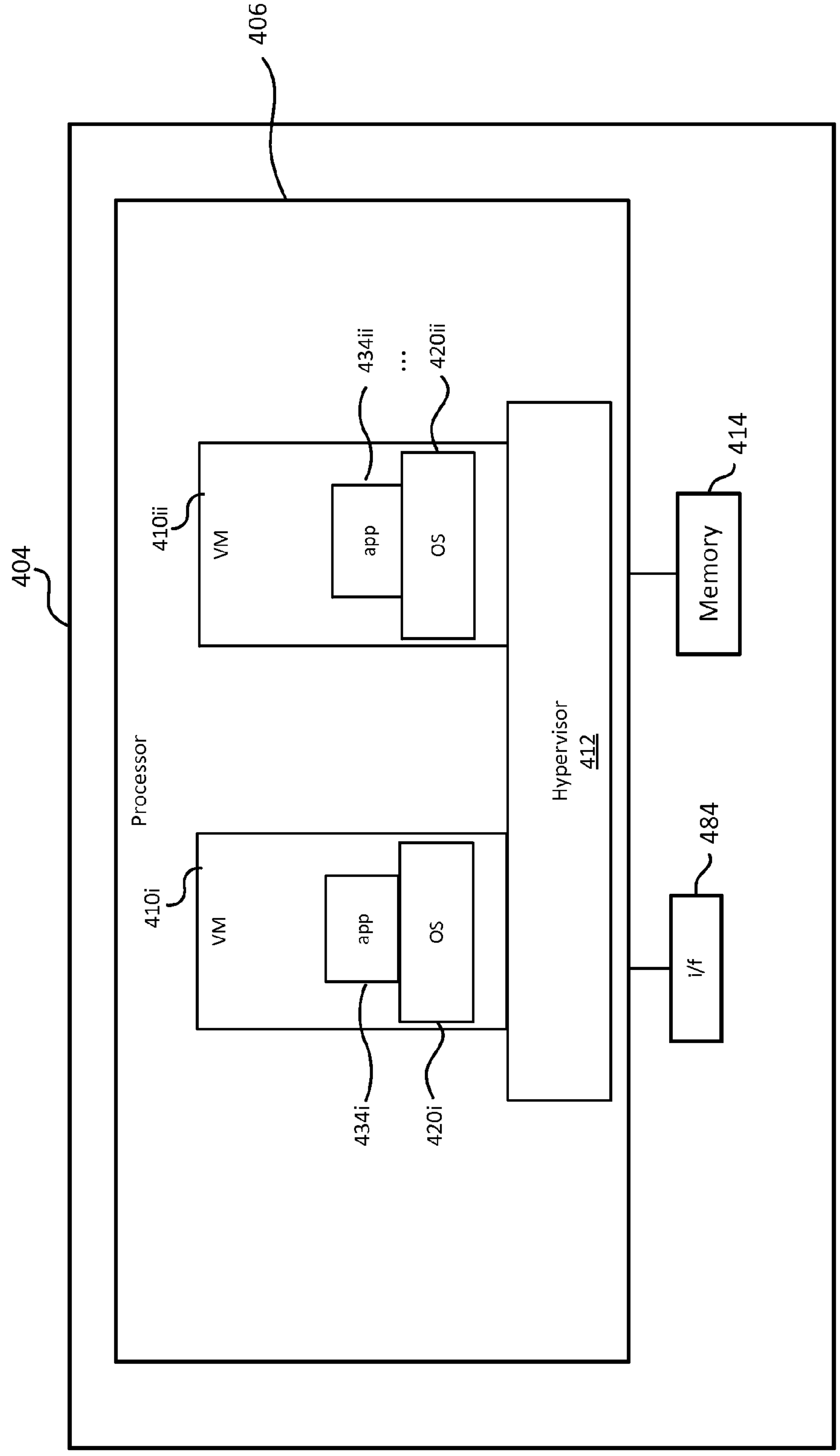
FIG. 4B is a schematic illustration of a server of a data centre.

FIG. 4B shows further details of a server 303 (e.g. 404*a*, 404*b*, 404*c*). The processor 406 (e.g. 406*a*, 406*b*, 406*c*) runs a hypervisor. A hypervisor is a piece of computer software that creates, runs and manages virtual machines 410*i*, 410*ii*. A respective operating system 420*i*, 420*ii* (e.g. Windows Server™) runs on each VM 410*i*, 410*ii* and, in turn, respective application code 410*i*, 410*ii* runs on each operating system 420*i*, 420*ii*. The application code can implement controllers e.g. call controller, media modality controller.

The processor 406 has a memory 414 (e.g. 414*a*, 414*b*, 414*c*), which is directly accessible by the processor 406. To run an instance of an application on the processor, the application code 410*i*/410*ii* is loaded into the memory 414*a*, 414*b*, 414*c* from external computer storage (i.e. external and indirectly accessible to the processor) so that the processor 406*a*, 406*b*, 406*c* has direct access to the application code in the memory 414. Corresponding runtime state data is also held in the memory 414 which is updated as the instance progresses, for instance as the instance processes messages received from the network 301.

Two instances of the same controller (e.g. call controller, media modality controller) are capable of delivering the same service (e.g. call control, media modality control) and are to some extent interchangeable so that different instances of a particular control may end up controlling the relevant aspects of the same communication event at different points in time. The communication system 300 is responsive to messages initiated to a particular controller (e.g. call controller, media modality controller), for instance by the corresponding agent 512 of the client 316 (e.g. call agent, media agent). Specifically, in response the communication system 300 assigns an instance of that controller to handle the message. To some extent, the instance is assigned by way of straightforward load balancing, but as explained below this is not always the case.

Below, the terminology "service logic" (equivalently "deployment") is used to refer to a particular group of instances which can deliver the same service e.g. call control, media modality control. Any two of these instances may be running on different processor, or they may happen to be running on the same processor. Each service logic has a hierarchical structure which will now be described with reference to FIGS. 6A and 6B. Typically, a controller will handle multiple, and possibly numerous, calls etc. simultaneously, with its resources shared amongst those various calls.

Figure 5A:
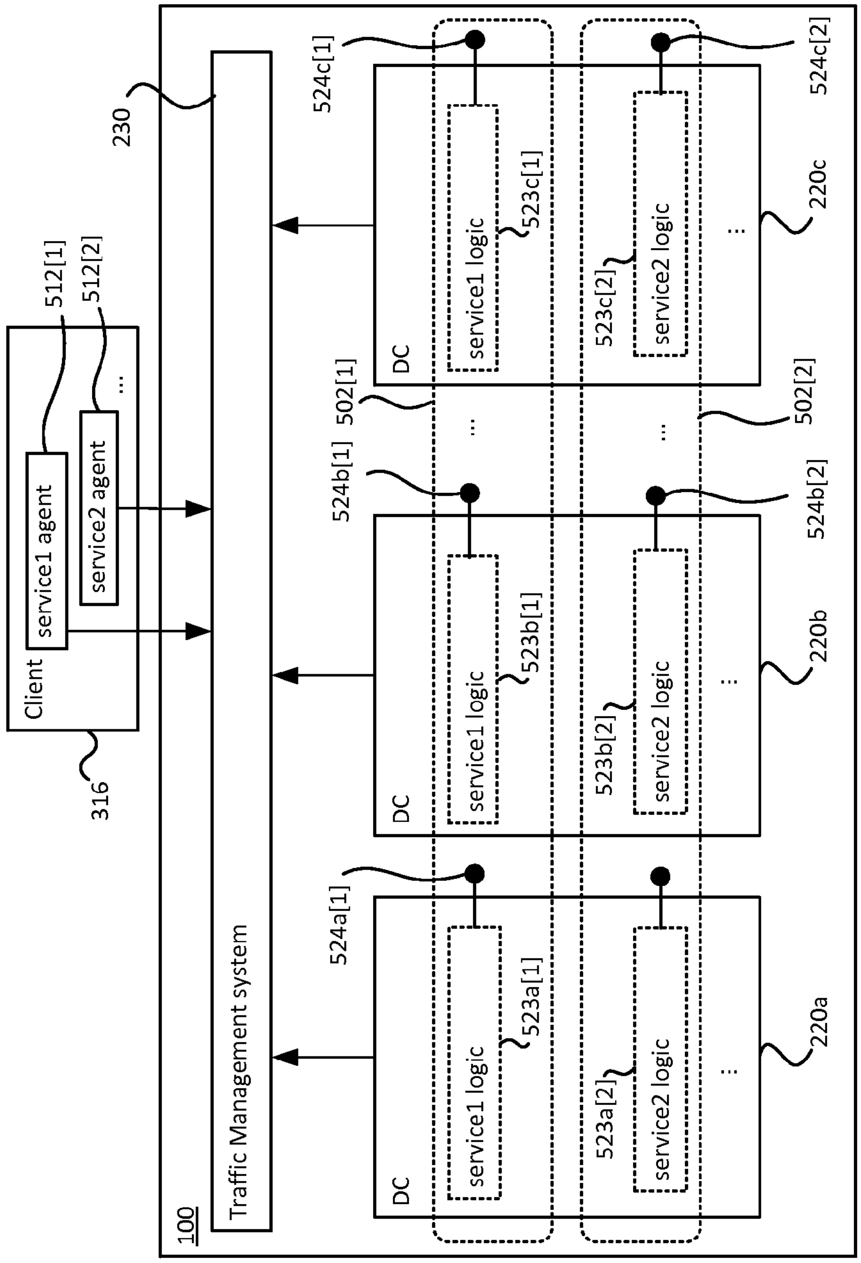
FIGS. 5A and 5B schematically illustrate principles of a hierarchical communication system architecture.

As shown in FIG. 5A, the cloud 100 is adapted to run at least a first group 502[1] of first service logics 523[1] of a first type (that is, capable of delivering a first service) and a group 502[2] of second service logics 523[2] of a second type (that is, capable of delivering a second service). The client 216 of user device 204 comprises service agents 512[1] (first type), 512[2] (second type) for each type of service. Service agent 512[1] can communicate via the network 201 with each of the first type of service logics 523[1] and service agent 523[2] can communicate via the network 201 with each of the second type of service logics 523[2].

Each service agent 512 and each service logic 523 can communicate with the traffic manager 230. Communication between service logics and their respective agents is, to some extent, mediated by the traffic manager 330. For example, when a call agent or media agent first requests a call control or media modality control service, the agent directs a request to the traffic manager, which selects a particular call control or media modality control logic based on appropriate criteria such as resource availability at the corresponding data centre, geographic location etc. Thereafter, the call/media modality agent can direct the relevant messages for a particular communication event to the selected call/media modality service logic.

Figure 5B:
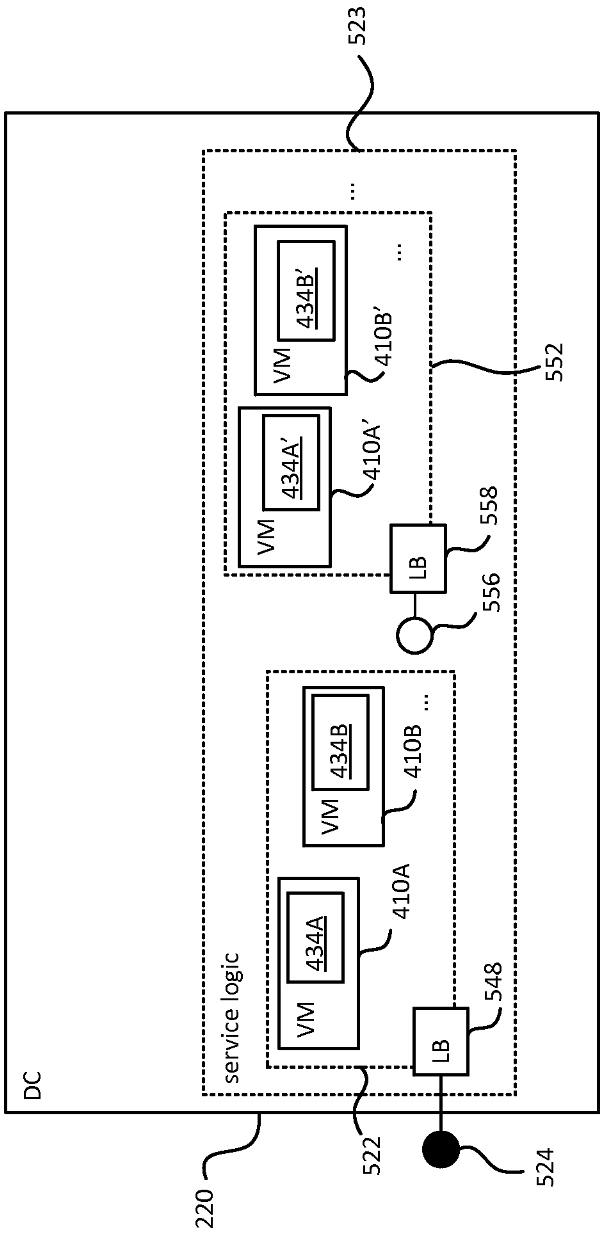

As illustrated in FIG. 5B, a service logic for delivering a particular service comprises one or more clusters 542, 552 which cooperate to deliver that service. Examples of clusters include web and worker roles implemented on a Windows Azure™ cloud platform. In this embodiment, each service logic is implemented at a single respective datacentre (e.g. one of 220*a*, 220*b*, 220*c*). Each clusters of a service logic comprises a load balancer 548, 558 and one or more virtual machines 410 executing a respective instance of application code 434. The load balancer of a clusters can receive messages from the network 201, and direct those requests to any one of the VMs of that clusters e.g. in a round-robin fashion or based on monitored resource availability of those VMs (e.g. directing an incoming request to the VM which currently has the most available resources). The load balancer of a cluster assumes that each VM of that cluster is equivalently configured to be able to process any message received by that load balancer.

FIG. 5B shows a service logic 542 comprising at least two clusters 522 and 552 having respective load balancers 548, 558. Cluster 542 comprises at least two VMs 410A, 410B. VM 510A executes an instance 434A of first application code and VM 410B executes another instance 434B of the first application code. Similarly, cluster 452 comprises at least two VMs 410A', 410B'. VM 410A' executes an instance 434A' of second application code and VM 510B' executes an instance 434B' of the second application code. Clusters of a service logic can be configured to expose one or more externally-addressable interfaces 524 and/or one or more internally addressable interfaces 556 which can be called in order to establish a logical connection for exchanging data with that cluster. Internal interfaces 556 are only accessible to other clusters of the same service logic, whereas external interfaces are accessible from outside of the cluster e.g. by the corresponding client-side service agents 512. An interface of a cluster is coupled to the load balancer of that cluster so that any requests directed to that cluster using that interface are received by that load balancer for forwarding to a VM of that cluster (this forwarding being invisible outside of that cluster). FIG. 5B shows cluster 552 exposing an external interface 524, which is coupled to the load balancer 548 of that cluster, and cluster 552 exposing an internal interface 556, which is coupled to the load balancer 558 of that cluster.

The resource allocation for any type of service (e.g. call control, media modality control) can be increased (resp. decreased) in one or more of the following ways:

- By deploying additional (resp. terminating existing) service logics of that type i.e. by allocating physical computer resources to a new service logic of the first type (resp. un-allocating computer resources for an existing service logic of that type)—one example of this would be deploying a new web application on a Windows Azure™ cloud platform;
- By increasing (resp. decreasing) a number of virtual machines within component(s) of one or more existing service logics of the first type i.e. increasing (resp. decreasing) a computer resources allocation for that component—one example of this would be altering a number of instances within a web-role or worker-role of a web application on a Windows Azure™ cloud platform;
- By increasing (resp. decreasing) a "size" of (that is a respective amount of physical resources allocated to) duplicate virtual machines within component(s) of one or more existing service logics of the first type i.e. increasing (resp. decreasing) respective computer resources allocated to each such duplicate virtual machine of a particular component—one example of this would be resizing a web-role or worker-role of a web application on a Windows Azure™ cloud platform.

Using the latter two techniques, resources can be allocated to one service logic independently (i.e. one deployment) from others—both of the same type and of different types. For instance, more VMs could be added to component(s) of a first service logic of a first type, and/or VMs of those component(s) could be re-sized, without altering component(s) of other service logics of that type and without altering component(s) of other service logics of different types.

Moreover, using the latter two techniques, resources can be allocated to different components of a same service logic independently from one another (e.g. adding VMs to, or resizing VMs of, one without altering the other).

0.2 Overview of System Architecture

Herein, the term "transaction" refers to a sequence of low-level operations which collectively implement a high-level control operation such as establishing a communication event, terminating an established communication event, or performing an in-call function such as: adding or removing a participant to/from an established communication event during the established communication event, placing an established communication event on hold, adding or removing a media modality (e.g. audio, video) to/from an established communication event during the established communication event etc. A transaction involves the transmission and/or receipt of one or more messages via the network 201 between the instances assigned to effect the transaction and the relevant agent 512 on the client.

In the embodiments described below, any one transaction is performed by the same instance of a controller. This is not a necessity; it is an optimization which makes the transaction processing time faster by reusing the resources and contexts that are created at the beginning of transaction. This does not appreciably compromise the high availability of the system, because transactions are fairly short lived, and there is very low probability of a processing instance dying whilst it is handling an ongoing a transaction.

It is nonetheless possible to forego that optimization (in favour of high availability), and allow any instance to handle mid-transaction messages—to achieve this, after processing each message, the call controller instance flushes the call state to external store; before processing a new message, the processing instance receiving the new message fetches the state from external store, recreates the call state, and re-initializes any other resources that may be needed (for example TLS/TCP connections to the client).

Below are presented:

1. a signalling protocol which enables communication between client agents and controllers (section 1);
2. mechanisms for serializing state data of a communication event so that different instances of a controller can handle different transactions (section 2)
3. mechanisms for ensuring that each single transaction is handled by the same instance of a controller where possible (section 3).

Note that mechanism "2." above can, in embodiments in which multiple instances handle the same transaction, be used to allow different instances to process messages pertaining to the same transaction.

For example, in FIG. 5B, the first cluster 522 of service logic 523 may implement a primary control service (e.g. call control, media modality control). The second cluster 552 can then implement a secondary service to support the primary control service, such as a data storage service implemented by the second code running on each VM in the cluster being configured to provide an interface for accessing computer storage, which is shared amongst the cluster. Call/media modality controller instances 434A, 434B can then write serialized state data to the second cluster 552 at the end of a transaction for a particular communication event, which is accessible to other instances of the first cluster 522 so that they are able to handle future transactions for the particular communication event.

Figure 6:
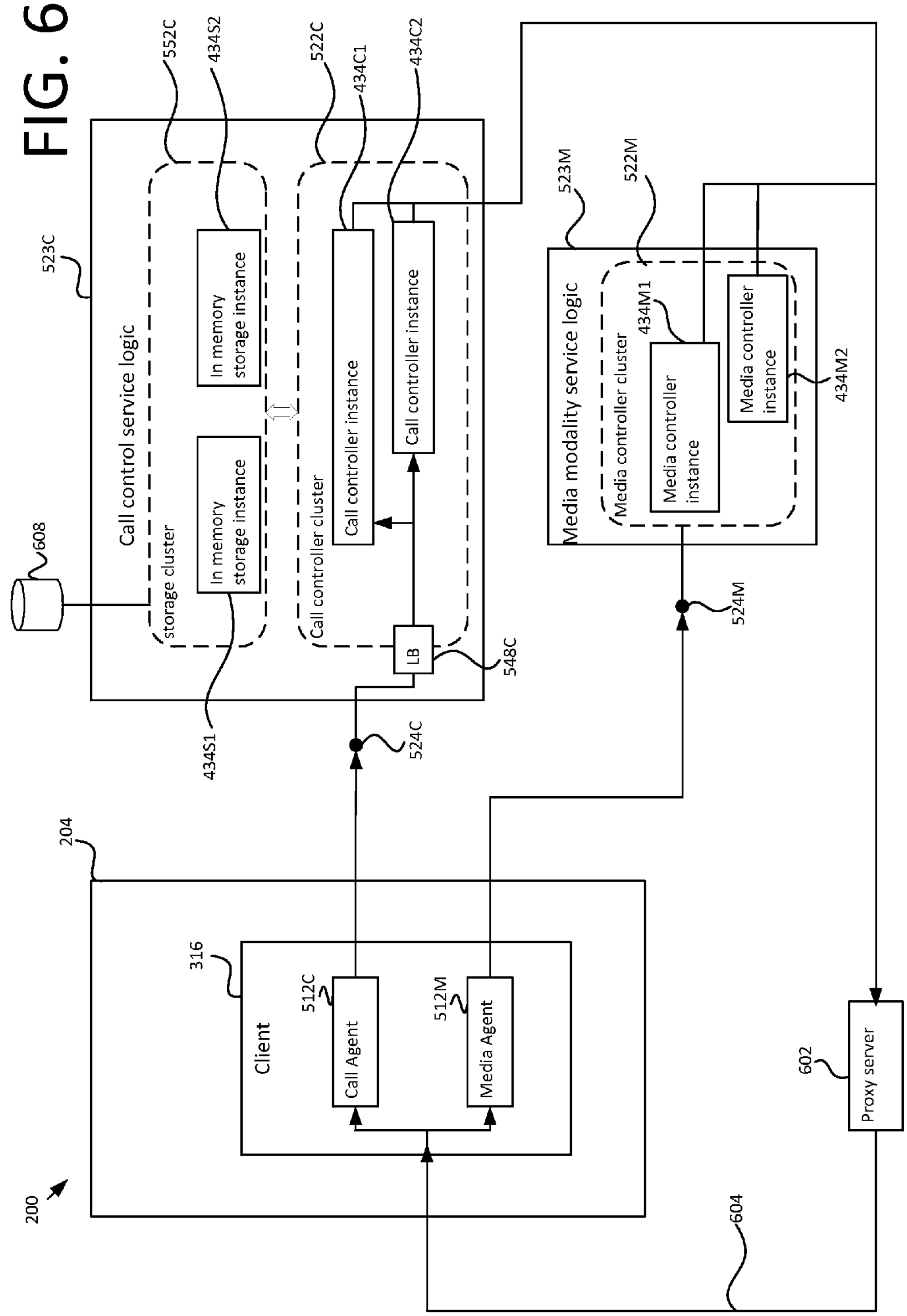
FIG. 6 shows a communication system in a particular configuration.

FIG. 6 shows an exemplary configuration of the communication system 200. A client 316 comprises a call agent 512C and a media agent 512M.

A call agent 512C can direct instigate messages via the network 201 to an external interface 524C of a call controller cluster 522C of call control service logic 523C. The call controller cluster comprises multiple instances 434C1, 434C2 of the call controller. A load balancer 548C of the call controller cluster 522C selects, for each message, one of the call controller instances and directs message to the selected instance. The selected instances handles the message in the manner described below.

The call control service logic 523C also comprises a storage cluster 552C, comprising one or more instances 434S1, 434S2 of data storage software e.g. Azure Table Store etc. The data storage software instances 434S1, 434S2 provide access to computer storage 608. The storage cluster 552C is accessible to the call controller cluster 522C via an internal interface of the former (not shown in FIG. 6, but as described above).

A media agent 512M can instigate messages via the network 201 to an external interface 524M of a media modality controller cluster 522M of media modality control service logic 523M, which are similarly directed to a selected media modality instance 434M1, 434M2 in the cluster 522M.

An open i.e. ongoing connection 604 is established between the client 31 and the proxy server 604. The connection is a WebSocket connection, which provides full-duplex communication between the proxy server 602 and the client device 204. WebSocket connections are known in the art. The instances of the call controller 434C, 434C2 and media modality controller 434M1, 434M2 can signal the call agent 512C and media agent 512M respectively via the proxy server 602. This enables the controller instances to direct messages to their corresponding agents even if the client device 204 is behind a Network Address Translator (NAT) or firewall.

Call controller can establish a communication event (conversation) e.g. a call, and can manage an established conversation; it is responsible for signalling to effect the following:

1. Call setup;
2. Renegotiation e.g.:
   a. Hold/un-hold;
   b. Add/remove video or other media modalities, such as screen sharing or shared whiteboard;
3. Call tear down;
4. Call related roster updates. Roster means the information about various endpoints which are participating in the call. Using this information, clients can provide a UI with e.g. a list of participants in the call, and can allow operations to e.g. remove a call participant ("Remove Participant"), mute a call participant ("Mute Participant") etc.

The call controller may also bootstrap and control media modality services by media modality controller instances, though in some embodiments the media modality controller is only used for group calls.

1. Signalling Protocol:

Below are presented mechanisms for signalling between call agents and call controller instances. These are described in the context of the call controller, but some of the underlying principles can be applied to other types of cloud services (e.g. to a media modality controller).

The protocol provides:

1. Use of callback links as the mechanism to send messages to drive state machine on both client and server (e.g. call controller);
2. Use of url re-writing (by call controller) to create intercepting server which can provide security (by hiding routing details of involved parties from each other), and also ensure that call remains in a consistent state;
3. Use of url re-writing to allow creation of proxies which can add new functionality by adding or updating urls (see section 1.4, below);
4. Use of url re-writing to transparently provide high availability. Different callback links can point to different entities, which can scale independently without breaking the clients as the clients treat callback links as opaque. Similarly, the entity providing callback links (like Call Controller) can make it point back to the datacentre, or to any particular instance based upon its logic, and thus achieve high availability transparently without clients having any special logic. This differs from other technologies like SIP which require all messages to be sent to fixed entities, thus compromising scalability and availability In contrast to SIP, the present protocol uses HTTP which has widespread support on all the client platforms, and does not require the creation of a custom client side stack to enable development of client. This allows for easier third party development, and opens avenues for easy integration with other solutions.

The protocol defined messages which allow:

1. Call setup
2. Call teardown
3. Forking to multiple endpoints
4. Call redirection
5. Media renegotiation
6. Call Transfer (both basic and consultative)
7. Addition of new participant
8. Dial-In of participants into an ongoing call
9. Roster Management Provided is a method for establishing a real-time communication event between a first user (caller e.g. Alice) of a first client device and second user (callee e.g. Bob) of second client device via a communication network. The method is implemented by a first client running on the first client device.

A first phase of a communication event (e.g. call) establishment procedure is performed the client by transmitting a message to the other client device via the network. The message includes multiple options pertaining to a second phase of the communication event establishment process yet to be performed.

For example, the first phase may be an initial phase, which is instigated in response to the first user selecting an option via the user interface of the first client to initiate a call to the second user. The second phase may that in which the call is either e.g. established (if Bob accepts the call), or in which the procedure is terminated (if Bob rejects the call).

The message comprises, for each of the multiple options, a different network address unique to that option which can be accessed to select that option, and the manner in which the second phase progresses is determined by which of the different network addresses is accessed. That it, the method comprises the first client detecting that the network address unique to one of the multiple options has been accessed, and instigating the second phase of the communication event establishment procedure in accordance with said one of the multiple options.

In the following, the network addresses are URIs (Uniform Resource Indicators), whereby each option is associated with a different URI unique to that option. That is, Alice's client provides a different URI for each option relating to the second phase of the procedure. The URIs point to a proxy server, with which Alice's client has a full duplex WebSocket connection, and the server signals to Alice's client when the relevant network address has been accessed so that Alice's client known which option has been selected. The use of the proxy is useful e.g. when Alice's client is behind a NAT or firewall and is thus not directly addressable itself, although in some cases it is still possible for the URI to point to Alice's client device directly.

A network address e.g. URL being unique to an option means that URLs relates to one of the option and not to any of the other options (e.g. such that the end_Alice_url URL would never be used to try and accept or redirect the call etc.).

For example, the URIs may be URLs (Uniform Resource Locators), otherwise known as Web addresses or links.

The messages are not sent to Bob directly, but are sent via an instance of the call controller. The call controller instance rewrites the URIs in the message before transmitted them to Bob. The rewritten URIs point to the call controller instance's cluster, rather than to Alice's proxy server (or device), which provides added security as Alice's proxy (or client) never becomes directly visible to Bob's client.

A URI, which may point to Alice's proxy (or device) or to the call controller cluster, may be accessed by posting a content to the URI, or deleting content at the URI. Content is posted using the so-called POST request method, and deleted using the so-called DELETE request method, which are part of the well-established HTTP protocol. A POST request requests that a web server accept the data enclosed in the request message's body for storage, and a DELETE request instigated to a URL requests the deletion of content at that URL. That is, an option is selected by instigating a particular request (e.g. post, delete) to the URI uniquely corresponding to that option. Where a URI has been rewritten by the call controller instance, Bob's response will be posted to the rewritten URI (pointing to the call controller instance's cluster), and the original instance or another instance in the call controller cluster will rewrite Bob's response to the original URI provided by Alice's client. Bob's response may also comprise a URI(s) pointing to a proxy server to which Bob's client has a similar connection (or to Bob's device directly). In this case, the original instance or the other call controller instance rewrites Bob's URI(s) to point to the call controller cluster instead in a similar fashion.

A call controller instance can also provide URLs in messages which it generates i.e. which originate with the call controller instance. These may be posted to URIs provided by Alice/Bob's clients as appropriate which point to Alice/Bob's proxy.

Alice's client may first obtain a URI of the traffic manager at which to post an initial call invitation request message (CallInvitationRequest) from the traffic manager, which assigns a call controller cluster in the manner described above. Thereafter, messages may be posted to a URI of the cluster by Alice/Bob's client, which will cause the load balancer of the clutter to select a call controller instance in the cluster, and forward the message to the selected instance.

For messages posted to the call controller cluster that relate to a transaction that is currently in progress, mechanisms are provided in section 3 to ensure that the particular call controller instance handling the in-progress transaction receives the message, even if it initially lands on a different instance in the cluster. The same mechanism is used to ensure that if multiple transactions happen concurrently for the same call, both of these transactions are handled by same instance, even if one of the message lands on a different instance. This ensures that there is only one entity which modifies the call state, and therefore there is no chance of inconsistency or corruption of the state that could otherwise result from multiple writers.

For messages posted to the call controller cluster that initiate a new transaction which nonetheless relating to an existing (i.e. already-established) communication event (e.g. to add a participant, terminate the communication event etc.), mechanisms are provided in section 2 that enable any call controller instance in the cluster to handle the new transaction. In brief, a call controller instance, when handling a previous transaction(s), provides a callback URL(s) to the client, which comprises a "factory object identifier" and a "persisted object identifier". The identifiers relate to a call state of the communication event which been written (in a serialized format) to the computer storage shared amongst the cluster. The callback URL points to the cluster. When a client posts a message to the callback URL to initiate a new transaction, the presence of these two identifiers in the URLs provides sufficient information for any instance in the cluster to be able to handle the new transaction relating to the existing communication event using the serialized data. This will be explained in detail in section 2.

Each call is associated with a call unique ID, which is included in a callback URL pointing to a call controller cluster. This enables the processing instance to perform some optimizations in the manner that it reads or writes external from/to external store as explained in detail in section 2.

Note that the choice of URL itself (not just any content of a message posted to the chosen URL) provides information to the original provider of the URL. E.g., in a simple example, call controller could post an empty message to https://proxy.io/Alice/CallID/Accept to indicate that Bob has accepted a call invitation, and an empty message to https://proxy.io/Alice/CallID/Reject to indicate that Bob has rejected a call invitation. These URLs point to Alice's proxy, and will have been provided by Alice's client when sending the call invitation request message. In the examples below, however, supplement information is provided in the content of the messages.

Figure 7:
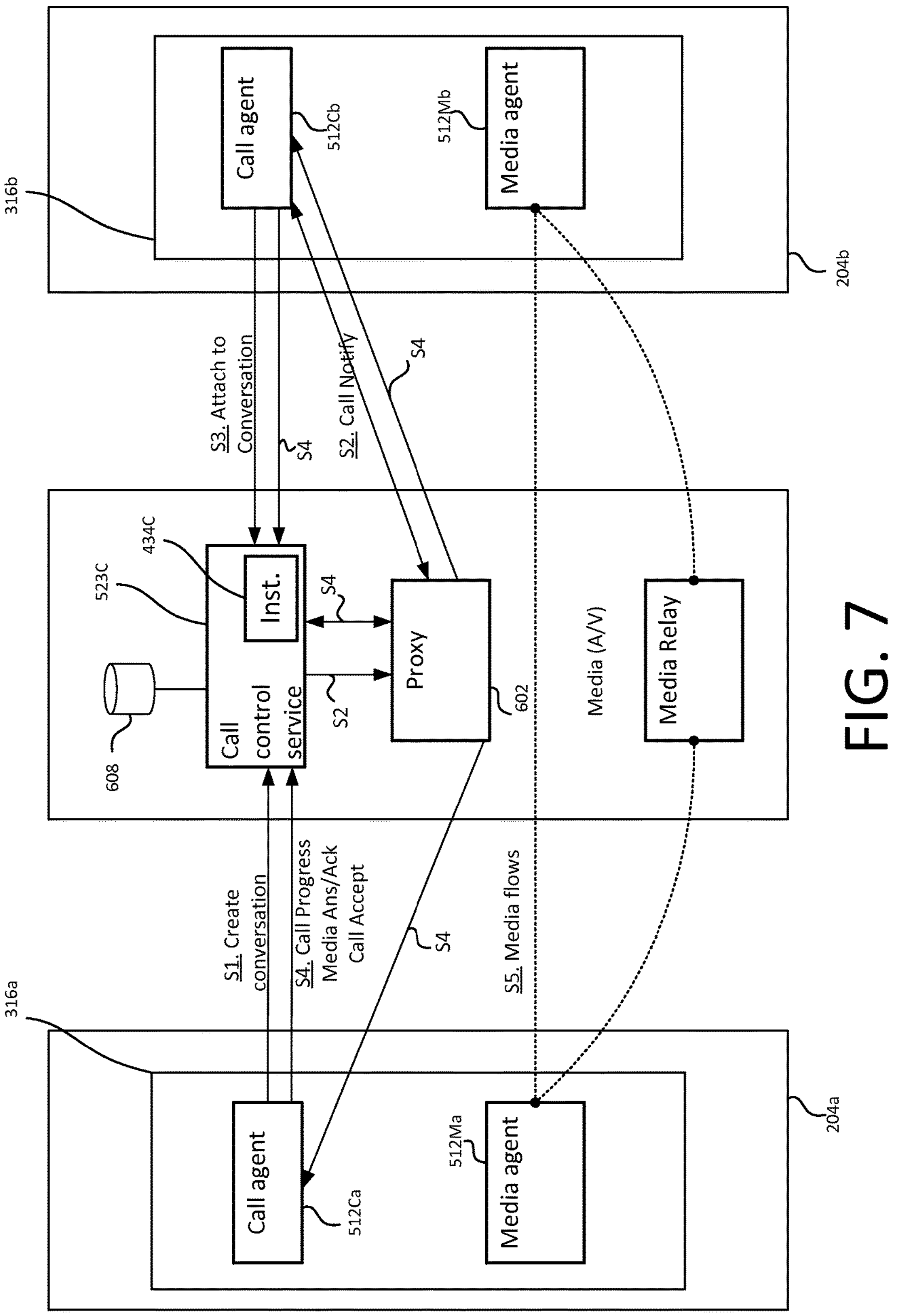
FIG. 7 is schematic overview of a call establishment procedure.

FIG. 7 shows an overview of a successful call establishment procedure for a call between Alice (caller) 202*a* and Bob (callee) 202*b*, instigated by Alice 302*a* in this example.

In the following examples, Alice and Bob's client have connections to the same proxy 602. In practice, they may use different proxies.

A call agent 512Ca of Alice's client 320*a* instigates (S1) a call creation request message (CallInvitationRequest), which requests a call control service to call control service logic 523C ("CC" hereafter) e.g. discovered using traffic manager 232. A call controller instance 434C is assigned to handle the request by load balancing. The request identifies Bob a desired call participant, and the allocated call control service logic 434C instigates a call notification message to Bob's call agent 512C of Bob's client 320*b*. The notifications transmitted via the proxy 602 to Bob's device (S2). Bob is notified via his client UI e.g. by the UI entering a ringing mode, and in response to Bob selecting to join the call, Bob's call agent instigates an attach request to CC (S3), responsive to which Bob is attached to the call. At S4, Call progress requests, media answer requests and media acknowledgement responses, and finally call acceptance requests and call acceptance acknowledgment responses are transmitted and received between Bob and Alices' call agents 512Ca, 512Cb via the hub/proxy to, among other things, negotiate media parameters for the call so that media can flow between media agents 512Ma, 512Mb of the clients (S5), which does not involve a media modality controller in this example. Call media does not flow via the call controller, and need not flow via the cloud at all; it may for instance flow via a peer-to-peer connection, media relay connection, or some other overlay network connection. A Media Relay is an entity which allows clients behind NATs and Firewalls to exchange media packets with other entities. It does so by having a publically accessible IP address, and relaying all media packets to/from the hidden client via that address. This is analogous to the manner in which the proxy 602 permits clients behind NATs/firewalls to perform signalling (the media relay is to media what the proxy 602 is to signalling).

Media answer and media answer acknowledgement help create what is referred to as a provisional media flow. Provisional media flows are created between the caller endpoint and all of callee endpoint(s). There may be multiple callee endpoints for instance if the callee is logged on at multiple user devices. This happens before painting (outputting) the "ringing" UI on callee, so that as soon as the callee picks up the call, she can start talking without having to wait for media setup. The media acknowledgement ensures that callee endpoint does know that the media answer that it sent has indeed been seen and processed by the caller client, and thus it can be certain that the media flow has started. Additionally, the client uses mediaAcknowledgement as a trigger to ensure that mediaAnswer was indeed seen by Caller endpoint. It can resend mediaAnswer if it does not see mediaAcknowledgement within a reasonable time (e.g. 15 seconds).

CallAcceptance is used (among other things) as a signal to cancel ringing of any endpoints which did not pick up the call, and to terminate media flow with them.

CallAcceptance also serves as the mechanism for:

1. Callee client to send its mid-call callback URLs to CC
2. Call Controller to send mid-call action URLs to caller CallAcceptanceAcknowledgement is used for:

1. Caller endpoint to send its mid-call callback URLs to CC
2. CC to send mid-call action links to callee endpoint Additionally, client also uses CallAcceptanceAcknowledgement as a trigger to ensure that CallAcceptance was indeed seen by Caller endpoint. It can resend CallAcceptance if it does not see CallAcceptanceAcknowledgement within a reasonable time (e.g. 15 secs).

S1-S4 constitute a single transaction i.e. to establish a communication event. A single instance of the call controller 510C is assigned to control the whole transaction S1-S4, in response to the initial CallInvitationRequest. To ensure that mid-transaction messages land on the same instance of Call Controller, the URLs relating to that transaction point back to a specific instance of the cluster, rather than to cluster load balancer. URLs relating to different transactions point to the load balancer.

This involves creating a call state for the communication event, and updating the call state as the procedure progresses. Once the call has been established, the call state is stored to computer storage 608 in the manner described above, where it is accessible to the other call controller instances in the call controller cluster. As explained below (in section 2), the call state is serialized so that it can be stored in this manner at the end of the call establishment procedure. The call controller instance 510C is then released from this assignment i.e. released from controlling the communication event. Here "released" means that the physical resources (processing resources, memory resources) of the processor on which the instance 434C is running that were previously occupied to effect S1-S4 become available again. In the examples below, this happens once the runtime state of the instance has been serialized and stored, so that another instance can recreate the runtime state and thus resume delivery of the relevant service (see section 2).

Various exemplary signal flows will now be described to aid understanding of some of the principles underlying the present teaching.

1A. URLs:

Note the following notation is used to represent a URL:

<operation>_<pointsTo>_url where "operation" denotes the operation to which the URL relates, and "pointsTo" indicates which entity the URL points to i.e. which entity ultimately detects and acts upon accesses to that url. In the below <pointsTo> is

- "Alice" for URLs that point to Alice (i.e. Alice's proxy or device);
- "Bob" for URLs that point to Bob's proxy (i.e. Bob's proxy or device);
- "CC" for URLs that point to a call control service logic—either to a specific instance or to the load balancer.

The examples below relate to a two-party call. In the context of a two-party call, <pointsTo> is of the form "CC<user>" for URLs that point to the call control service logic (CC), but which are mapped by the call control service logic to a URL pointing to <user> e.g. Alice, Bob (see next section).

1B. URL "Rewriting":

As noted above, CC rewrites URLs which point to endpoints in messages with URLs pointing to itself. When CC replaces an original URL pointing to <user>—i.e. <operation>_<user>_url—with a new URL pointing to itself—i.e. <operation>_CC<user>—it stores a mapping between the original URL and the new in a manner that is invisible to the clients. Thus, whenever an access operation (e.g. post, or delete) is performed on the new URL <operation>_CC<user>, this is detected by CC, and in response CC retrieves the original URL <operation>_<user>_url from storage, and performs an appropriate operation on the original URL operation>_<user>_url.

So, for instance:

if a message from Alice to Bob:

- contains a first URL <operation1>_Alice_url i.e. pointing to Alice, and
- is posted to a second URL <operation2>_CCBob_url i.e. pointing to CC but mapped at CC to a fourth URL <operation2>_Bob_url i.e. pointing to Bob in a manner that is invisible to Alice;

then:

- CC modifies the message by replacing the first URL with a third URL <operation1>_CCAlice_url—now pointing to CC (not Alice), and
- post the modified message to the fourth (not second) URL <operation2>_Bob_url—pointing to Bob.

In this manner it can be ensured that Bob never has direct visibility of any URL pointing to Alice, and vice versa i.e. the rewriting is all that is needed to ensure that Alice and Bob's agent always use CC as a communication intermediary.

The protocol enables all communication between the clients and call controller to operate on a request-response basis—thus, in accordance with the protocol there is no need for the client to maintain any kind of open connection to the call controller e.g. in the way that they do to the proxy server(s).

In these particular examples, posting (resp. deleting) means using the HTTP POST (resp. DELETE) method.

The protocol disclosed herein provides flexibility for clients. A client is free to choose whatever URLs it wishes to use in the various messages—provided each URL is accessible by the other relevant entities (client(s), controllers etc.), and is unique to the operation which that URL represents so that the client know which operation is being requested when any given URL previously provided by itself is accessed (i.e. provided the URL encodes sufficient context to be unambiguous). In other words, it is the client's own responsibility to select URLs so that it does not give rise to later ambiguity when a URL is accessed. As mentioned, the URL rewriting provides a layer of security between caller and callee by ensuring that the callers URLs are never directly visible the caller and vice versa. This releases the clients from the burden of having to maintain security over their URLs they are only every revealed to a trusted entity (i.e. call controller).

Figure 8A:
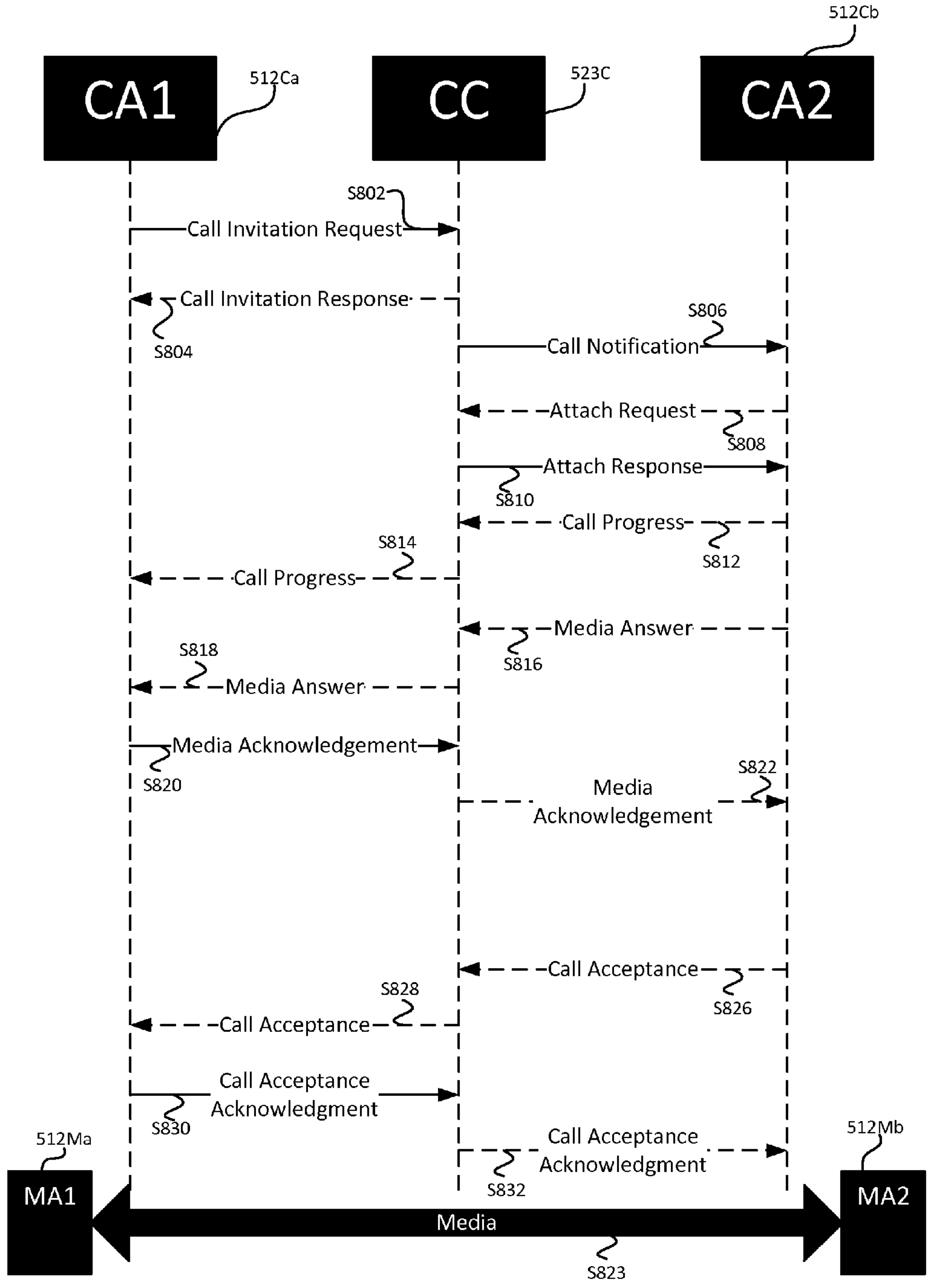
FIG. 8A is are signalling diagrams for a call establishment procedure.

1.1. Exemplary Signal Flows:

1.2.1 Call Setup Signal Flow (in which a Call is Accepted by a Callee):

The signalling flow for the successful call setup procedure of FIG. 7 is shown in more detail in FIG. 8A. A successful call setup between two call agents involves the following steps.

At step S802, Alice's Call Agent 512Ca (CA1) sends a call invitation request message (CallInvitationRequest) to CC. Specifically, CallInvitationRequest is posted (i.e. sent using a post request such as HTTP POST) to a call URL (call_url) of CC, which may e.g. be discovered using traffic manager 232, and possibly through further negotiation e.g. to discover call controller version compatible with Alice's client. The very fact that a message has been posted that particular URL tells CC that the new call is desired irrespective of the content of the message, though the content of the message does contain additional information for establishing the call.

In particular, the call invitation request comprises an identifier (e.g. username) of the callee (Bob), and indicates that the callee is a desired participant. The message may comprise identifiers of other desired participant(s) for a group call. The message also identifies which media modalities Alice's client can support e.g. it may indicate that Alice's client can support audio and video, just audio etc.

The call invitation request comprises the following links (callback links) i.e. URLs:

- progress_Alice_url: a call progress URL for Alice—used to proceed with establishing the call (see S814);
- mediaAnswer_Alice_url: a media answer URL for Alice, used to proceed with establishing the call (see. S818);
- acceptance_Alice_url: a call acceptance URL for Alice—used to finally accept the call so that call media can flow, accessed e.g. in response to Bob selecting to accept i.e. "picking up" the call (see S828);
- redirection_Alice_url: a call redirection URL for Alice—used redirect the call, automatically or in response to a selection by Bob (see S842, FIG. 8C);
- endNotification_Alice_url: an end call notification URL for Alice—used to notify Alice's endpoint about end of the call, either because it was not accepted by Bob, or because Bob hung up after accepting the call (see S836, FIG. 8D).

These URLs are all different from one another, but all point to Alice's proxy server. For example, they may be of the form https://proxy.io/<Alice's username>/<*> where <*> represents different context identifiers identifying different operations.

Step S802 constitutes a first phase of the call establishment procedure, from the perspective of CA1.

The message may also carry any data needed for media negotiations e.g. codec negotiations, such as information pertaining to the media capabilities of Alice's client/device. The message may also contain other useful information, such as a participant update callback link (update_Alice_url). This is a URL of Alice's proxy, to which CC can post an updated list of call participants should this information change.

At S804, CC responds to CA1's call invitation request with a call invitation response message (CallInvitationResponse), which comprises the following callback links for Use by CA1:

- call_CC_url: an call URL which represents the entire call—can be used to terminate the call completely
- callLegAlice_CC_url: an end call leg URL which represents the leg of the call between Alice and CC—can used to remove Alice as a call participant;
- participantInvitation_CC_url: a URL for CA1 to add more participants.

These URLs point to CC.

The response is an HTTP response, with a "201 Created" status code indicating a successful POST by CA1 at S802.

At step S806, CC transmits a call notification message (CallNotification) to the callee's call agent 512Cb (CA2). The call notification comprises:

- an attach URL which CA2 can use to attach to the call (attachBob_CC_url): used at S808.

The message is transmitted using the identifier included in the call invitation request of S802, and goes via Bob's proxy.

In various mobile scenarios, endpoints may not have any registered proxy callbacks to receive incoming call notification. But they may have other ways of being notified—for example WNS for windows modern/phone, Google Push Notification for Anroid, APNS for iOS. The CallNotification may be appropriately re-formatted and sent over the various PUSH channels that Bob's endpoints have registered. Once endpoints receive the PUSH notification, they will be woken up by the appropriate OS, given the notification Blob, which they can interpret, and act accordingly, which in this case means:

1. establish a connection to Proxy, if one does not already exist;
2. send a Attach request on the attach_CC_URL.

In response, at step S808, CA2 posts an attach request message (AttachRequest) to attachBob_CC_url included in the CallNotification of S806—note that this is automatic, and not dependent on e.g. the Bob selecting to accept the call. The attach request comprises:

- a URL pointing to Bob's proxy server, to which CC can post a notification if Alice terminates the call (callNotification_Bob_url)—see S848.

At step S810, CC responds with an attach response message (AttachResponse) which contain all data needed to take the call negotiation further.

The attach response message is an HTTP response with "200 OK" status code.

Figure 9:
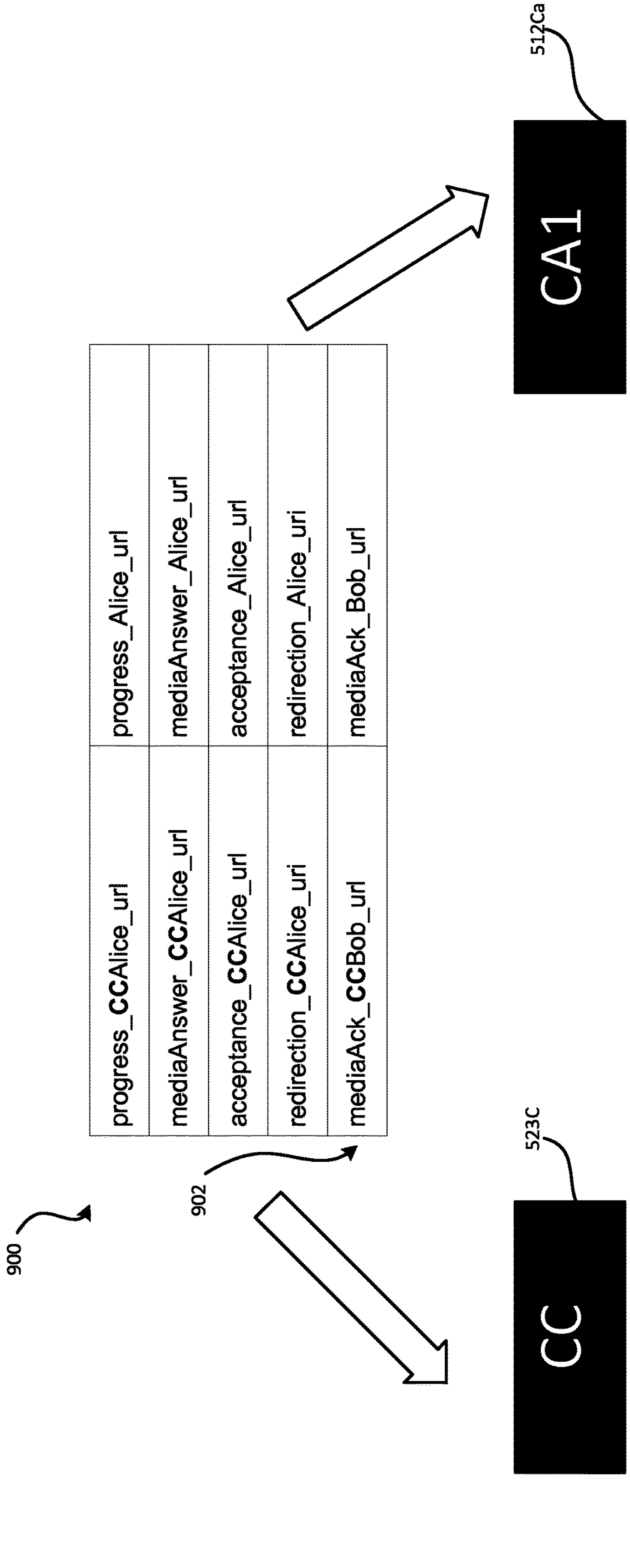
FIG. 9 is a schematic illustration of a set of URI mappings stored by a call controller deployment.

The Attach response contains the following URLs:

progress_CCAlice_url mediaAnswer_CCAlice_url acceptance_CCAlice_url redirection_CCAlice_uri Note the presence of "CC" in all of the above—these URLs are generated by CC in accordance with the URL "rewriting" procedure described in section 1B, and correspond to the URLs:

progress_Alice_url mediaAnswer_Alice_url acceptance_Alice_url redirection_Alice_url provided to CC by CA1 at S802 in the CallInvitationRequest message. set out in detail in section 1B above. CC stores mappings 900 between Alice's original URLs and the replacement URLs generated by CC accordingly, which is illustrated in FIG. 9.

The AttachResponse message of S810 constitutes a modified version of the CallInvitationRequest message of S802.

As mentioned above, the CC urls will map to Alice's URL only in a two party call.

For a multi-party call, CC uses the media controller to handle the negotiation.

It also contains:

call_CC_url—representing the entire call (as provided to Alice at S804);

callLegBob_CC_url—representing the leg of the call between CC and CA2 (equivalent to callLegAlice_CC_url provided to Alice at S804).

At step S812, CA2 then proceeds to send a call progress update message (CallProgress) to CA1 via CC. The message may for instance indicate that Bob's client has now entered a ringing state.

The call progress update is posted to progress_CCAlice_url and is thus received by CC. The call progress message does not include any URLs in this example, therefore its contents are not rewritten by CC. CC accesses the mapping 900 to retrieve progress_Alice_url, and posts the message to that URL unmodified so that it is received by Alice (S814).

At step S816, CA2 then sends a media answer message (MediaAnswer) that it generated in response to a media offer received in CallNotification or AttachResponse. The media answer message is posted to mediaAnswer_CCAlice_url, and comprises the following callback URL pointing to Bob:

mediaAck_Bob_url, used at S822 below

Because mediaAnswer_CCAlice_url points to CC, it is received by CC. Because mediaAck_Bob_url included in MediaAnswer points to Bob, CC generates a new URL mediaAck_CCBob_url which points to CC, and modifies MediaAnswer to replace mediaAck_Bob_url with mediaAck_CCBob_url. CC accesses the relevant mapping 900 to retrieve mediaAnswer_Alice_url (no CC), and posts the modified MediaAnswer to mediaAnswer_Alice_url (S818). CA1 now has the URL mediaAck_CCBob_url.

CC creates a new mapping 902 for use at S822, which maps mediaAck_CCBob_url to mediaAck_Bob_url (no CC).

At step S820, after processing the media answer, CA1 sends a media acknowledgment message (MediaAcknowledgement) to CA2 (S820). MediaAcknowledgment is posted to mediaAck_CCBob_url received at S818, and is thus received by CC.

MediaAcknowledgment does not include any URL pointing to Alice in this example, so at S822, CC posts (S822) MediaAcknowledgment unmodified to mediaAck_Bob_url (no CC)—the latter retrieved from the mapping 902.

MediaAcknowledgement tells Bob's endpoint that Alice received the MediaAnswer, so media setup is considered successful, and a "ringing" UI can be painted to give the user the opportunity to pick up the call. It also tells Bob's endpoint that MediaAnswer was successfully delivered to Alice's endpoint, otherwise Bob's endpoint can re-send the MediaAnswer (after appropriate timeout, e.g. 15 seconds)

At this point media is able to flowing between the media agents 512Ma1 (MA1), 512Mb (MA2) of the endpoints, so that when callee picks up the call, there is no media setup delay.

In response to the callee accepting i.e. Picking up the call, a final call accept message (CallAcceptance) is sent to CA1 via the Call Controller, which is first posted to acceptance_CCAlice_url by CA2 (S826), and then to acceptance_Alice_url by CC (S828).

CallAcceptance contains:

callAccAck_Bob_url which is replaced with callAccAck_CCBob_url in the same manner.

After processing the call acceptance payload, CA1 posts a call acceptance acknowledgment to callAccAck_CCBob_url (S830), which CC reposts to callAccAck_Bob_url. In response, call media (audio/video) begins to flow between MA1 and MA2 (S823).

CallAcceptance is used (among other things) as a signal to cancel ringing of any endpoints which did not pick up the call, and to terminate media flow with them.

CallAcceptance also serves as the mechanism by:

1. Callee client to send its mid-call callback URLs to CC;
2. Call Controller to send mid-call action URLs to caller.

CallAcceptanceAcknowledgement is used by:

1. Caller endpoint to send its mid-call callback URLs to CC;
2. CC to send mid-call action links to callee endpoint.

Additionally, client also uses CallAcceptanceAcknowledgement as a trigger to ensure that CallAcceptance was indeed seen by Caller endpoint. It can resend CallAcceptance if it does not see CallAcceptanceAcknowledgement within a reasonable time (e.g. 15 secs).

Figure 8B:
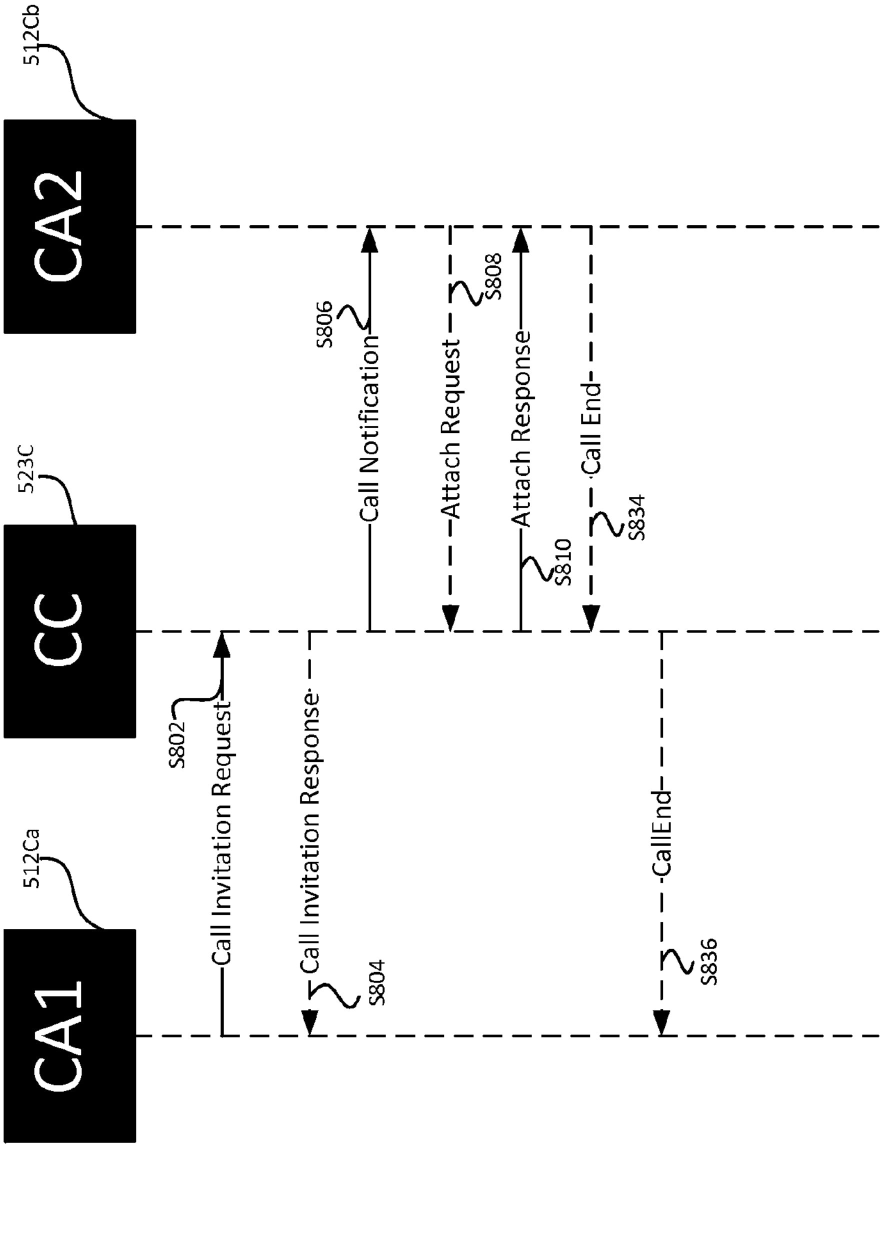
FIG. 8B is a signalling diagram showing a how a call may be terminated.

1.2.2 Callee Leaves Call:

A scenario in which the callee rejects an incoming call is illustrated in FIG. 8B. In this scenario, the procedure proceeds as above from S802 to S810. However, after CA2 has attached to the call, the incoming call is rejected by the callee (prior to call setup) by sending an end call leg message using a delete request on the URL callLegBob_CC_url provided at S806 (S834). The rejection is notified to Allice by CC posting a reject notification message to endNotification_Alice_url provided by Alice at S802 (S836).

Note that this is just an example—the callee can remove themselves from the call having accepted it (as in FIG. 8A) so that S834 can occur e.g. after S832 in FIG. 8A, or any time between attachReponse and callAcceptance. Doing so will end a 2-party call, but not a multi-party call.

S834 may be in response to the callee selecting a reject option via their client UI, or it may be automatic e.g. if Bob has configured his client to automatically reject incoming calls.

Figure 8C:
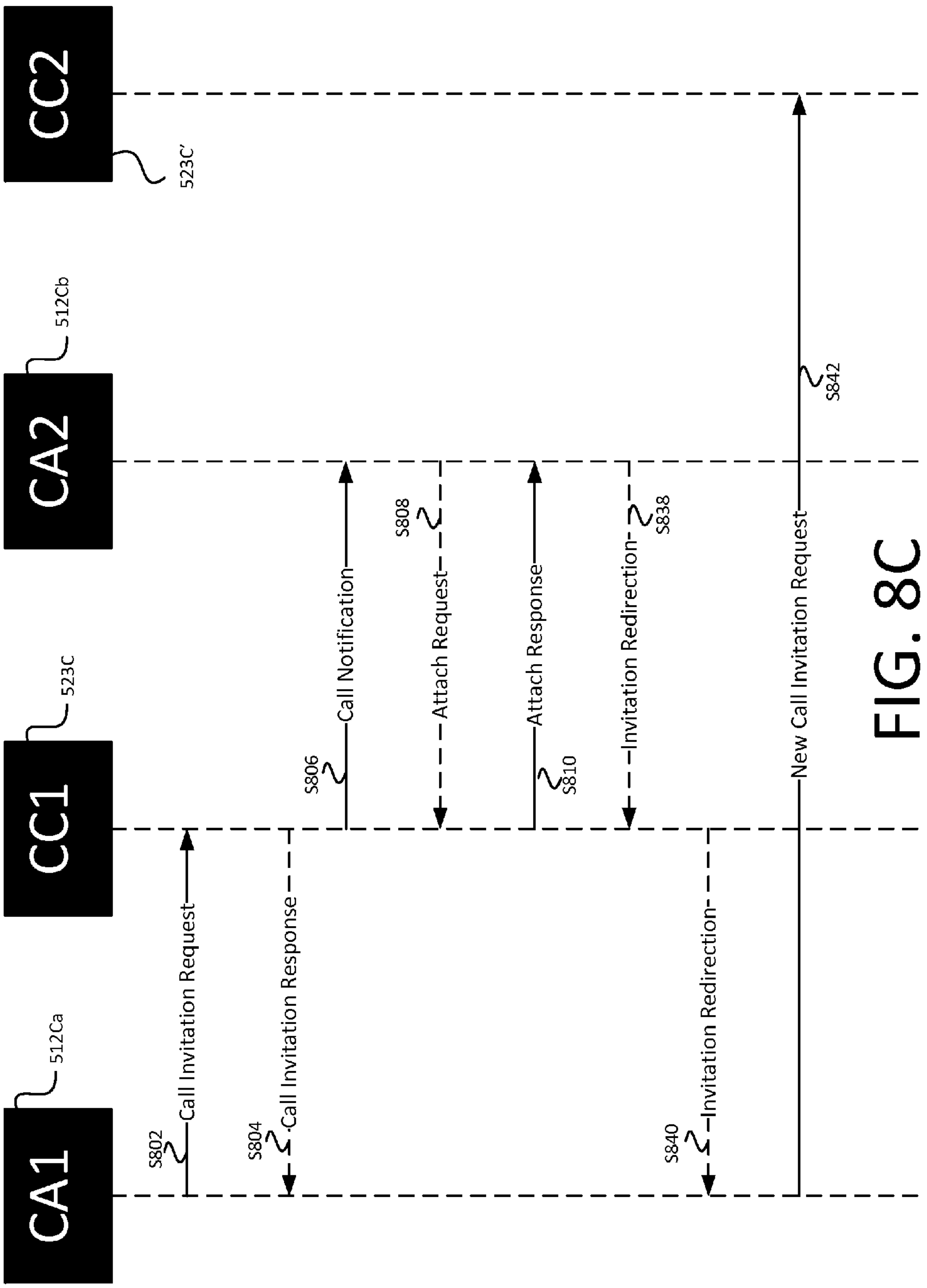
FIG. 8C is a signalling diagram showing a how a call may be directed.

1.2.3 Callee Requests Redirect:

FIG. 8C illustrates a scenario in which the callee's client CA2 redirects the call to a different target user. The procedure proceeds as above from S802 to S810. An incoming call is redirected by CA2 posting a redirect message to redirection_CCAlice_uri (S838)—this URL having been provided at S810 by CC. The redirect message identifies the different target user (e.g. by username). This is received by CC and posted to redirection_Alice_uri (S840)—this having been provided by CA1 at S802. Doing so results in caller creating a new call with the supplied target (S842). S842 is equivalent to S802 but for the new target user, and thereafter the process proceeds in the same manner. The new call invitation message is shown as being directed to a different call controller 523C', though in other examples this may not be the case.

S838 may be in response to the callee selecting a call redirect option via their client UI, or automatic.

The call redirection procedure commencing with S838 may be done anytime between receiving AttachResponse (S810) and sending CallAcceptance or CallEnd (or receiving CallEnd notification).

Figure 8D:
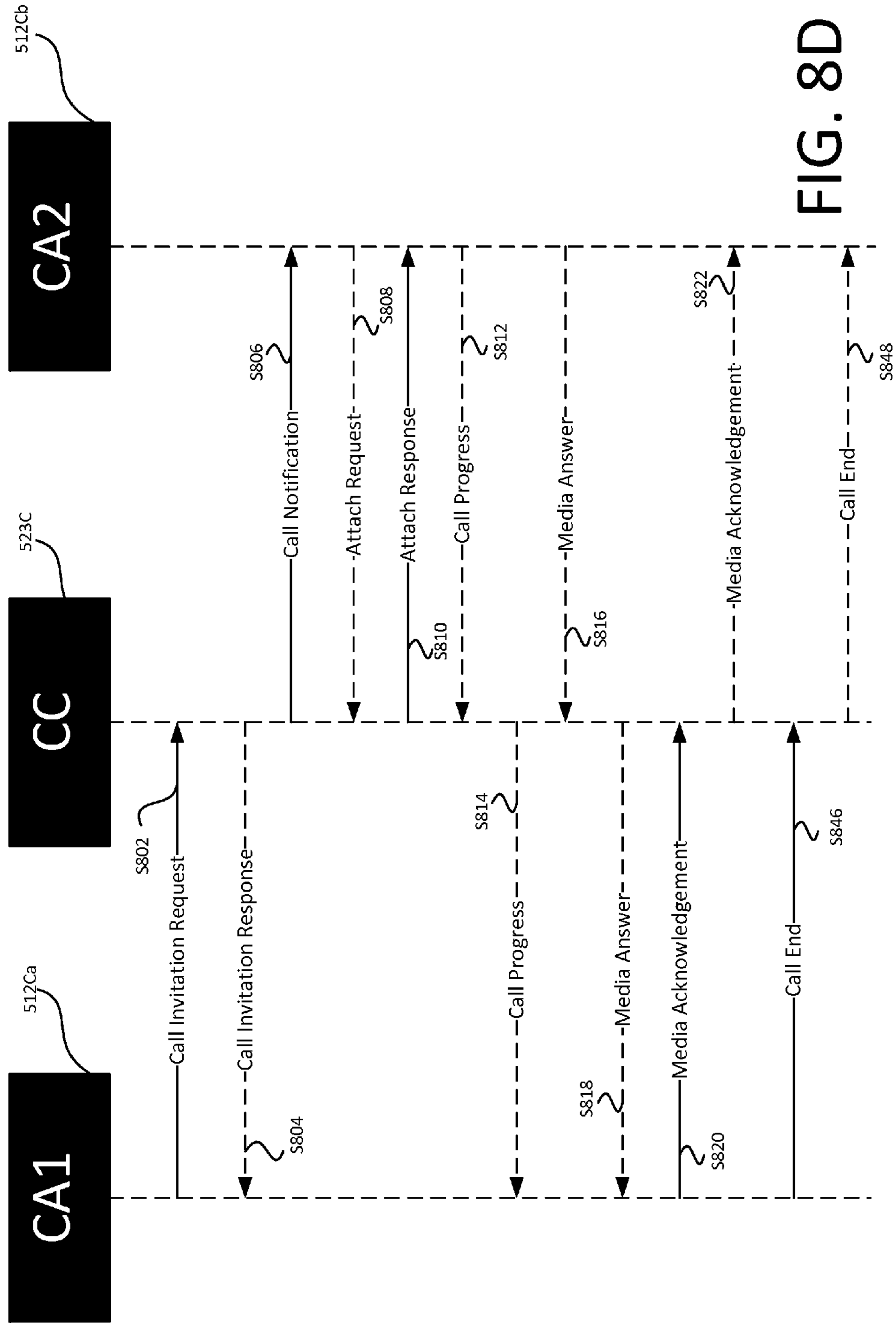
FIG. 8D is a signalling diagram showing how a call may be cancelled by a caller.

1.2.4 Caller Cancels Call:

FIG. 8D illustrates a scenario in which the caller's client CA1 ends the call e.g. responsive to the caller selecting an end call option via their client UI.

Caller may end an outgoing call anytime—even before it is setup (as in this example). In this example, the process proceeds as above up from S802 to S822.

Ending the call is achieved by CA1 sending an end call message using a delete (e.g. HTTP DELETE) request on the URI call_CC_url representing the whole call, and provided at step S804 (S846). CA2 is notified by CC posting a call end notification to the URL callNotification_Bob_url provided by CA2 at S808 (S848).

For a multi-party call, CC will update the roster (removing Alice from it), and send a POST participantUpdate message to the remaining participants.

The distinction between call termination (by callee) and call cancellation (by caller) is different from e.g. SIP. In SIP, there are two methods:

1. Cancel—sent by Caller to end the call which has not yet been accepted
2. BYE—sent by any participant to end the call which has been accepted Having these two methods cause ambiguity in state machine implementation, and makes SIP prone to race conditions (because a call may be accepted while Cancel is being processed, and at that point some entity has to convert Cancel to BYE).

The present protocol avoids this problem altogether by having just one unambiguous way to end the call (DELETE callLegSC_URL), and to get notified about the call end (POST endNotification_<User>_URL). These hold true no matter what the state of the call is, not connected or connected.

Note the above considers two-party calls. For a multi-party call, operations performed by Alice do not go to any particular user on the other side, but are handled by the Call Controller directly. For example, if Alice performs a media renegotiation in a multi-party call, then the media answer is generated by Media Controller, and other participants do not become aware of any change directly (though they may become aware indirectly, via roster updates).

For multi-party calls, links that point to Call Controller are not directly mappable to URLs of another participant. Call Controller may interact with other servers like “Media Controller” to act on the requests that it gets on its links.

1.3 New Transactions for an Established Call:

The signalling flow of FIG. 8A constitutes a single transaction as the term is defined above. All CC functionality performed therein is performed by the same call controller instance (though this is not necessary—see above), assigned at the beginning of the procedure. After relating the call acceptance acknowledgment at step S832, serialized state data for the call is stored in the shared storage of the relevant call controller cluster (see section 2), and that instance released. In the case of FIG. 8B (call termination), step S834 to end the call may be initiated after this has happened—i.e. after the call controller instance has been released. The same is true of S838 of FIG. 8C, and S846 of FIG. 8D.

Further, note that, in the signalling procedure of FIG. 8A, at steps S804, CA1 is provided with the URL participantInvitation_CC_url in CallInvitationResponse. CA1 can e.g. post an add participant message to participantInvitation_CC_url at any time during the call to add a new participant. This will trigger flow of signalling similar to S806-S826, but for the newly invited participant. At the end, CC will post to CA1 an update message to the URL update_Alice_url provided at S802 to indicate that the new participant has been added.

For in-call operations such as these, for which the original instance handling the establishment of the call has been released having serialized the call state, any call controller instance in the cluster could be assigned to handle the in-call processing. Section 2 presents a mechanism which makes this feasible.

1.3 Transparent/Independently Scalable Proxying:

The flexibility provided by this protocol provides seamless integration of the clients with proxy services (e.g. as provided by the proxy server 602 above). For example, a client can switch between proxying (i.e. receiving messages via a proxy) and direct message receipt simply by changing the URLs it provides to point towards the proxy—no change to the message content, or the underlying signalling protocol is required. As another example, a client can switch between proxies with similar ease.

The protocol provides independent scalability, for example by decoupling the proxy services from the call controller.

For example, in one embodiment, resources are required on the proxy server 602 for it to be able to maintain the required number of open (e.g. WebSocket) connections to the clients to which it is providing proxy services; however, such resources are not required by the call controller as the protocol lets allows communication between the clients and the call controller operates on a request-response (e.g. HTTP) basis.

Thus, if additional proxy server resources are required within the communication system 200, for example as the user base grows such that a greater number of e.g. WebSocket connections need to be maintained within the communication system simultaneously to provide proxy services to the growing user base, the proxy service can be scaled independently of the call controller to this end.

In general, within the communication system 200, physical resources may be allocated to a controller (e.g. call/media controller), which provides a service to clients, independently from a proxy service being provided to those clients.

In one example, the proxy service (e.g. proxy server 602) could be implemented on as an application the cloud platform 100, and resources allocated to the controllers and proxy service in the same manner (e.g. by scaling the number of VMs in a cluster, creating new service deployments etc.), but independently so that a grant of physical resources to the controller is independent and different from a grant of physical resources to a proxy server(s).

1.4 Transparent Creation of a Chain of Proxy Servers which Provide Different Capabilities:

1.4.1 Transparent Addition of Call Controller Proxies:

The URL re-writing mechanism set out in section 1B above and be applied to a chain of controllers, in which successive URL rewriting operations occur as a message travels from one endpoint to another, for example to provide transparently provide high availability.

Figure 10:
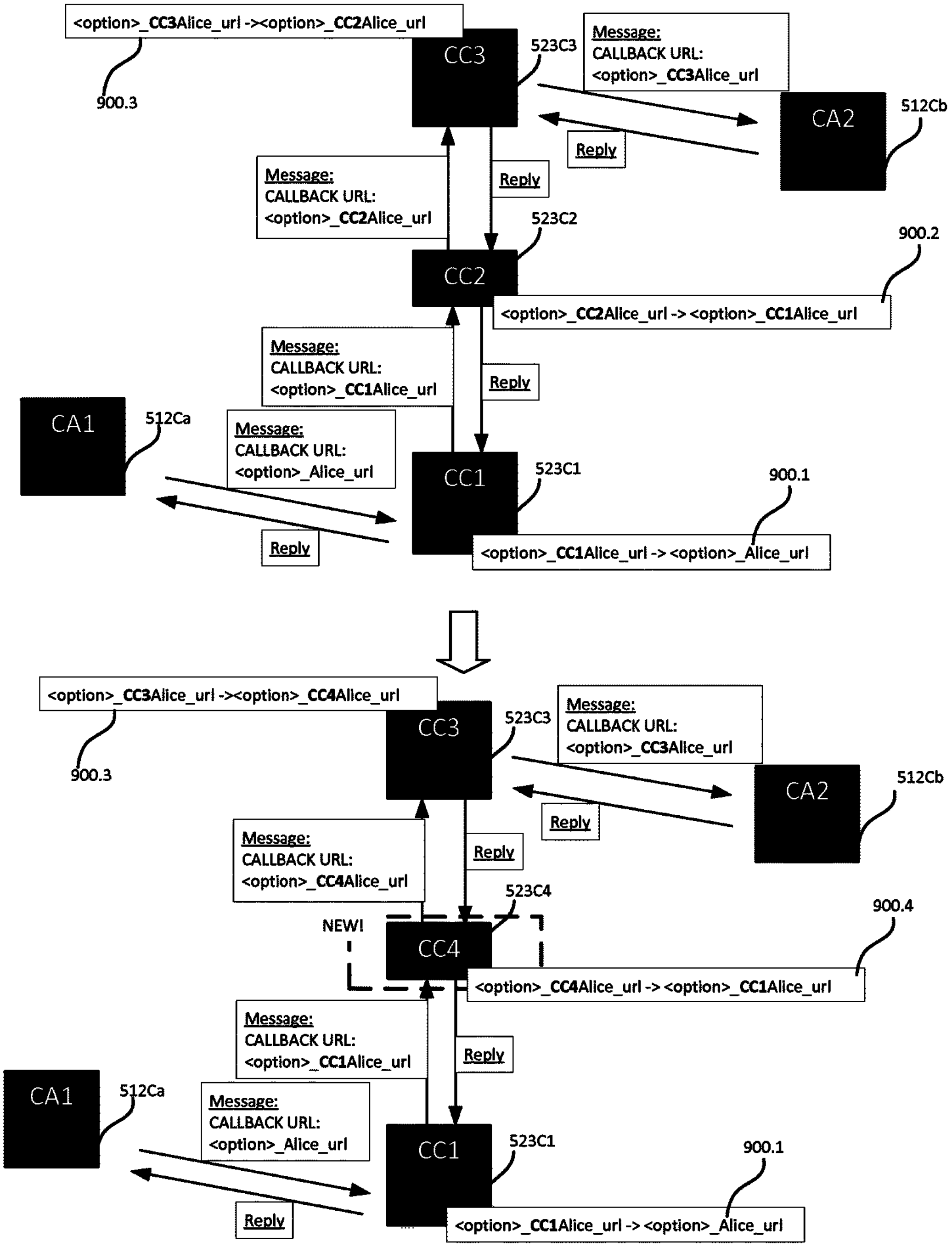
FIG. 10 is a schematic illustration of a chain of call controller deployments, each implementing a URI rewriting procedure.

FIG. 10 shows an example, in which messages between CA1 and CA2 traverse three call controller deployments 523C1 (CC1), 523C2 (CC2) and 523C1 (CC3). CA1 directs a messages to CC1, which contains a callback URLs <option>_Alice_url pointing to Alice. CC1 rewrites this to point to itself instead, and provides the rewirtten URLs <option>_CC1Alice_url to CC2 in a first modified version of the message. CC1 stored a mapping 900.1 between <option>_Alice_url and <option>_CC1Alice_url.

CC2 rewrites this URL <option>_CC1Alice_url to point to itself, and provides the modified URL <option>_CC2Alice_url to CC3 in a second modified version of the message. CC2 stored a mapping 900.2 between URL <option>_CC2Alice_url and URL <option>_CC1Alice_url.

CC3 rewrites this URL <option>_CC2Alice_url to point to itself, and provides the modified URL <option>_CC3Alice_url to CA2 in a third modified version of the message. CC3 stored a mapping 900.3 between URL <option>_CC2Alice_url and URL <option>_CC1Alice_url.

Thus, the message traverses a chain of three call controllers CC1, CC2 and CC3 and is subject to three separate URL rewriting operations as it traverses the communication system from CA1 to CA2.

When CA2 responds to Alice's message e.g. by posting a response to <option>_CC3Alice_url, the response travels first to CC3, and from there to CC2 (by virtue of mapping 900.3), from there to CC1 (by virtue of mapping 900.2), and finally to CA1 (by virtue of mapping 900.1).

CC2 sits in the middle of this chain, and is thus completely invisible to CA1 and CA2—all CA1 and CA2 ever see are URLs which point to CC1 and CC3 respectively; they do not see any URLs pointing to CC2.

This means that the call controller deployment CC2 can be substitutes for a new call controller deployment CC4, as illustrated in the lower half of FIG. 10. All that is required is:

- CC3 modifying its mappings 900.3 to replace <option>_CC2Alice_URL with an equivalent URL <option>_CC4Alice_URL but which points to CC4 instead, and
- CC1 to start redirecting messages to CC4 instead of CC2.

With these changes, all messages thereafter directed to either <option>_CC1Alice_URL (by CA1) or <option>_CC3Alice_URL (by CA2) will travel via CA4 instead of CA2. Thus deployment CA2 has been swapped for CA4 in a manner that is completely invisible to the endpoints (i.e. to CA1 and CA2)—it requires no action on their part, and they need not know this has even taken place.

1.4.2 Transparently Providing High Availability:

Callbacks can point to cluster load balancer or to one particular instance or to even a traffic manager which spans multiple datacenters without changing the protocol, allowing Call Controller to transparently provide high availability as appropriate. Throughout the call, there is freedom switch e.g. between call backs pointing to individual instances, cluster load balancers, and the traffic manager.

For example, if a call controller deployment is becoming overburdened at times of high system usage, a new deployment can be created and some of those calls switched over to the new deployment in a manner that is completely transparent to the clients.

For instance, in the example of FIG. 10, all of the primary call control functions, such as call establishment, handling of in-call transactions etc. are handled by CA2 or CA4—CC1 and CC2 just act as transparent interfaces. That is, CC1 and CC3 'pretend', to Alice and Bob's clients respectively, that they are the actual call controller (i.e. carrying out core call control functions). In other examples, call control functionality could be shared amongst the different call controller deployments.

CC1 and CC3 are shown as separate deployments to aid illustration, but in fact the same deployment could perform the functions of both CC1 and CC3 i.e. CC2/CC4 could be hidden from the clients behind a single deployment.

As will be appreciated, this successive URL rewriting mechanism can be applied to controller chains of any length.

Note, herein "transmitting a message to a client" (or similar) includes transmitting the message via a server(s), which may modify the contents of the message.

1.4.3 Additional Uses of Proxy Chaining:

Chains of proxies can be used to implement other functionality; some examples follow.

To create a message logging solution (which logs all message sent and received between call agent and call controller), a proxy server is created which 'pretends' to be Call Controller, and which upon receiving any message from the client performs the following operations:

a. Logs the message;
b. Creates a dictionary which maps client supplied callback URLs to callback URLs that point to the proxy server;
c. Updates the callback URLs in message body to point to the proxy server;
d. Sends the updated message to "actual" call controller.

Similarly, a billing solution may be created by inserting a proxy between client and call controller, and having it track the call lifetime and updates.

An authorization solution may be created by inserting a proxy between client and call controller, which validates each action.

Additionally, new proxy servers may be created which add new capabilities which needs to be understood only by the client, and not by the "actual" call controller. This can be achieved by having the client talk to proxy servers which new capabilities, which can understand and add additional links and message content (beyond the basic set that Call Controller understands).

2. High Availability of Controller Instances:

2.1 Introduction:

Below are presented mechanisms which provide high availability of cloud controllers, even in the event of system failure. These are described in the context of the call controller, but the techniques can be applied to other types of cloud services (e.g. to a media modality controller).

Call controller is a cloud-based service which needs to have high reliability and availability to ensure that users notice no noticeable service disruption even in the face of machine failures, which are fairly common in large datacenters e.g. due to failures in the network/power infrastructure, or software failures.

One of the basic ideas behind high availability is to have a cluster of machines providing service to users (see above), and ensure that when some instances go down, requests from users are serviced by other instances which are alive.

There are two aspects to this problem (from the perspective of Call Controller):

1. Failure of a subset of instances in a cluster should not result in users being unable to place new calls;
2. Failure of a subset of instances in a cluster should not result in ongoing calls failing.

The first problem can be solved by using PaaS (Platform as a Service) capabilities of cloud (like Azure), and creating a cluster which is fronted by a load-balancer (see above), which ensures that new requests go to instances which are alive. That is, the first problem to solve is to ensure that machine failures do not result in total outage. This problem can be solved using clustering. Call Controller deployment comprises many instances which are fronted by a load balancer, which ensures that traffic is routed to instances which are alive. The clients talk to the load balancer, and are therefore more or less unaffected by failures of individual instances. Some minor blips in connectivity are handled by client side retries to account for transient failures.

This is enough to give high availability for "new calls", as the call creation request would automatically land on an instance which is alive. It is however not enough for ongoing calls, because it is not enough to ensure that mid-call commands (like adding video to an audio only call, or placing a call on hold) land on an instance which is alive. It is also necessary to ensure that runtime state of the call is properly resurrected, so that the mid-call command can be properly executed.

One way to solve this problem is to tie all callback links, such as those presented in section 1, (which correspond to commands that can be invoked on the Call Controller for an ongoing call) to a particular instance, thus ensuring that all the runtime state is already in existence (i.e. active), such that mid-call command can be properly executed. This however hurts the high availability, because failure of that instance will lead to failure of the call.

Another solution would be to:

1. Ensure that callback URLs for mid-call actions point to the cluster load balancer, rather than to any particular instance
2. Store the run-time state of services in highly available external store such as Azure Table Store. However, this is not enough on its own for the following reasons:
   a. Runtime state of a service is complex, and distributed among very complex object graphs. As such it is not easy to serialize this graph easily for external storage, and it is also not easy to re-construct this graph based on external data;
   b. Multiple machines may act on the same runtime state concurrently, and may not be easily able to agree on a consistent view of the data. For example, for a calling service, an add participant request may land on one instance, whereas delete participant request may land on another, requiring both instances to agree on the final result. Whilst this problem can be addressed in traditional programming by using well known synchronization primitives, these no longer work in a distributed environment.

The following section will cover a methodology which can be used to ensure that any instance in the cluster can handle mid-call commands. First, some context surrounding the notion of runtime states will be described to aid illustration.

2.2 Runtime States:

In the context of Object Oriented Programming (OOP), a computer program (i.e. code) can define object classes. A class is a template for a particular type of object, and a class is instantiated on a processor to create a (logical) object on the processor. An object has state, i.e. state data held at some location(s) in the processor's memory, and behaviour, i.e. associated executable code. An object can be viewed as a concrete instance of a class. A template can be instantiated multiple times to create multiple objects of the same type.

A runtime object graph gets created as a result of processing any operation, and is formed of various logical objects which reference each other in many fashion.

For example, a simple exemplary computer program might define object classes as follows:

```
Class A
{
  B b;
  Int x;
}
Class B
{
  C c;
  String y;
}
Class C
{
  A a;
  Bool z;
}
```

Here A references B (because it has a member of type B), and B references C, which in turn references A. All of these object types also have some simple plain-old-datatypes in their states, namely an integer variable x for class A, a character string variable y for class B, and a boolean variable z for class C.

In the following, the notation InstanceOf(<class>) means an active object created by instantiating object class <class> on the processor, active in the sense that it is realized in the processor's memory 414 to which the processor has direct access.

Figure 11B:
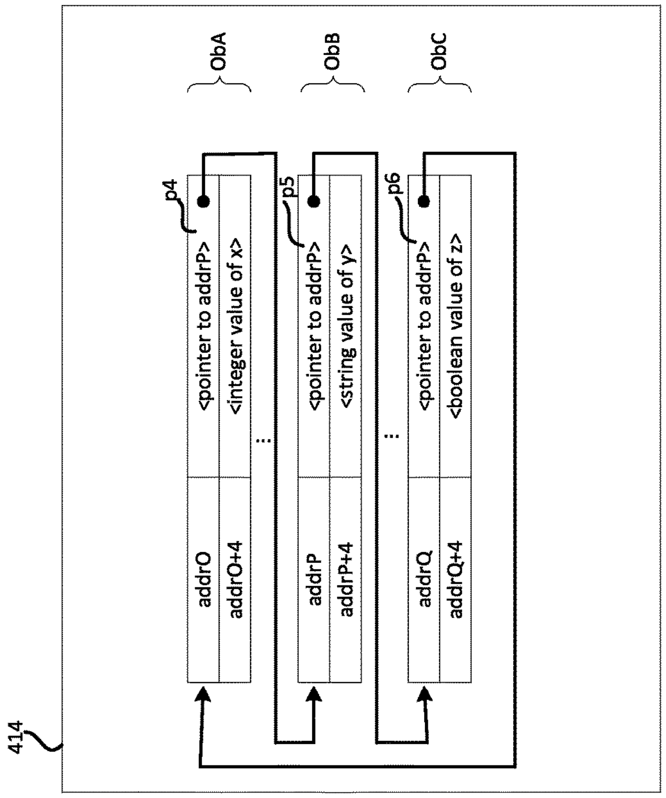
FIG. 11A is a schematic illustration of service objects which form an object graph (e.g. call state), and FIG. 11B an example of how the graph might be realized in memory.
Figure 11A:
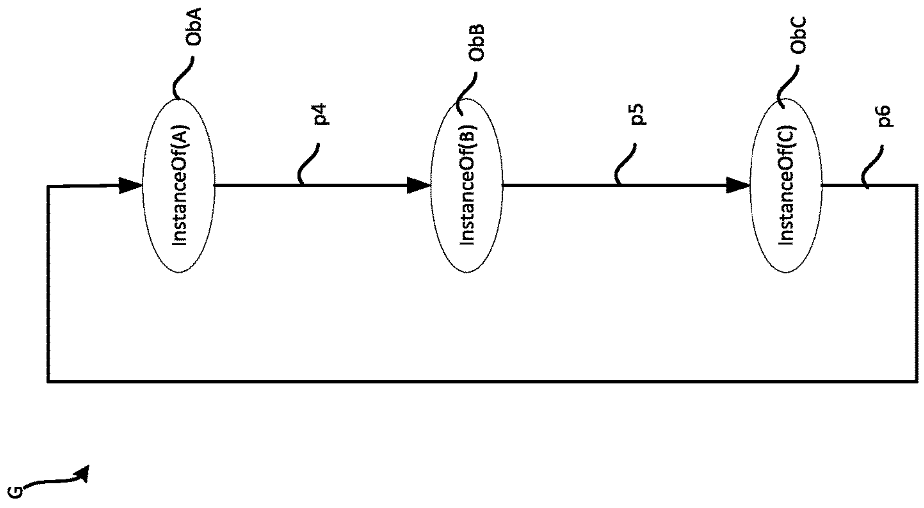

Instantiation of these classes creates an object graph G represented schematically in FIG. 11A. That is, objects ObA, ObB, ObC, which are instances of classes A, B and C respectively, form an object graph G. Because of the manner in which the classes reference one another, the object graph G can be viewed as having edges from ObA to ObB, from ObB to ObC, and from ObC back to ObA.

Purely by way of example, FIG. 11B shows how the object graph G created by instantiating the above-define classes might be realized in processor memory 414. Of course, the precise manner in which object instances are realized will depend on compiler and platform implementation details.

In this example:

ObA is realized as a memory pointer (reference) p4 held at a location addrO in memory 114, and a value of the variable x at addrO+4 (in this example, each memory location holds 4 bytes);

ObB is realized as a memory pointer p4 hed 1 at addrP, and a value of y at addrP+4

ObC is realized as a pointer p3 at addrQ, and a value of z at addrQ+4.

The values of x, y and z at addrO+4, addrP+4, addrQ+4 constitute state data of objects ObA, ObB and ObC respectively.

The pointers p1, p2, p3 are the mechanism by which the references between the objects are realized: p1 points to addrP, at which ObB is realized in memory 114; p2 to addrQ, at which ObC is realized in memory 114; and p3 back to addrO at which ObA is realized in memory 114.

It can be seen that, as the complexity of the class definitions and more classes referencing other classes are defined, the resulting object graphs are liable to have long and possible complex chains of pointers, which are liable to increase in length as more objects are created.

The fact that references are essentially realized as in-memory pointers makes them inherently difficult to serialize. "Serialization" is the process of translating an object graph (such as R'), which is realized in a processor's memory, into a format that can be stored in external storage, e.g. in a file or memory buffer or transmitted across a network connection link, and reconstructed later in the same or another computer environment. When the resulting series of bits is reread according to the serialization format, it can be used to create a semantically identical clone of the original object in the same processor's or another processor's memory.

2.3 Object Graph Resurrection:

This disclosure provides a generic framework for creating runtime states, which remain serializable even for very complex computer programs. The framework dictates how object classes are defined within a computer program, and in particular how object classes should reference one another. When this system of references is adhered to, the resulting object graph which are created as those classes are instantiated remain readily serializable irrespective of how complex they become.

In section 2, the following are presented:

1. a technique to represent an entire runtime object graph in a serializable fashion;
2. a technique to recreate the object graph given the serialized state;
3. a technique to create callback links (as used in section 1) which point to an object, from which required part of the graph can be recreated;
4. a technique to ensure that resurrection does not cause stack overflow.

In section 3, the following are disclosed:

5. a technique to ensure single resurrection of object graph to ensure consistency
6. a technique to maintain up-to-date knowledge of the health of all instances in an entire cluster;
7. a technique to optimize read/write of serialized state data by creating a virtual store for the serialized state data.

The runtime state of a typical service comprises multiple objects referring to each other. These objects together form an active object graph, and co-ordinate with each other to perform the service functionality—e.g. call controller functionality. When a call is established, an object graph is created and modified as the call establishment procedure progresses. The object graph constitutes a call state for the call, in that it embodies all the information about the current state of the call. As described in more detail below, once the call has been established the object graph is serialized to create serialized state data stored in computer storage, from which the object graph can be reconstructed on the or another processor at a later time (reactivated).

A service, e.g. call control service, media control service, is delivered by multiple cooperating objects, each implementing a respective service function(s) and having some form of state data (service objects). A service class means a class which defines a template for a service object. A service class provides (defines) the respective service function(s) and the structure of the state data e.g. by defining one or more variables to which values are assigned when the service class is instantiated to create a service object (the values constitute the state data). The service functions are implemented based on the state data, and may also modify the state data.

For distributed systems requiring high availability, this object graph needs to be resurrected on any instance which needs to handle a user request for an ongoing call.

Any generic object comprises two forms of state:

1. Simple serializable state, like string, int, bool (or any other complex structure consisting of these simple entities)
2. References to other objects It is very easy to store the first part of object state in any external store, but the second part (references) are not so easy.

The generic resurrection framework of this disclosure is based around the following concepts (types of class):

1. PersistedObject—Any object which contains some simple serializable state, and "serializable reference" (see next) to other PersistedObjects (persisted objects):
   a. Each persisted object implements GetReference( ) function which returns a PersistedObjectReference to that object; every service object is a persisted object;
2. PersistedObjectReference—Serializable reference to a PersistedObject. A serialized PersistedObjectReference comprises only two pieces of data:
   a. Unique identifier (ID) of the PersistedObject;
   b. Unique ID of PersistedObjectFactory (factory object identifier)—see below;
3. Each PersistedObjectReference implements a function called GetObject( ) which returns the a pointer to the location of the of locally activated/resurrected PersistedObject to which the PersistedObjectReference object points;
4. PersistedObjectFactory—An object which knows how to create a particular type of PersistedObject based on data from external store. Each factory implements a CreateObject( ) function, which is called by PersistedObjectReference to actually create (or locate—see section 2.2 below) the object;
5. PersistedObjectFactoryLocator—An object with which all factories register, so that anyone can get access to required factory; provides a GetFactory( ) function which is implemented on a factory identifier to return the identified factory;
6. PersistedObjectStore—An abstraction which hides the implementation of external store so that resurrection infrastructure has no dependency on any particular external store; configured to provide a GetState( ) functions which is called on an object ID to retrieve the serialized state data of the identified object from storage (e.g. GetState(ObjectID) returns the state data of the service object with the identifier ObjectID).

Each PersistedObject class is also configured to provide an Initialize( ) function, which can be used to initialize a newly created object with state data retrieved by GetState( ).

"Class [capital C] object" (or similar) means an object created by instantiating a class "Class". For instance, "PersistedObjectA object" means an object created by instantiating class PersistedObjectA.

In other words, PersistedObjectReferences are serializable objects, which unambiguously point to a PersistedObject. Furthermore, we created the concept of PersistedObjectFactory and PersistedObjectFactoryLocator to locate or create an object given the PersistedObjectReference.

Each PersistedObjectReference object (reference object) has the following state data:

1. an ObjectId—A unique id for a PersistedObject object, which can be used by PersistedObjectFactory to fetch any state from any external store;
2. a FactoryId—A unique id for a PersistedObjectFactory object which can create the persisted object identified by the ObjectId. This ID is used to locate the factory object, by calling PersistedObjectFactoryLocator.GetFactory(<FactoryId>).

"PersistedObjectReference to <persisted object>" is used as shorthand to mean a reference object whose state data comprises the persisted object identifier of <persisted object>.

Any PersistedObject object (persisted object) has at least one method (function): GetReference( ), which returns the PersistedObjectReference for that PersistedObject object.

All PersistedObjectReference objects have a method: GetObject( ), which returns the instance of PersistedObject that the reference object points to i.e. the PersistedObject object identified by ObjectID in the reference object.

All PersistedObjectFactory objects (factory objects) have a method: CreateObject( ) which takes an ObjectID identifying a persisted object as an input, and creates the identified persisted object from the corresponding serialized state data, or locates the identified persisted object if it has already been created.

PersistedObjectFactoryLocator is a singleton instance (factory locator object) with which all PersistedObjectFactory objects register at the start of process e.g. at start-up when the computer program is first instantiated on a processor. That is, at startup, all persisted object factories register with a singleton instance of PersistedObjectFactoryLocator, so that given any PersistedObjectReference can be used to create an actual PersistedObject instance.

Since PersistedObjectReferences are serializable, it is possible to store the state of each object into an external store, and since there is an unambiguous factory corresponding to each object reference, it is always possible to create an instance of PersistedObject from the serialized state.

All Call Controller objects are PersistedObjects, which serialize their state and write to PersistedObjectStore at well-defined points in their lifetime. Any other instance will be able to resurrect the whole object graph by just starting from a root object.

PersistedObjectStore is also instantiated on start up to create a storage object.

Call Controller creates mid-call callback links by using the following scheme of URLs:

https://<Call Controller fqdn>/<PersistedObjectFactoryId>/<PersistedObjectId>

Thus if any mid-call command is received, Call Controller can create a PersistedObjectReference by parsing out the factory Id and object Id, and can then invoke GetObject( ) on the reference object, to get handle to the real PersistedObject. Once it has handle to the one PersistedObject, the sub-graph of the object graph, for which subgraph the identified persisted object is the root, can be constructed progressively, by following the chain of references. That is, everything from the identified persisted object downwards is constructed—this may not include all the objects in the graph.

Thus, a computer program conforming to the framework may:

- define one or more PersistedObject classes i.e. one or more templates for persisted objects, each configured to provide:
  - a GetReference( ) function;
- a PersistedObjectFactory class for each of the one or more PersistedObject classes, each configured to provide:
  - a CreateObject( ) function, which creates that type of persisted object from its serialized representation;
- a PersistedObjectReference class, configured to provide:
  - a persisted object ID;
  - a factory ID of a factory able to create (or locate) the identified persisted object;
  - a GetObject( ) function, which returns the identified persisted object;
- a PersistedObjectFactorLocator class; and
- a PersistedObjectStore Class.

Thus, were classes A, B and C defined above could be redefined in accordance with the present framework as follows:

```
Class PersistedA
{
  PersistedObjectReference<PersistedB> b;
  Int x;
  GetReference( );
}
Class PersistedB
{
  PersistedObjectReference<PersistedC> c;
  String y;
  GetReference( );
}
Class PersistedA
{
  PersistedObjectReference<PersistedA> a;
  Bool z;
  GetReference( );
}
```

Note that the PersistedObjectReference PersistedA, PersistedB, PersistedC do not reference other PersistentObject classes directly i.e. no PersistentObject class has a member of PersistedObject type—PersistedObject classes only have members of PersistedObjectReference type, and thus only reference other PersistedObject classes indirectly.

For each type of PersistedObject, there will be a corresponding PersistedObjectFactory class as well:

```
Class PersistedObjectFactoryA
{
  Id : "PersistedObjectFactoryA";
  CreateObject( );
}
Class PersistedObjectFactoryB
{
  Id: "PersistedObjectFactoryB";
  CreateObject( );
}
Class PersistedObjectFactoryC
{
  Id: "PersistedObjectFactoryC";
  CreateObject( );
}
```

The factory classes would be instantiated on start up to create factory objects POFA, POFB and POFC for creating objects of type PersistedA, PersistedB and PersistedC respectively. POFA, POFB and POFC can recreate objects of type PersistedA, PersistedB and Persisted C respectively from serialized state data.

The classes PersistedA-PersistedC, as defined above, would then be instantiated at some stage in the program to create persisted objects PObA, PObB, PObC respectively, as would the PersistedObjectReference class to create corresponding persisted object references:

- PORA: containing a persisted object identifier of PObA, and factory identifier of POFA;
- PORA: containing a persisted object identifier of PObB, and factory identifier of POFB;

PORA: containing a persisted object identifier of PObC, and factory identifier of POFC.

Figure 12B:
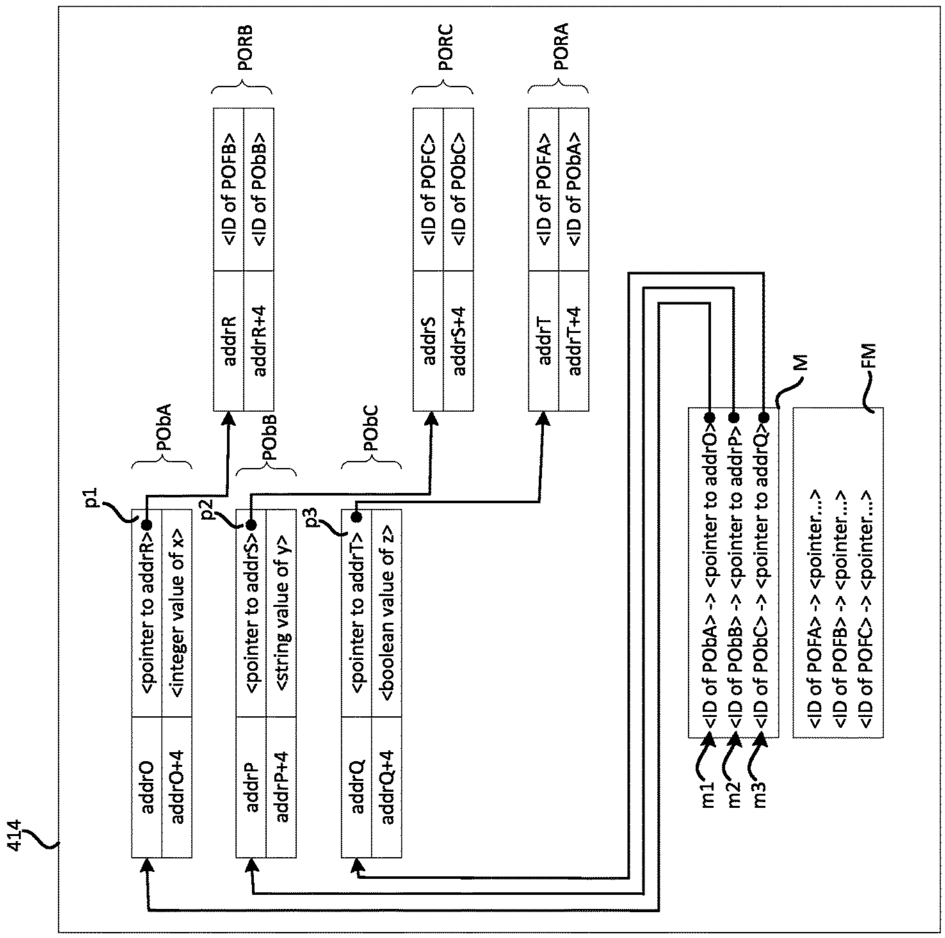
FIG. 12A is a schematic illustration of persisted and reference objects which form an object graph (e.g. call state), and FIG. 12B an example of how the graph might be realized in memory.
Figure 12A:
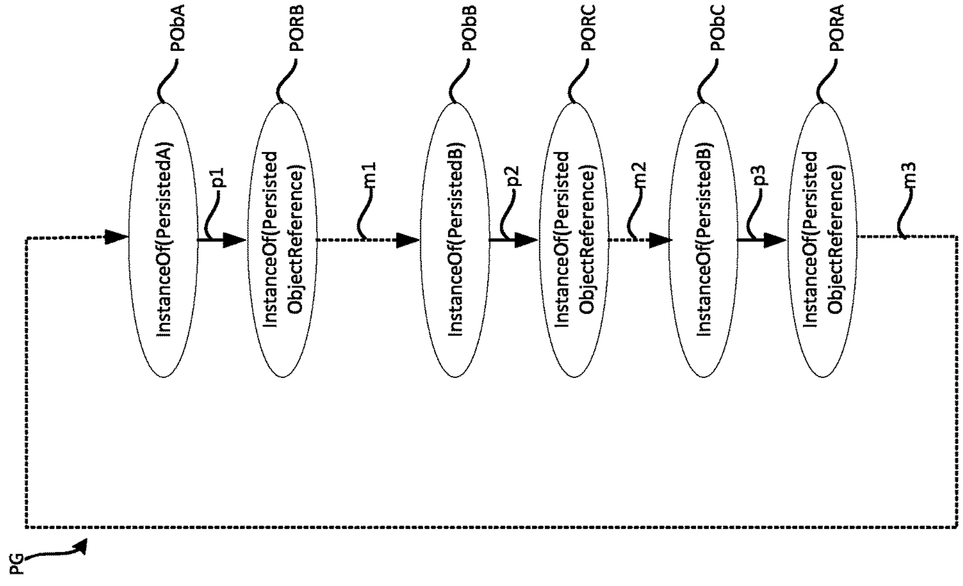

The persisted objects POA, POB and POC and reference objects PORA, PORB, PORC are structured as an object graph PG, a conceptual view of which is shown in FIG. 12A.

The object graph PG, can be viewed as having edges (shown as arrows) due to the manner in which the various classes reference one another.

FIG. 12B shows one example of how the objects and edges may be realized in the processor's memory 414. Again, this is just an example to aid illustration—in practice this will depend on implementation details of the compiler/processor platform.

Similar to FIG. 11A, each service PObA, PObB, PObC is realized in memory —at addrO to addrO+4, addr P to addrP+4 and addrQ to addrQ+4 respectively—as:

a respective memory pointer p1 at addrO, p2 at addrP, p3 at addrR; and a value of x at addrO+4, value of y at addrP+4, value of z at addrQ+4.

However, in contrast to FIG. 11A, the pointers p1, p2, p3 do not point to memory locations of other persisted objects; rather they point to locations addrR, addrS, addrT of the relevant reference objects. This is because the Persisted Object classes only have PersistedObjectReference member types.

addrR to addrR+4 is where PORB is realized (and p1 points here because class PersistedA indirectly references PersistedB): addrR hold the factory object identifier of POFB <ID of POFB>, and addrR+4 holds the persisted object identifier of PObB <ID of PObB>.

addrS to addrS+4 is where PORC is realized (and p2 points here because class PersistedB indirectly references PersistedC): addrS hold the factory object identifier of POFC <ID of POFC>, and addrR+4 holds the persisted object identifier of PObC <ID of PObC>.

addrT to addrT+4 is where PORA is realized (and p3 points here because class PersistedC indirectly references PersistedA): addrS hold the factory object identifier of POFA <ID of POFA>, and addrR+4 holds the persisted object identifier of PObA <ID of PObA>.

Also held in the memory 114 are a set of mappings M, which, for each active persisted object, map the identifier of that persisted object to a corresponding memory pointer identifying a location at which the identified persisted object is realized (i.e. where it's state data is held)—in this example example, M comprises:

a first mapping m1:<ID of PObA>-><pointer to addrO> a second mapping m2:<ID of PObB>-><pointer to addrP> a third mapping m3:<ID of PObC>-><pointer to addrQ>

The mappings are held in a local activation cache (see section 2.2 below).

Also held in the memory are a set of factory mappings FM, which map the factory identifiers to locations in memory at which the relevant factory objects POFA, POFB, POFC are realized. Each mapping in FM is created when the corresponding factory object register with FactoryObjectLocator.

No matter how complex the object graph becomes i.e. as more classes referencing other classes are defined, and more objects created, the framework prevents a situation in which long chains of pointers (i.e. pointers pointing to pointers, pointing to other pointers, pointing to further pointers, pointing to yet further pointers etc.) from arising. In other words, the presence of the PersistedObjectReference objects effectively breaks up the chain of inter-object references so that the structure to be serialized remains tractable notwithstanding its complexity. That is, no matter how complex the object graph is, applying the serialization function to a persisted object is guaranteed to generate a tractable output in relatively short amount of time because the serialization of an individual persisted object is guaranteed to terminate with the reference object(s) to which the persisted object points.

2A. Serialization:

Given this structure and a serialization function (e.g. the known JSON serialization function):

1. Serialize(InstanceOf(PersistedA)) would return the following (if serialized using JSON serializer)):

```
{
  "b": { "FactoryId": "PersistedObjectFactoryB",
  "ObjectId": "<ObjectIdOfB>"},
    "x": <value of x>
}
```

2. Serialize(InstanceOf(PersistedB)) would return the following (if serialized using) JSON serializer)):

```
{
  "c": { "FactoryId": "PersistedObjectFactoryC",
  "ObjectId": "<ObjectIdOfC>"},
    "y": "<value of y>"
}
```

3. Serialize(InstanceOf(PersistedC)) would return the following (if serialized using JSON serializer)):

```
{
  "a": { "FactoryId": "PersistedObjectFactoryA",
  "ObjectId": "<ObjectIdOfA>"},
    "z": <value of z>
}
```

In this example, the serialized state data is in plain text format.

Where the computer program implements a call controller, a respective object graph may be created for each call that is established by an instance of the call controller. As the call is established, new service objects, which implement functions in to establish the call, are created in the processor's memory—these form an object graph, which constitutes an active call state of the call (see example below). Then once the call has been established (for instance), the active call state is serialized, stored in external storage, and the active call state deactivated, thereby releasing resources on the processor. At a later time in the call, e.g. in response to some mid-call request message such as a request to add a new participant to the call, at least part of the object graph is (i.e. at least some of the service objects are) so a transaction can be performed to effect the request. Preforming the transaction may modify the resurrected, active call state. When the transaction has completed, the modified active call state can be serialized in the same manner to update the serialized version of the call state held in the external storage.

FIG. 13 is a flow chart for a method of serializing persisted objects. In this example, each persisted object is serialized each time its state changes—this is just one example for the purposes of illustration.

On the right hand side of the flow chart, pictorial illustrations are provided to aid understanding of the operations performed at the relevant method step.

At step S1304, a first of the persisted objects POb (e.g. PObA) is serialized to generate individual serialized state 1302 data for POb, e.g. using the JSON serialization function. The individual state data 1302 comprises:

- the persisted object identifier 1306 of any persisted object(s) referenced by PO—e.g. for PObA, <ID of PObB> because PObA references PObB—and;
- the factory object identifier(s) 1304 of the factory object for recreating objects the referenced persisted object(s)—e.g. for PObA, <ID of POFB> because PObA references PObB;
- the state data for POb (e.g. for PObA, the value of x).

Any other suitable serialization technique may also be used; for example, BOND serialization, Binary serialization etc.

At step S1306, the individual state data 1302 is included in serialized state data 1300 representing the whole object graph PG. The individual data 1302 is labelled in the serialized data 1300 by i) the persisted object identifier 1308 of the persisted object POb itself (e.g. <ID of PObA>), and ii) the factory object identifier 1310 of the factory for recreating POb (e.g. <ID of POFA>.

At step S1308, a call back URL 1312 is generated, which comprises the factory object identifier 1308 and persisted object identifier 1310.

The factory object identified by the factory object identifier 1310 is configured recreate the persisted object POb from the serialized data 1300, when the persisted object identifier 1308 of POb is inputted to the CreateObject( ) function of the factory object.

For example, the persisted object which has been serialized at S1306 may implement some call control service function, e.g. for adding a participant to a call; the callback URL generated at S1308 is transmitted to the client(s) participating in a call; in order to add a participant to the call, the client(s) accesses that link. When the link is accessed:

- because the URL contains the factory object identifier 1308, the factory object needed to recreate POb can be identified from the URL itself; and
- the persisted object identifier 1310 contained in the URL itself can be inputted to the identified factory object to recreate the persisted object POb.

The client(s) then knows to access this link should it wish to request the addition of a new call participant.

The process S1304-S1308 is repeated for any remaining PersistedObejct objects, e.g. PObB, PObC, (S1310).

This process can be performed again e.g. if a new persisted object is created, or an existing persisted object updated, so as to keep the serialized state 1300 up-to-date.

2B. Object Recreation (Deserialization):

Now given any serialized data, it can be de-serialized (which means creating an object from its serialized representation), and from there on its reference chain can be followed to create any other object that may be required.

For the example above, serialized data for InstanceOf (PersistedC) can be deserialized to restore InstanceOf(PersistedC) i.e. PObC.

Next, the PersistedObjectReference to PORA can be restored because the serialized state data of PObC contains the service object identifier <ID of PObA> i.e. and <ID of POFA>—these two identifiers are all that is needed to recreate the reference object PORA as these represent the sum total of the reference object PORA's state data.

Next InstanceOf(PersistedC).PORA.GetObject( ) is invoked. From there, PORB and hence PObB can be restored in the same manner.

PersistedObjectReference.GetObject( ) is implemented simply as:

1. Factory=PersistedObjectFactoryLocator.GetFactory (PersistedObjectReference.FactoryId)
2. Object=Factory.CreateObject(PersistedObjectReference.ObjectId)

Herein "POb.f( )" means calling (i.e. making a function call to) a function f( ) which is implemented by service object POb.

The implementation PersistedObject.GetReference( ) is made viable by generating an appropriate FactoryId, and ObjectId while constructing an instance of any PersistedObject type, and inputting the generated identifiers to a constructor of the instance.

For example, the constructor of PersistedA can take two parameters FactoryId and ObjectId as inputs.

Figure 14:
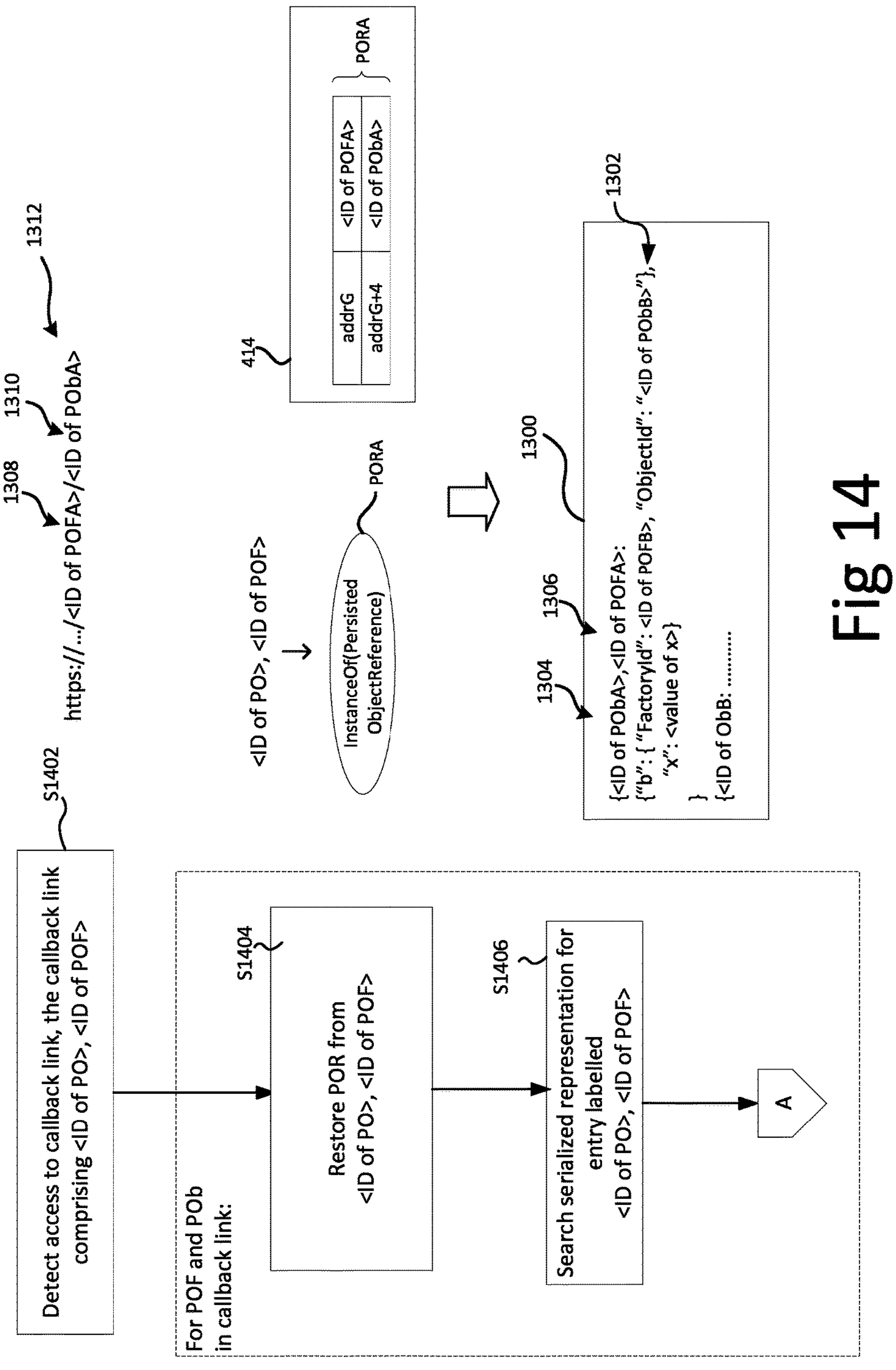
FIG. 14 is a flowchart for a deserialization process.
Figure 14:
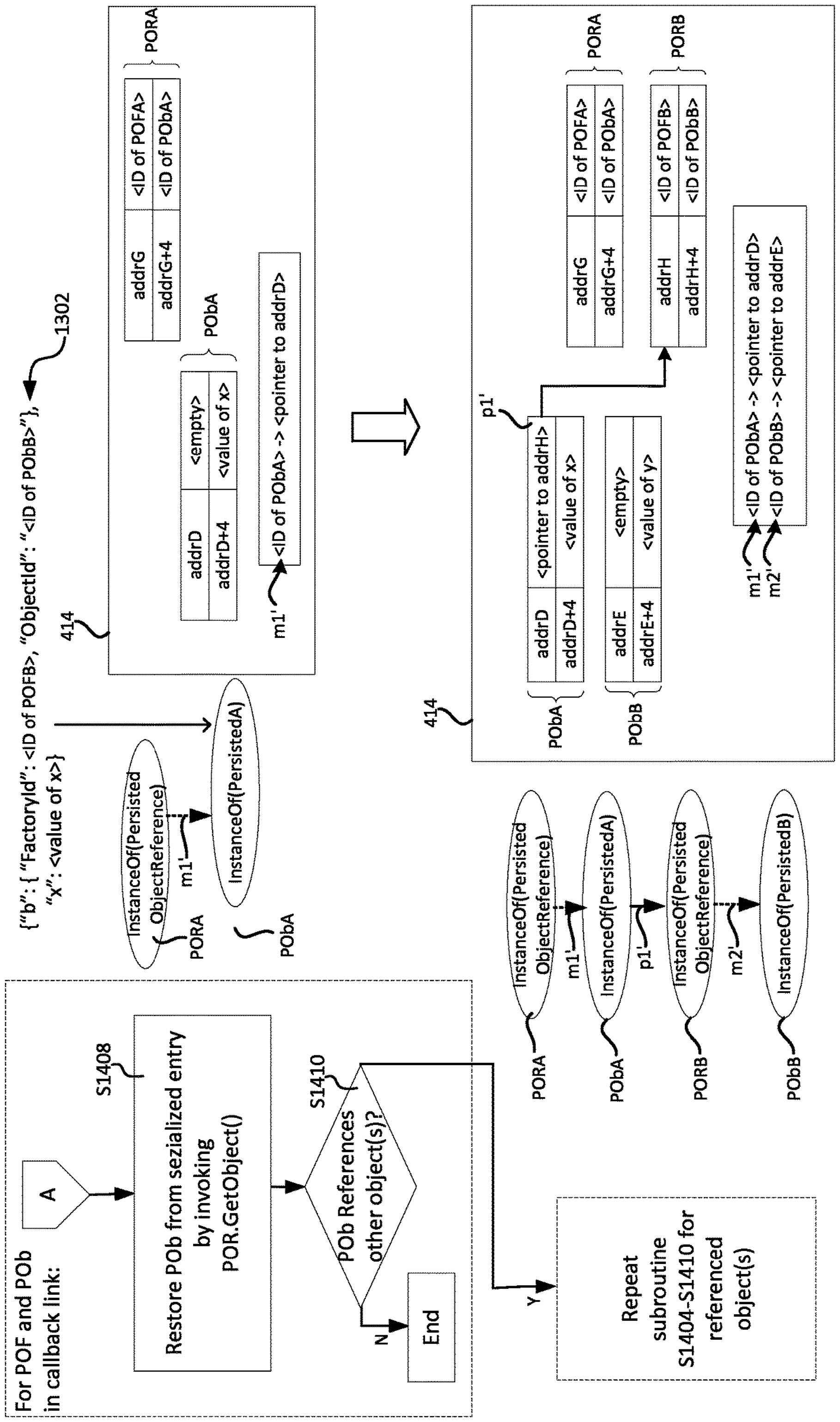

FIG. 14 is a flow chart for a method of recreating service objects from serialized stated data. Again, pictorial representations are located to illustrate exemplary operations that may be performed at the corresponding method steps. These are just examples for the purpose of illustrations.

At step S1402, a service reactivation message is received. For example, the service activation message may pertain to an established call, and request that a new participant be added. The service request message is posted to the callback URL 1312, for instance as previously generated at S1308 of FIG. 13, and provided to the client(s) in accordance with the signalling protocol of section 1.

Steps S1404 to S1410 of FIG. 14 constitute a subroutine, which is repeatedly performed to reactivate at least part of the object graph represented in the serialized state data 1300—specifically, a sub graph of the object graph, for which sub graph the persisted object identified in the service request message of S1302 is the root i.e. all persisted objects referenced by the identified object, and in turn any further persisted objects referenced by those objects, and in turn any yet further persisted object referenced by the further persisted object(s) etc.

The call back link 1312 is parsed to obtain the persisted object identifier 1310 and factory object identifier 1308 identifying the factory for recreating that type of persisted object, and the subroutine is initially performed for those persisted and factory objects:

In this example, the link comprises <ID of PObA> and <ID of POFA> i.e. the persisted object identifier of persisted object PObA, and the factory object identifier of the factory object POF for recreating PObA from the relevant serialized state data.

At step S1404, the factory object ID 1308 and service object ID 1310 are used to restore the PersistedObjectReference object POR of the persisted object POb identified by the service object identifier 1310—as indicated above, these two identifiers are all that are needed to reconstruct the reference object.

At step S1406, the serialized state data 1300 generated as per FIG. 13 is searched to find the entry with a label that matches the factory object identifier 1308 and persisted object identifier 1310 obtained from the callback link 1312.

At step S1408, the individual serialized state data 1302 in that entry is inputted to the factory object identified by the factory object identifier 1308 to restore the persisted object POb—this is effected by invoking POR.GetObject( ).

In this example, the service object in question is PObA, and the recreated PObA is realized in memory at addrD to addrD+4. The value of the variable x is loaded into addrD+4 from the serialized state data; because PObA references PORB (see above), a memory location is reserved for holding a pointer to PORB—but at this stage PORB has not been recreated so addrD is initially empty.

A mapping m1' is also created in memory 414 which maps <ID od PObA> to a memory pointer identifying where in the memory 414 PObA is realized i.e. a pointer to addrD in this example.

At step S1410, it is the subroutine branches depending on whether or not the persisted object which has just been recreated references any other persisted object: if not, the subroutine ends. If so, the subroutine S1404-S1410 is repeated, but this time for the referenced service object(s) i.e. that(those) indirectly referenced by the persisted object which has just been recreated.

The right hand side of FIG. 14 shows by way of example how PORB and PObB (referenced by PObA) are recreated. One PORB has been recreated at addrH to addrH+4, a pointer p1' is generated in the memory 414 at addrH to finalize the reconstruction of PObA.

For repetitions of the subroutine, POR.GetObject( ) may be invoked only when the service object corresponding to the reference object POR is actually needed to implement some service function. For example, where PObB implements a service function fB( ), PObA may invoke PORB.GetObject( ).fB( ) which causes PObB to be reactivated and then fB( ) to be invoked on the reactivated PObB.

The subroutine is then performed again to reconstruct PORC and PObC in the same manner.

2.2 Resurrecting and Fetching Objects:

As will be apparent, for an acyclic object graph, the process will eventually terminate with a service object which does not reference any other service object.

For cyclic objects graphs, an additional mechanism is provided. A cyclic object graph is one which has a closed loop of references—the object graph of FIG. 12A is one example of a cyclic object graph.

Consider the following scenario: there are 2 persisted objects A and B. A references B, and B references A. If A resurrects B, and during resurrection B tries to resurrect A, then it will result in an endless loop eventually leading to stack overflow and crash.

To take care of this scenario, upon resurrection of a service object, a mapping (e.g. m1, m2, m3 in FIG. 12B)—between the service object's identifier and a memory pointer to the location in memory 414 at which the service object is realized—is created in local activation cache. Future attempts to resurrect that object (by calling GetObject( ) on the corresponding reference object) just results in the cached value being returned, thus breaking the circular chain.

When a persisted object is "resurrected" on an instance, the algorithm (which the PersistedObjectFactory follows) is:

1. Fetch the persisted state from external store:
   State=PersistedObjectStore.GetState(ObjectId)
2. Create the object in local memory:
   X=new PersistedObject( )
3. Initialize the created object with state retrieved from external store,
   X.Initialize(State);
4. Put the created instance in local activation cache, which is a dictionary from object id to a reference to the locally resurrected object.

At this point X is a fully resurrected (re-hydrated) PersistedObject object (i.e. service object) that lives in local memory. So, instance X is reference to an actual object in memory.

Thus when some other object (Y) which has a PersistedObjectReference to X, and wishes to invoke a method on it, the following will happen:

1. Y will called PersistedObjectRereference(X).GetObject( )—this will eventually go to PersistedObjectFactory( ).CreateObject( ), which will first look at local activation cache, and if an entry for the objectId already exists, will return the reference to already created object. If an entry does not exist, it will follow the algorithm above to create it and put in the local activation cache
2. Y now has a reference to local instantiation of X, and can invoke any method on X, treating it as any other object That is, the cached object is returned and another version of the cached object is not created. Using this mechanism ensures that all PersistedObjectReference(X) objects refer to same instance of PersistedObject(X). This property ensures that the Persisted object graph behaves exactly same as graph of the type shown in FIG. 11A where objects refer to each other's memory location directly (and thus refer to same instance of an object 'automatically').

3. Ensuring Single Resurrection:

Below is provided a mechanism to ensure that if multiple transactions for the same call happen concurrently, they all get processed by the same instance to ensure consistency of the Call State.

Since different mid-call requests may go to different instances of Call Controller, this could lead to a situation in which the object graph for a call is resurrected on multiple call controller instances simultaneously.

This could lead to data inconsistency when different resurrections of same object try to write their (different) state into the external store.

While it is possible to use an elaborate scheme of optimistic concurrency, retries and rollback to reconcile the data and arrive at a consistent value, it this is complex and un-predictable.

For this reason, a Call Controller deployment ensures data consistency in a different, more predictable way. The mechanism ensures that there is a single resurrection of the object graph, so that same object graph gets a chance to handle to handle concurrent requests. This way, objects can use the traditional synchronization techniques—such as locks, monitors and semaphores—to ensure data consistency easily.

Disclosed is a communication system is for effecting communication events between endpoints of a communication network. The system comprises: a database; an input for receiving messages; computer storage configured to hold code; and one or more processors. The code is configured to implement a controller for managing established communication events. The processor(s) are configured to run multiple instances of the controller. For each instance of the controller, responsive to the instance receiving a message requesting an action which relates to an established communication event, the instance accesses the database to determine whether it contains a valid ownership entry which identifies another instance of the controller as currently owning the communication event. If so, the instance forwards the message to the other instance; if not, the instance creates a valid ownership entry in the database identifying the instance as currently owning the communication event, and performs the requested action which comprises modifying a state of the communication event held in the computer storage.

Below, Fdqn means a Fully Qualified Domain Name. "<Call Controller Fqdn>" means the domain name of a call controller cluster. Individual instances within the cluster have have different IPs addresses and are distinguished by associated instance IDs.

This is achieved by using the following scheme:

1. Each call is associated with a unique Context, which has a unique ID (context identifier)<Context ID> distinguishing it from any other Context; moreover, each call controller instance in the call control cluster of the deployment has a unique instance ID distinguishing it form any other instance in the cluster.
2. Each callback URL pointing to Call Controller has this context id in the URL, which is of the following form: https://<Call Controller Fqdn>/<Context Id>/<PersistedObjectFactoryId>/PersistedObjectId>.
3. When any action gets invoked on a Call Controller instance is, it performs the following algorithm ("ProxyOrTakeOver"):
   a. For Call Creation request, create the following entry in a database (1502, FIG. 15) in an external store: <ContextId, Processing Instance ID>, which is initially valid. "Processing Instance ID" is the instance ID of the instance creating the entry. Thus the entry identifies this instance as currently owning the call for as long as the entry remains valid. The entry expires after a time (becomes invalid). The expiration time for this entry is maximum time it takes for any single transaction (e.g. establishing a call) to complete.
      i. Note that this entry is different from state of object graph (which lives as long as the call is alive);
      ii. For Call Controller, the maximum time is 90 seconds (based on the protocol);
      iii. The ownership entry is expired (invalidated) after an interval of inactivity, over which no call control operations are performed for the call, for two reasons:
         1. When a new request lands on any instance, this instance should just be able to become the new owner rather than always having to proxy the request to the original instance. This provides more optimal processing by avoiding needless proxying and, it also ensures better load distribution;
         2. The longer an ownership entry remains valid, the greater the likelihood of the owner failing while a call is active, and thus requiring another server to try the owner, detect its failure and then attempt take over;
4. The above two issues can be avoided by allowing the ownership to expire, if nothing is happening.
   a. For mid-call requests landing on an instance (1504, FIG. 15), check if there is an un-expired <ContextId, Processing Instance ID>
   b. If there is no such entry, then create an entry <ContextId, Current Instance ID> (1506, FIG. 15), and start processing the request; "Current Instance ID" is an identifier of the instance on which the mid call request has landed, thus identifies that instance as current owner for as long as the entry remains valid;
   c. If there is such an entry, and the value of processing instance's instance ID is same as current instance's instance ID, then extend the lifetime of the entry, and start processing the request
   d. If the entry's instance ID is different from current instance's instance ID, then check if the processing instance is alive (using the algorithm presented below), and if so, proxy the request to that instance. That instance will again execute the same algorithm
   e. If the processing instance is dead, the entry to mark current instance as the new processing instance is updated, and start processing the request
      i. Multiple simultaneous writes are handled using optimistic concurrency. So when instance1 and instance2 try to become owner at the same time, one will win and the other will know about it and proxy to the winner.

When a call state for a call is serialized, it is stored in association with the context ID of the call so that the correct call state can be restored later.

Figure 15:
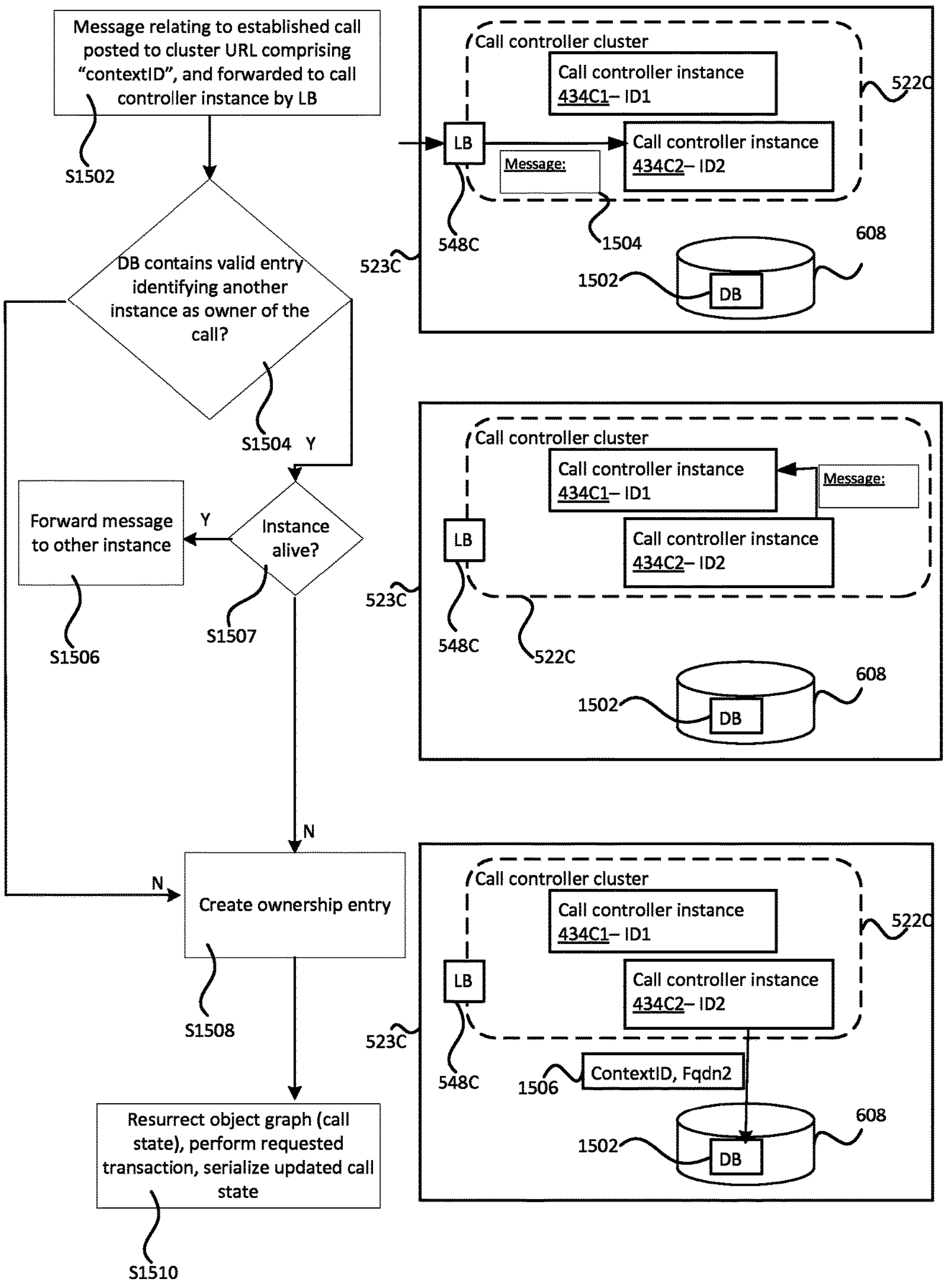
FIG. 15 is a flowchart for a method of effecting in-call service requests.

FIG. 15 is a flowchart for processing a mid-call request message (e.g. to add a new participant to an established call, end an established call etc.). A pictorial representation of the method steps is shown to the right.

At step S1502 a mid-call request message i.e. pertaining to an already-established call, requesting a transaction (which involves one or more operations) is posted a URL. The URL points to a call controller cluster 522C, and the message is thus received by the load balancer 548 of the cluster and forwarded to an instance of the call controller accordingly—in this example, 434C2. The URL to which the message is posted contains a "contextID" unique to the established call (see above).

In response, the instance 434C2 accesses the database 1502 to determine whether or not there exist a valid ownership entry identifying another instance of the call controller as currently owning the call (S1204). Such an entry will contain an instance identifier(e.g. "ID1" in FIG. 15) of the owning instance.

If so, the instance 434C2 checks (S1507) whether the other instance is still functional (alive)—see below. If alive, the instance 432C forwards the message to the other instance (e.g. 434C1) identified in the valid entry (S1506). This is referred to as a "proxy operation".

If there is no valid ownership entry or the other instance is not alive, the instance creates a valid ownership entry, the created entry comprising the instance identifier of the instance ("ID2") and the context ID, thereby identifying itself as current owner of the call (S1508). This is referred to a "context takeover operation".

The instance then proceeds to perform the requested transaction, which involves recreating the object graph (i.e. call state) for the call from the relevant serialized state data in external storage 606 (identified in storage by the context ID of the call), performing the actions needed to effect the transaction, which will inherently involve modifying the resurrected state, and storing a serialized version of the modified call state back in the external storage 606.

Read/Write Optimization Using Context:

By exploiting the above-defined concept of a Context, reads/writes to the external object cache can be optimized.

This can is achieved by creating a virtual external store per context, which accumulates all writes & services all reads, and then pushes out all the writes to the "real" external store in a batch—for instance, by taking a snapshot of the serialized graph in the memory.

Each individual PersistedObject will continue to "think" that they are writing their data to external storage, but in reality they are writing to local memory; the same is true of for all reads.

For Call Controller, the virtual store writes its data to actual external store based on the stage of call. For example, for a 1:1 call, the data is flushed when the call is established, and deleted when the call ends.

And by ensuring single object graph resurrection, all reads & writes are guaranteed to be consistent.

The virtual context store can itself be populated as part of the context takeover operation where a local instance becomes the processing instance. This has benefit of ensuring that after successful takeover of the context, no resurrection will fail due to read failures, which ensures predictability.

Instance Availability Check:

To check if an instance is alive (for the purposes of the proxy or takeover operation algorithm), Call Controller follows a simple technique:

1. Every 4 seconds each instance writes a heartbeat message to the database 608 in the external store with an expiration time of 10 seconds (10 seconds=2*4+2 seconds of safe limit). This expiration time gives an entry some resilience to transient failures—the heartbeat needs to fail two consecutive times for other instances to think a particular instance dead.
2. Every 4 seconds, each instance also reads the entries written by all other instances.
3. Instances for which an entry is found are considered alive, whereas the other ones are considered dead
4. This way within 14 seconds (in worst case) of failure of a particular instance, other instances come to know of the failure, and do the appropriate "takeover" of the calls which were previously being serviced by the now dead instance.

Example Using Call Processing:

To aid illustration, an exemplary and simplified situation is presented, in which an object graph gets created when a call controller instance processes a call, and then at least partially recreated during the call itself once the call has been established.

All the objects which cooperate to deliver the call control service are created as persisted objects, and contain only PersistedObjectReference in their state (in addition to other inherently serializable state). When they need to act on any object that they reference, they just call PersistedObjectReference.GetObject( ).<MethodToBeInvoked>.

Below, references to a service object (object1) referencing another service object (object2) refers to indirect references using the corresponding reference object (reference2). Where object2 implements a service function (f2( )), object2 invokes f2( ) on object by invoking reference2.GetObject( ).f2( ) (reference2.GetObject( ) returns object2, on which f2( ) is then invoked).

The sequence is:

1. UserA (Alice) calls UserB (Bob)
   a. The CallInvitationRequest comprises a set of callback URLs which are used by Call Controller to send notifications on
2. Call Controller receives the request, and after parsing it, creates the following service objects:
   a. UserAFacingCallbackHandler—which has the various URLs that are received from UserA as the state. This object exposes following methods
      i. Accept( ) which uses the accept url to send call acceptance message to caller
      ii. Reject( ) which uses reject url to send call end message to caller
   b. Call0—which is an abstraction that business logic layers can act on. Its characteristics are:
      i. State:
         1. Call Content like Caller, Callee, and call modalities (audio/video)
         2. Reference to UserAFacingCallbackHandler
         3. Forks—An array of reference to Call objects which are created by calling CreateFork method (forking is described in one of the points below, and refers to the process of sending one call to multiple endpoints)
      ii. Methods:
         1. Accept—Invoked when callee accepts the call
         2. Reject—Invoked when callee rejects the call
         3. Cancel—Invoked when caller cancels the call
         4. CreateFork—Used by Back-to-Back Controllers (described below) to create forks for the call
      iii. The way it works is—if the logic layer calls Call0.Accept, then UserAFacingCallbackHandler's AcceptUrl would be read, and CallAcceptance message would be sent to that URL
3. Call Controller then gives this Call0 object to the business logic layer
4. Business logic comprises a chain of objects called Back-to-Back Routing Controllers;
   a. These objects can participate in the routing of call;
   b. Using the methods on Call object, they can influence the entire message flow, and remain in the message flow chain temporarily or permanently;
   c. Few examples of Back-to-Back routers are:
      i. Billing Controller—this remains in the chain from start of the call, and keeps track of billing for the user, and may cut the call if user runs out of minutes;
      ii. Permission Enforcement Controller—this controller ensures that UserA can only perform calling operations which are allowed as per policy (for example, UserB may have blocked UserA);
      iii. Endpoint Routing Controller—this controller locates the endpoints of called user (UserB), and routes the call to appropriate destination;
   d. Each Back-to-Back router gets a Call object, and creates one or more Call objects (by calling CreateFork)—each of the created ones represent a fork of the original call. For example, if UserB has 2 endpoints, then Endpoint Routing Controller will create 2 Call objects, each of which will be routed appropriately (to the respective endpoint)
   e. Assuming that the controller chain is: Permission Enforcement->Billing->Endpoint Routing:
5. Permission Enforcement Controller gets the Call0 object, and creates another Call object—ForkedCall1, which has following characteristics
   a. State:
      i. Reference to parent Call object—The way it works is: If ForkedCall1.Accept gets call, Call0.Accept would be invoked.
      ii. Forks—if any gets created
   b. Methods:
      i. Same as Call object
   c. Note that as a result of Permission Enforcement Controller calling CreateFork( ) on original Call object, the parent object's Forks array would have been appended with ForkedCall1->Call0.Forks={ForkedCall1}

6. Billing Controller then gets ForkedCall1 and creates ForkedCall2
   a. ForkedCall2 has reference to parent ForkedCall1, and is of same type as ForkedCall object
   b. ForkedCall1.Forks={ForkedCall2}
7. Endpoint Routing Controller gets ForkedCall2 and creates ForkedCall31 and ForkedCall32
   a. Both these forks are of same type as Call and contain references to parent object ForkedCall2
   b. ForkedCall2.Forks={ForkedCall31, ForkedCall32}
8. Call Controller now generates two call notification requests—one each for ForkedCall31 and ForkedCall32
   a. Each of the call notification requests contain an Attach URL which point to the appropriate call object
   b. CallNotification(ForkedCall31).AttachUrl=https://<Call Controller Processing Instance>/<Id representing ForkedCall31>/Attach
   c. Similar for ForkedCall32
9. When any of UserB's endpoints attach (by sending an Attach request to the Attach URL received in CallNotification), the call state of ForkedCall31/32 will be appended with the End URL received as part of the AttachRequest.
10. As part of AttachResponse, the endpoints will get links corresponding to their ForkedCall. For example, Accept URL for ForkedCall31 could look like
    a. https://<Call Controller Processing Instance>/<Id representing ForkedCall31>/Accept
11. Assume that ForkedCall31 is accepted (by sending CallAcceptance message to the accept URL corresponding to ForkedCall31):
    a. The accept message contain callback URLs for mid-call links (like media renegotiation, transfer etc);
    b. On receipt of CallAcceptance message, Call Controller will create an object UserBFacingAcceptedCallCallbackHandler, which has as its state the URLs that UserB's endpoint supplies. This object exposes the following methods:
       i. RenegotiateMedia( ) which uses the media renegotiation url to send mediaRengotiation message back to user B;
       ii. Transfer( ) which uses transfer url to send transfer message back to user B;
12. ForkedCall31.Accept( ) produces UserBFacingAcceptedCall, which has the following characteristics:
    a. State:
       i. Reference to UserBFacingAcceptedCallCallbackHandler;
       ii. Reference to AcceptedCall2 object that is produced when ForkedCall2.Accept( ) is called as part of ForkedCall31.Accept( );
    b. Methods:
       i. HandleMediaRenegotiation( )—which invokes callback handler's RenegotiateMedia( );
       ii. HandleTransfer( )—which invokes callback handler's Transfer( );
       iii. RenegotiateMedia( )—which invokes AcceptedCall2. Renegotiate Media( ). This is the method that gets invoked when UserB starts a media renegotiation by sending media renegotiation message targeted to UserBFacingAcceptedCall object;
       iv. Transfer( )—which invokes AcceptedCall2. Transfer( ). This is the method that gets invoked when UserB starts a transfer by sending transfer message targeted to UserBFacingAcceptedCall object;
13. As mentioned above, ForkedCall31.Accept( ) also invokes ForkedCall2.Accept( ), which creates AcceptedCall2 with the following characteristics:
    a. State:
       i. Reference to UserBFacingAcceptedCall;
       ii. Reference to AcceptedCall1 object that is produced when ForkedCall1.Accept( ) is called as part of ForkedCall1.Accept( );
    b. Methods:
       i. Same as UserBFacingAcceptedCall;
14. Similarly, ForkedCall2.Accept( ) also invokes ForkedCall1.Accept( ), which creates AcceptedCall1 with the following characteristics:
    a. State:
       i. Reference to AcceptedCall2;
       ii. Reference to UserAFacingAcceptedCall object that is produced when Call0.Accept( ) is called as part of Call0.Accept( );
    b. Methods:
       i. Same as other AcceptedCall objects.
15. ForkedCall1.Accept( ) also invokes Call0.Accept( ), which creates UserAFacingAcceptedCall with following characteristics:
    a. State:
       i. Reference to AcceptedCall1;
       ii. Reference to UserAFacingAcceptedCallCallbackHandler that is created when UserA sends CallAcceptanceAcknowlegement message with its mid-call callback URLs;
    b. Methods:
       i. Same as other AcceptedCall objects.
16. Call0.Accept( ) also invokes UserAFacingCallbackHandler.Accept( ) which sends a CallAcceptance message on the accept URL
17. On receipt of CallAcceptance, UserA's endpoint sends a CallAcceptanceAcknowledgement message with mid-cal callback URL.
18. Call Controller creates UserAFacingAcceptedCallCallbackHandler object with these callback URLs as the state, and with following methods:
    a. RenegotiateMedia( ) which uses the media renegotiation url to send mediaRengotiation message back to user A;
    b. Transfer( ) which uses transfer url to send transfer message back to user A.

Figure 16:
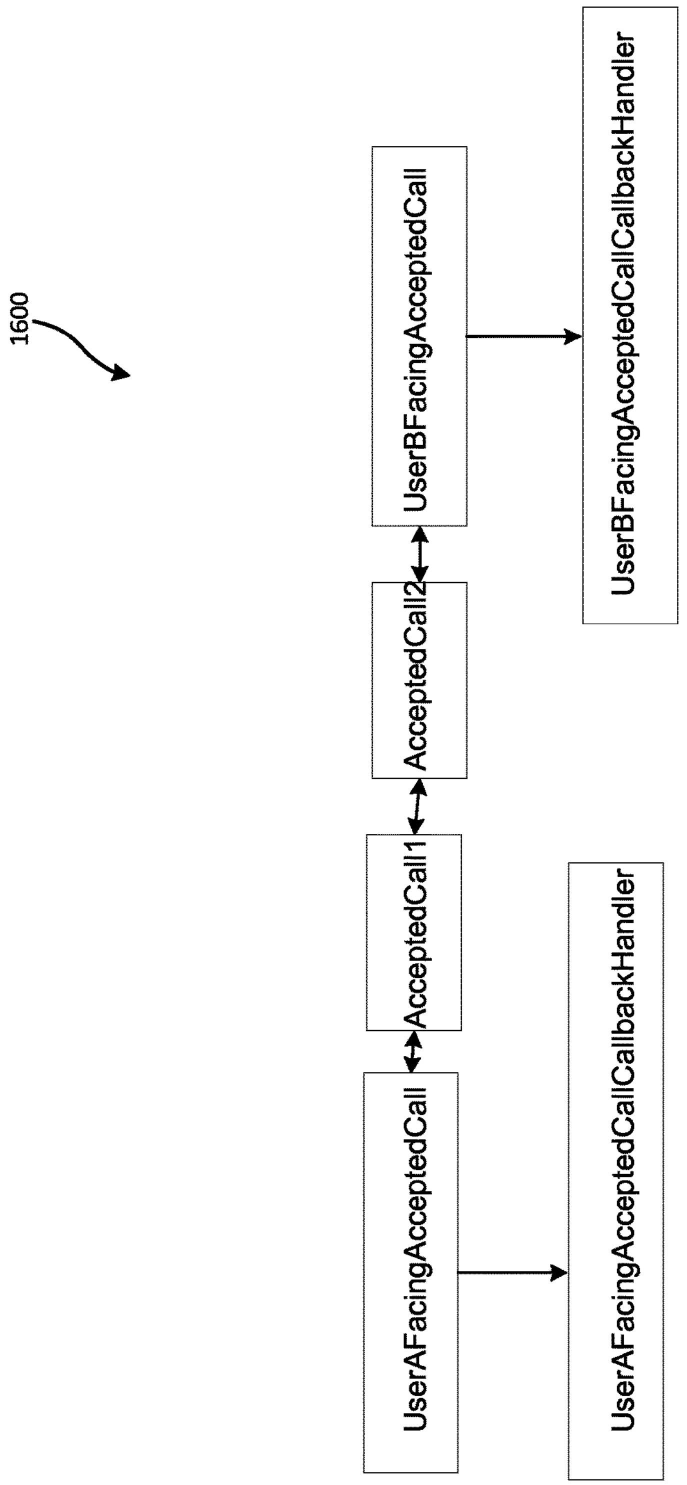
FIG. 16 schematically illustrates an exemplary active call state.

The runtime graph 1600 that gets generated for the active call is illustrated in FIG. 16. The runtime graph 1600 is an active call state for the call, active in the sense that is it realized in the memory to which the processor has direct access.

Any mid-call operation that UserA performs results in invocation of appropriate method on UserAFacingAcceptedCall.

For example, a media renegotiation triggered by UserA, would result in the following sequence of object invocations:

UserAFacingAcceptedCall.RenegotiateMedia( )->
AcceptedCall1.HandleMediaRenegotiation( )->
AcceptedCall2.HandleMediaRenegotiation( )->
UserBFacingAcceptedCall.HandleMediaRenegotiation( )->
UserBFacingAcceptedCallCallbackHandler.Renegotiate-Media( )->

Media Renegotiation message sent on mediaRenegotiation callback URL sent by User B.

Similarly, any mid-call operation that UserB performs results in invocation of appropriate method on UserBFacingAcceptedCall.

For example, a media renegotiation triggered by UserB, would result in following:

UserBFacingAcceptedCall.RenegotiateMedia( )->

AcceptedCall2.HandleMediaRenegotiation( )->

AcceptedCall1.HandleMediaRenegotiation( )->

UserAFacingAcceptedCall.HandleMediaRenegotiation( )->

UserAFacingAcceptedCallCallbackHandler.Renegotiate-Media( )->

Media Renegotiation message sent on mediaRenegotiation callback URL sent by User A.

To ensure that any mid-call operation can be performed on any instance, we need to ensure that the whole runtime object graph can be resurrected on any instance.

This means, that the object graph for accept call, should be serialized and stored into a highly available external store in the manner described above.

Once converted to appropriate form, the appropriate part of graph can be resurrected by following chain of references starting from any object (in the examples above, we can either start from UserAFacingAcceptedCall, or UserBFacingAcceptedCall).

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices (user terminals) may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

According to a first aspect, a method is for establishing a real-time communication event between a user of a client device and another user of another client device via a communication network. The method comprising a client running on the client device performing a first phase of a communication event establishment procedure by transmitting via the network a message to the other client device or to a server connected to the network. The message includes multiple options pertaining to a second phase of the communication event establishment process yet to be performed. The message comprises, for each of the multiple options, a different network address unique to that option which can be accessed to select that option. The method further comprises: detecting that the network address unique to one of the multiple options has been accessed; and in response, instigating the second phase of the communication event establishment procedure in accordance with said one of the multiple options.

In a first embodiment, the message may transmitted to the server, the method comprising the server: storing a mapping between the network address unique to said one of the multiple options and a server network address; transmitting the server network address to the other client device or to a further server connected to the network; detecting that the server network address has been accessed; and in response, accessing the network address unique to said one of the multiple options which is detected by the client so as to trigger the instigating step of the first aspect. In a second embodiment, the method may further comprise the further server: storing another mapping between the server network address and a further server network address; transmitting the further server network address to the other client device or to a yet further server; detecting that the further server network address has been accessed; and in response, accessing the server network address which is detected by the server so as to trigger the accessing step of the first embodiment.

In a third embodiment, the message may be transmitted to the server, and the method may comprise: for each network address, the server storing a mapping between that network address and a corresponding server network address, modifying the message to replace that network address with the corresponding server network address, and transmitting the modified message to the other client device or to a further server connected to the network; the server detecting that the server network address corresponding to the network address unique to said one of the multiple options has been accessed; and in response, the server accessing the network address unique to said one of the multiple options, which is detected by the client so as to trigger the instigating step of the first aspect. In a fourth embodiment, the corresponding network address may be transmitted to the further server, and the method may comprise: the further server storing another mapping between the corresponding network address and a further corresponding server network address, further modifying the message to replace the corresponding server network address with the further corresponding network address, and transmitting the further modified message to the other client device or to a yet further server connected to the network; the further server detecting that the further server network address corresponding to the server network address corresponding to the network address unique to said one of the multiple options has been accessed; and in response, the further server accessing the server network address corresponding to the network address unique to said one of the multiple options, which is detected by the server so as to trigger the accessing step of the third embodiment.

A connection may be established between the client device and a proxy server, the network addresses being of the proxy server; the detecting step of the first aspect may comprise the client detecting a signal received via the connection, the signal indicating that the network address unique to said one of the multiple options has been accessed. The connection may be a WebSocket connection.

The network addresses may be URIs, such as URLs. The network address unique to said one of the multiple options may accessed according to the HTTP protocol, for instance using the POST or DELETE request method.

According to a second aspect, a server is for effecting a real-time communication event between a user of a client device and another user of another client device via a communication network. The server comprises: computer storage; a network interface configured to receive messages from the network; and a processor. The processor configured to receive a message. The message includes multiple options pertaining to the communication event and, for each of the multiple options, a different network address unique to that option which can be accessed to select that option. The processor is further configured to, for each of the multiple network addresses, store in the computer storage a mapping between that network address and a corresponding server network address, transmit the server network addresses to the other client device or to a further server connected to the network. The processor is further configured to detect that the server network address corresponding to the network address unique to one of the multiple options has been accessed, and in response to access the network address unique to that option to select that option.

The processor may be configured to log the message in the computer storage.

The processor may be configured to record a duration of the communication event in the computer storage.

The message may be transmitted to the further server so as to cause the further server to perform an action relating to the communication event in response. The processor may be configured to: receive another message pertaining to the communication event, the message including another option pertaining to the communication event and another network address unique to the other option which can be accessed to select the other option; store in the computer storage another mapping between the other network address and another corresponding server network address; and transmit the other corresponding network address to another server of the network different from the further server so as to cause the other server to perform another action relating to the communication event.

The network addresses and the (further) server network addresses may URIs, such as URLs. The network address unique to said one of the multiple options may be accessed according to the HTTP protocol.

According to a third aspect, a method is for delivering a service, the method implemented by a computer system comprising a processor, a memory accessible to the processor and computer storage. The memory holds code which defines service object classes. The service object classes are configured to provide service functions. The method comprises the following steps. At least one service instigation message is received. Responsive to the at least one service instigation message, the service object classes are instantiated to create service objects. The service objects implement the service functions to deliver the service. Each service object has associated state data held in the memory, and at least some of the service objects reference other service objects. For each service object, an associated service object identifier is generated in the memory which distinguishes that service object from any other service object. The service objects are serialized to generate serialized data, the serialized data comprising a representation of each service object, and the representation comprising that service object's service object identifier, that service object's associated state data and the service object identifier of any other service object referenced by that service object. The serialized data is stored in the computer storage. When the service objects have been deactivated, a service reactivation message, identifying a service object to be reactivated, is received, and a reactivation process is performed for the identified service object. The reactivation process comprises: reactivating the identified service object from its representation in the serialized data, and if the identified service object references at least one service object which is needed to implement a service function, repeating the reactivation process for the referenced at least one service object, thereby creating a replacement set of service objects to replace at least some of the deactivated service objects.

In embodiments, the method may be for establishing communication events between endpoints of a communication network and for managing established communication events; the service request message may be a communication event establishment request and the service objects may be created to establish a communication event; the service reactivation message may request an action pertaining to the established communication event, and the replacement set of service objects may effect the requested action.

The action may, for instance, be:

- terminating the communication event;
- adding or removing a participant to/from the communication event;
- muting or unmuting a participant of the communication event;
- placing the communication event on hold; or
- adding or removing a media modality to/from the communication event.

The communication event may be a call.

The code may define a corresponding factory object class for each service object class, each factory object class configured to provide a service object reactivation function for creating service objects of that service object class from the representations in the serialized data, and the method may comprise:

- for each service object class, instantiating the corresponding factory object class to generate a corresponding factory object configured to implement the service object reactivation function provided by that factory object class;
- for each factory object, generating an associated factory object identifier in the memory which distinguishes that factory object from any other factory object;
- the representation of each service object may further comprise the factory object identifier of the factory object corresponding to that service object's service object class;
- the service reactivation message may identify the factory object corresponding to the identified service object's service object class, and performing the reactivation process for the identified service object may comprise:
- the identified corresponding factory object implementing its service object reactivation function on the identified service object's representation in the serialized data to reactivate the identified service object.

The code may define a reference object class configured to provide a get object function, and the method may comprise: for each service object: instantiating the persisted object reference class to generate a corresponding reference object, the corresponding reference object having associated state data held in the memory which does not include any memory pointer to any location in the memory but which does comprise the service object identifier of that service object; the reactivation process for the at least one service object may be performed when the reference objects have been deactivated and comprise: reactivating the reference object corresponding to the at least one service object using the service object identifier in the representation of the at least one service object; the get object function is configured, when invoked on the reactivated reference object, to reactivate the at least one service object from the representation of the at least one service object, and the at least one service object is reactivated by invoking the get object function on the reactivated reference object.

The get object function may configured, when invoked again on the reactivated reference object before the at least one service object has been deactivated, to return a memory pointer to the reactivated at least one service object, whereby only a single replacement service object is created to replace the at least one service object.

For each of at least some of the service objects, an associated network address may be generated which comprises that service object's associated service object identifier, and the service reactivation message may be received at the network address associated with the service object to be reactivated, the service object to be reactivated identified from the network address.

Each network address may be a URI (e.g. URL), and the method may comprise parsing the URI associated with the service object to be reactivated to identify the service to be reactivated.

The method may comprise caching a respective memory pointer to each reactivated service object, wherein if the reactivation process is performed for a service object which has already been reactivated and before the already-reactivated service object has been deactivated, the reactivation process returns the memory pointer to the already-reactivated service object, whereby only a single respective replacement service object is created to replace each reactivated service object.

The service instigation message may be received by an instance of the code, wherein the instance performs the steps of receiving, instantiating, generating, serializing and storing; the service reactivation message may be received by another instance of the code, and that instance may perform the reactivation process.

The service reactivation message may be received by an instance of the code, and the instance may access a database to determine whether it contains a valid ownership entry which identifies another instance of the code as currently owning the serialized data and:

- if so, the instance forwards the service reactivation message to the other instance so that the other instance performs the reactivation process, and
- if not, the instance creates a valid ownership entry in the database identifying the instance as currently owning the serialized state data, and the instance performs the reactivation process.

Each ownership entry may become invalid when a predetermined amount of time has elapsed since that ownership entry was created. Each instance may be configured to periodically write to the database a valid heartbeat message which identifies that instance as currently being alive, each heartbeat message becoming invalid when another predetermined amount of time has elapsed since that heartbeat message was created, wherein each ownership entry is valid only if the instance which it identifies is also identified as being alive by a valid heartbeat message so that the service reactivation message is forwarded to the other instance only if the other instance is identified as being alive by a valid heartbeat message.

The serialized data may be generated in the memory, and may be written from the memory to the computer storage by performing a single write operation when all of the service objects have been serialized.

Responsive to receiving the reactivation message, all of the state data needed to create the replacement set of service objects may be loaded, in the memory or another memory accessible to another processor of the computer system, from the computer storage by performing a single write operation, and the replacement set may be created from the serialized data loaded in the or the other memory.

According to a fourth aspect, a computer system comprises: an input configured to receive messages; computer storage; a processor; a memory accessible to the processor. The memory holds code which defines service object classes, the service object classes configured to provide service functions. The processor is configured, responsive to at least one service instigation message, to:

- instantiate the service object classes to create service objects, the service objects implementing the service functions to deliver the service, each service object having associated state data held in the memory, at least some of the service objects referencing other service objects;
- for each service object, generate an associated service object identifier in the memory which distinguishes that service object from any other service object;
- serialize the service objects to generate serialized data, the serialized data comprising a representation of each service object, the representation comprising that service object's service object identifier, that service object's associated state data and the service object identifier of any other service object referenced by that service object; and
- store the serialized data stored in the computer storage.

The or another processor of the computer system is configured, when the service objects have been deactivated and responsive to a service reactivation message identifying a service object to be reactivated, to perform a reactivation process for the identified service object reactivation process comprising:

- reactivating the identified service object from its representation in the serialized data, and
- if the identified service object references at least one service object which is needed to implement a service function, repeating the reactivation process for the referenced at least one service object thereby creating a replacement set of service objects to replace at least some of the deactivated service objects.

The computer system may be a cloud platform, whereby the and the other processor is each configured to run a plurality of virtual machines, wherein an instance of the code runs on each of the plurality of virtual machines.

The code may be configured to implement a call controller for establishing communication events between endpoints of a communication network and for managing established communication events, wherein the service request message is a communication event establishment request and the service objects are created by an instance of the call controller to establish a communication event; for example:

either the service reactivation message is received by the or another instance of the call controller;

or the code is further configured to implement a media controller for managing a media modality of the established communication event, and the service reactivation message is received by an instance of the media controller;

in either case, the service reactivation message requests an action pertaining to the established communication event, and the replacement set of service objects effect the requested action.

According to a fifth aspect, a computer program product comprises code stored on a computer readable storage medium and configured when executed to implement any of the methods or systems disclosed herein, including the method of the first and third aspects, the functionality of the server of the second aspect, and the computer system of the fourth aspect.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:

receiving at least one service instigation message;

responsive to said receiving the at least one service instigation message, instantiating one or more service object classes to create service objects configured to provide service functions, at least some of the service objects referencing other service objects;

generating an associated service object identifier for each service object which distinguishes that service object from any other service object;

serializing the service objects to generate serialized data including, for each respective service object, the service object identifier, the associated state data, and the service object identifier of any other service object referenced therein;

storing the serialized data;

receiving a service reactivation message identifying a deactivated service object to be reactivated; and performing a reactivation process for the identified service object, the reactivation process comprising:

reactivating the identified service object from the serialized data;

repeating the reactivation process for each associated service object necessary for a service function of the identified service object, thereby creating a replacement set of reactivated service objects; and caching a respective memory pointer to each of the reactivated service objects so that said performing the reactivation process for an associated service object already reactivated causes the cached memory pointer to be returned to the associated service object to ensure the replacement set includes only one instance of each of the reactivated service objects.

2. A method according to claim 1, wherein the service instigation message is a communication event establishment request and the service objects are created to establish a communication event, and wherein the service reactivation message requests an action pertaining to an established communication event and the replacement set of reactivated service objects effect the requested action pertaining to the established communication event.

3. A method according to claim 2 wherein the action pertaining to the established communication event is:

terminating the established communication event;

adding or removing a participant to/from the established communication event;

muting or unmuting a participant of the established communication event;

placing the established communication event on hold; or adding or removing a media modality to/from the established communication event.

4. A method according to claim 3 wherein the established communication event is a call.

5. A method according to claim 1, wherein the one or more service object classes are factory object classes, each factory object class configured to provide a service object reactivation function for creating service objects from the serialized data, the method further comprising:

instantiating each factory object class to generate a corresponding factory object configured to implement the service object reactivation function provided by that factory object class;

for each factory object, generating an associated factory object identifier which distinguishes that factory object from any other factory object;

wherein each service object further includes the factory object identifier for the corresponding service object class;

wherein the service reactivation message identifies the factory object for the corresponding service object class, wherein performing the reactivation process for the identified service object comprises:

the identified corresponding factory object implementing the service object reactivation function on the serialized data to reactivate the identified service object.

6. A method according to claim 1 wherein one or more service object classes are reference object classes configured to provide a get object function, and the method comprises:

for each service object corresponding to a reference object class: instantiating the reference object class to generate a corresponding reference object, the corresponding reference object having associated state data which does not include a memory pointer but which does include the service object identifier of that service object;

wherein the reactivation process for the identified service object is performed when the corresponding reference object has been deactivated and comprises:

reactivating the reference object corresponding to the identified service object using the service object identifier;

wherein the get object function is configured, when invoked on the reactivated reference object, to reactivate the identified service object by invoking the get object function on the reactivated reference object.

7. A method according to claim 6 wherein the get object function is configured, when invoked again on the reactivated reference object before the identified service object has been deactivated, to return a memory pointer to the reactivated service object, so that only a single replacement service object is created to replace the identified service object.

8. A method according to claim 1 wherein, for each of at least some of the service objects, an associated network address is generated which includes each service object's associated service object identifier, wherein the service reactivation message is received at the network address associated with the service object to be reactivated, the service object to be reactivated identified from the network address.

9. A method according to claim 8, wherein each network address is a URI, and the method comprises parsing the URI associated with the service object to be reactivated to identify the service to be reactivated.

10. A method according to claim 1 wherein if the reactivation process is performed for a service object which has already been reactivated and before the already-reactivated service object has been deactivated, the reactivation process returns the memory pointer to the already-reactivated service object, so that only a single respective replacement service object is created to replace each reactivated service object.

11. A method according to claim 1, wherein the service instigation message is received by a first instance of a virtual machine, wherein the first instance performs the steps of receiving, instantiating, generating, serializing and storing; and wherein the service reactivation message is received by a second instance of the virtual machine, and the second instance performs the reactivation process.

12. A method according to claim 1, wherein the service reactivation message is received by a first instance of a virtual machine, and the first instance accesses a database to determine whether it contains a valid ownership entry which identifies a second instance of the virtual machine as currently owning the serialized data and:

if so, the first instance forwards the service reactivation message to the second instance so that the second instance performs the reactivation process, and if not, the first instance creates a valid ownership entry in the database identifying the first instance as currently owning the serialized data, and the first instance performs the reactivation process.

13. A method according to claim 12 wherein each ownership entry becomes invalid when a predetermined amount of time has elapsed since that ownership entry was created.

14. A method according to claim 13, wherein the first and second instance of the virtual machine are each configured to periodically write to the database a valid heartbeat message which identifies that instance of the virtual machine as currently being alive, each heartbeat message becoming invalid when another predetermined amount of time has elapsed since that heartbeat message was created, wherein each ownership entry is valid only if the instance of the virtual machine identified is also identified as being alive by a valid heartbeat message so that the service reactivation message is forwarded to the other of the first and second instance of the virtual machine only if the other of the first and second instance of the virtual machine is identified as being alive by a valid heartbeat message.

15. A method according to claim 1 wherein said storing the serialized data comprises a single write operation when all of the service objects have been serialized.

16. A method according to claim 1 further comprising responsive to receiving the reactivation message, loading all of the associated state data needed to create the replacement set of reactivated service objects by performing a single write operation.

17. A system comprising:

an input device;

computer storage;

a processor;

a memory accessible to the processor holding code which defines service object classes, the service object classes configured to provide service functions;

wherein the processor is configured, responsive to receiving at least one service instigation message, to:

instantiate the service object classes to create service objects, the service objects implementing the service functions to deliver a service, each service object having associated state data held in the memory, at least some of the service objects referencing other service objects;

for each service object, generate an associated service object identifier which distinguishes that service object from any other service object;

serialize the service objects to generate serialized data including, for each respective service object, the service object identifier, the associated state data and the service object identifier of any other service object referenced by that service object; and store the serialized data in the computer storage;

wherein the processor or an additional processor of the system is configured to:

receive a service reactivation message identifying a deactivated service object to be reactivated; and perform a reactivation process for the identified service object, the reactivation process comprising:

reactivating the identified service object from the serialized data, and repeat the reactivation process for each associated service object necessary for a service function of the identified service object, thereby creating a replacement set of reactivated service objects; and cache a respective memory pointer to each of the reactivated service objects so that said performing the reactivation process for an associated service object already reactivated causes the cached memory pointer to be returned to the associated service object to ensure the replacement set includes only one instance of each of the reactivated service objects.

18. A system according to claim 17, wherein the system is a cloud platform, wherein the processor and the additional processor are each configured to run a plurality of virtual machines, wherein an instance of the code runs on each of the plurality of virtual machines.

19. A system according to claim 18, wherein the code is configured to implement a call controller for establishing communication events between endpoints of a communication network and for managing established communication events, wherein the service instigation message is a communication event establishment request and the service objects are created by an instance of the call controller to establish a communication event;

wherein either the service reactivation message is received by the instance of the call controller or by another instance of the call controller, or the code is further configured to implement a media controller for managing a media modality of the established communication event, and the service reactivation message is received by an instance of the media controller; and wherein the service reactivation message requests an action pertaining to the established communication event, and the replacement set of service objects effect the requested action.

20. A computer readable storage medium storing computer-executable code that defines service object classes configured to provide service functions, wherein the code is configured when executed to perform operations including:

receive at least one service instigation message;

responsive to receiving the at least one service instigation message, instantiate the service object classes to create service objects, the service objects implementing the service functions to deliver a service, each service object having associated state data, at least some of the service objects referencing other service objects;

for each service object, generate an associated service object identifier which distinguishes that service object from any other service object;

serialize the service objects to generate serialized data including, for each respective service object, the service object identifier, the associated state data and the service object identifier of any other service object referenced by that service object;

store the serialized data;

receive a service reactivation message identifying a deactivated service object to be reactivated; and perform a reactivation process for the identified service object, the reactivation process including:

reactivating the identified service object from the serialized data, and repeating the reactivation process for each associated service object necessary for a service function of the identified service object, thereby creating a replacement set of reactivated service objects; and caching a respective memory pointer to each of the reactivated service objects so that said performing the reactivation process for an associated service object already reactivated causes the cached memory pointer to be returned to the associated service object to ensure the replacement set includes only one instance of each of the reactivated service objects.

* * * * *